United States Patent [19]

Silberberg

[11] 4,397,552

[45] Aug. 9, 1983

[54] INSTRUMENT FOR MEASUREMENT OF EXPOSURE FROM A LASER RADIATION

[75] Inventor: Jeffrey L. Silberberg, Rockville, Md.

[73] Assignee: The United States of America as represented by the Department of Health & Human Services, Washington, D.C.

[21] Appl. No.: 202,727

[22] Filed: Oct. 31, 1980

[51] Int. Cl.³ .............................................. G01J 1/44
[52] U.S. Cl. ..................................... 356/215; 356/226
[58] Field of Search ............... 356/213, 215, 218, 220, 356/226, 227, 224, 225

[56] References Cited

U.S. PATENT DOCUMENTS

| | | | |
|---|---|---|---|
| 3,302,521 | 2/1967 | Grantham et al. | 356/213 |
| 3,495,916 | 2/1970 | Morgan | 356/226 |
| 3,520,616 | 7/1970 | Glenn et al. | 356/225 |
| 3,687,558 | 8/1972 | Rex | 356/227 |
| 3,836,262 | 9/1974 | Yata et al. | 356/226 |
| 3,843,265 | 10/1974 | Egli et al. | 356/201 |
| 3,846,028 | 11/1974 | List | 356/218 |
| 3,966,325 | 6/1976 | Mohler | 356/218 |
| 4,008,966 | 2/1977 | Frank et al. | 356/218 |
| 4,035,088 | 7/1977 | Jenkins et al. | 356/218 |
| 4,201,472 | 5/1980 | Maeda | 356/226 |

Primary Examiner—Bruce Y. Arnold
Attorney, Agent, or Firm—Browdy & Neimark

[57] ABSTRACT

An instrument for measuring laser energy in the visible range and which determines when the optical energy exceeds the accessible emission limit for a Class I laser. The instrument employs a photoelectric detector and a filter for a range of 476 to 633 nm. The instrument measures the optical energy as a function of time and compares the measured value with the accessible emission limit for a Class I laser at various critical points in time. A 3-digit engineering-notation display format is used to output the computed time at which the laser energy exceeds the Class I limit, as well as the total energy measured in 10 seconds. The instrument is adapted to measure either CW laser radiation, pulsed laser radiation, or each pulse of laser radiation, computes and applies a correction factor for optical error conditions or variations between optical detectors, and measures and compensates for background energy. Mode and scale information, and sensed data, are read into a micro computer and are read out on a LCD display.

24 Claims, 19 Drawing Figures

LASER METER
FRONT PANEL

SYSTEM BLOCK DIAGRAM

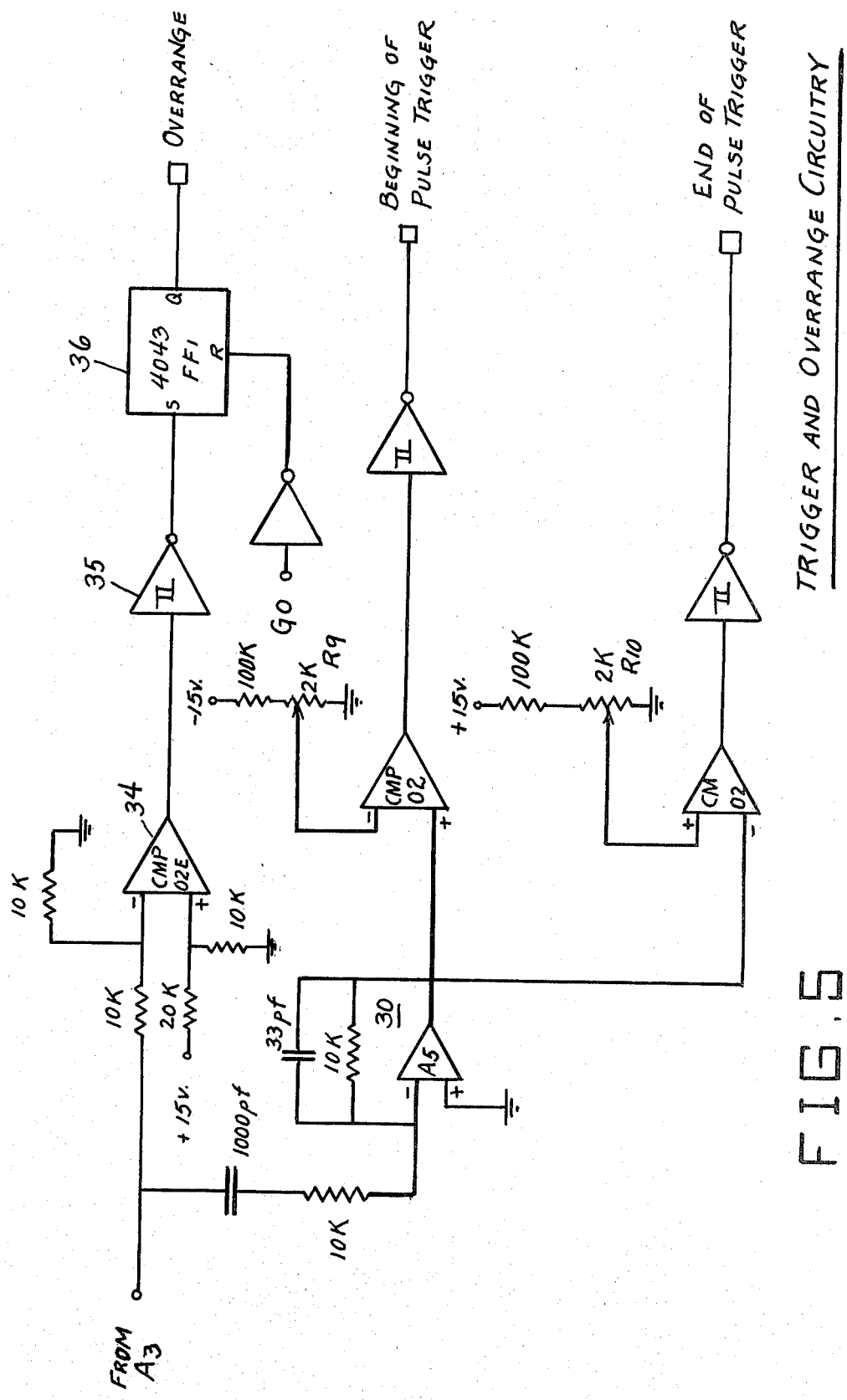

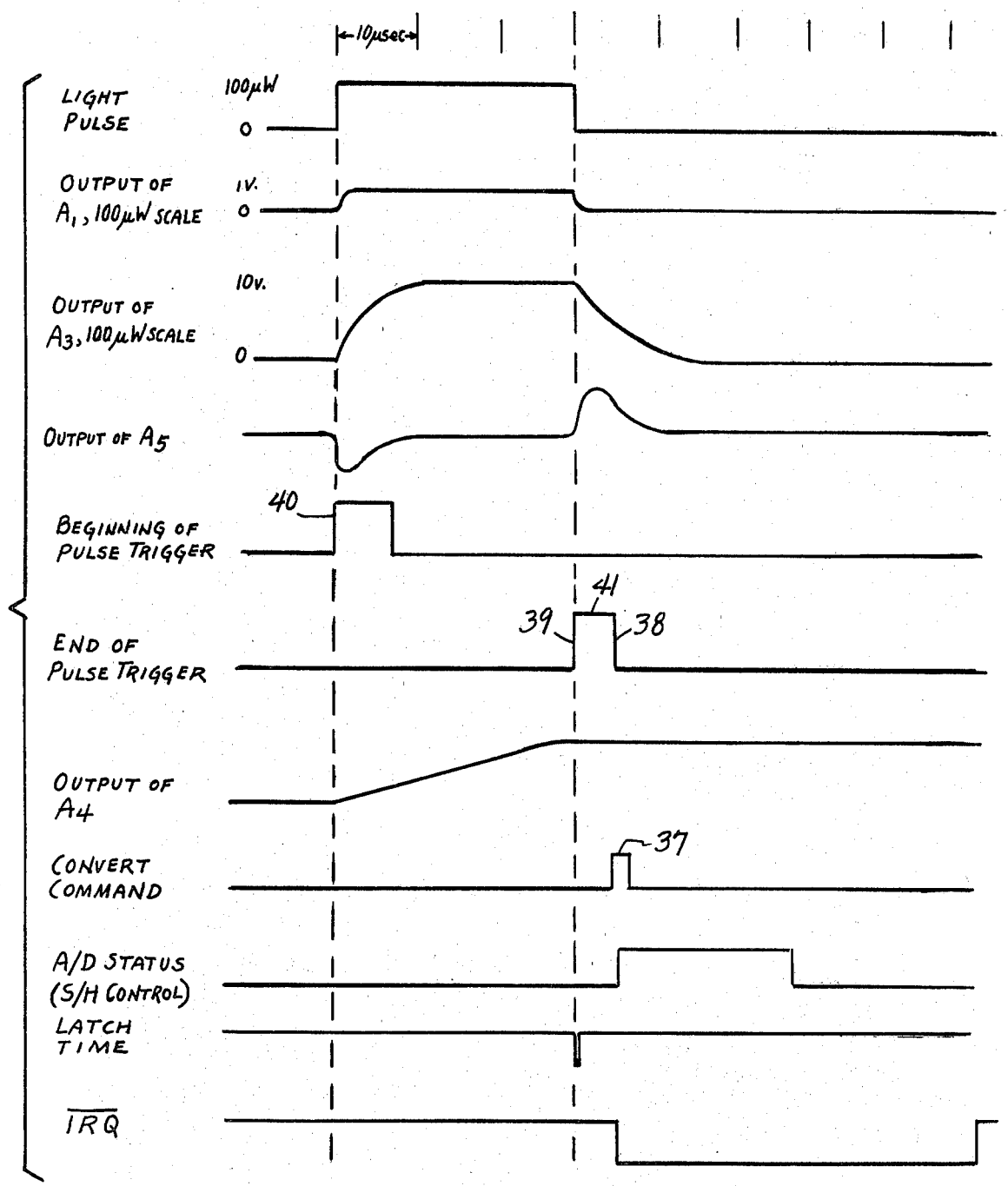
FIG.6  FRONT END TIMING RELATIONSHIPS

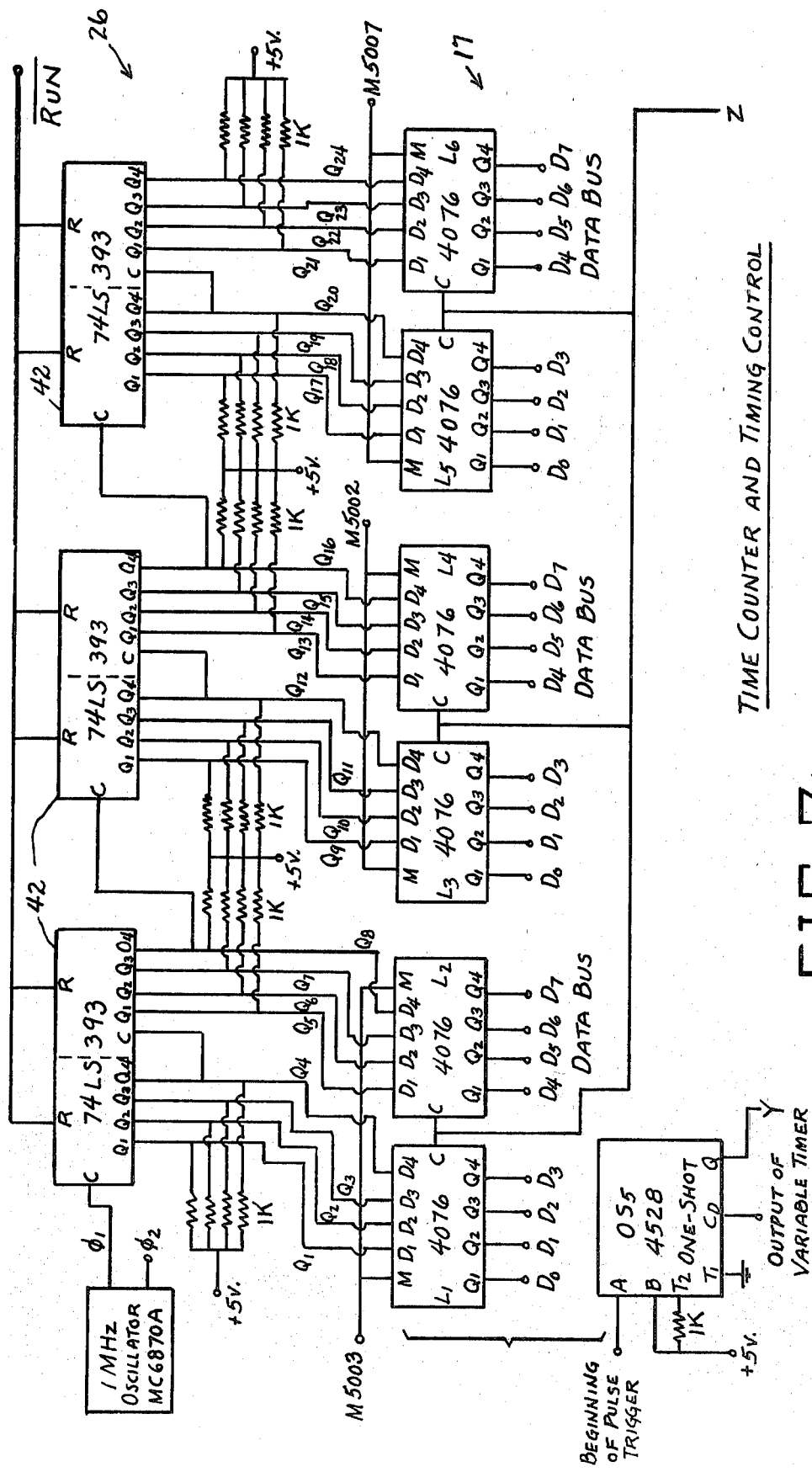

TIME LATCH SIGNALS

VARIABLE TIMER

DISPLAY CIRCUITRY

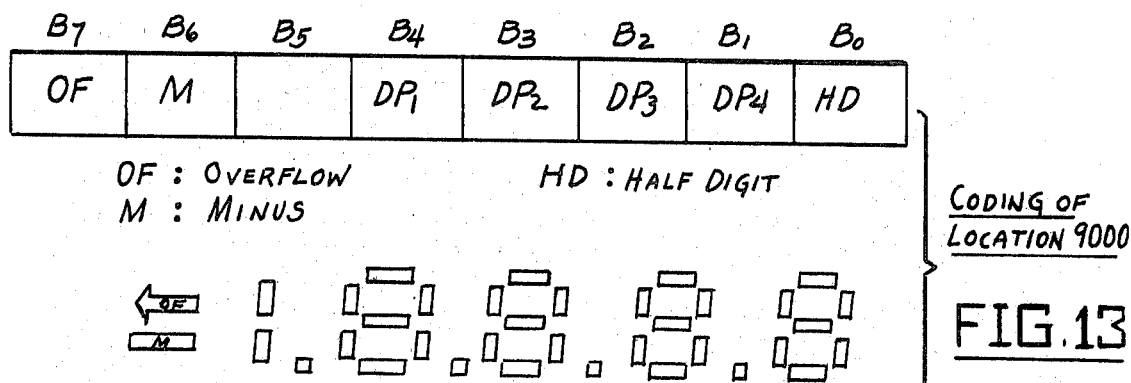
FIG. 13 Coding of Location 9000
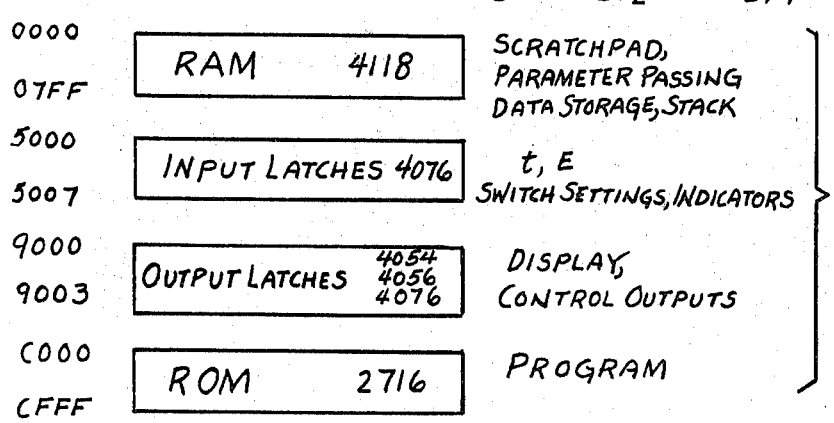
FIG. 15 Memory Map
| Device | μP Address Lines ($A_0 ... A_{15}$) ||||||||||||||||Address ||
|---|---|---|---|---|---|---|---|---|---|---|---|---|---|---|---|---|---|
| | 15 | 14 | 13 | 12 | 11 | 10 | 9 | 8 | 7 | 6 | 5 | 4 | 3 | 2 | 1 | 0 | From | To |
| RAM 4118 | 0 | 0 | | | | 0 | X | X | X | X | X | X | X | X | X | X | 0000 | 03FF |
| RAM 4118 | 0 | 0 | | | | 1 | X | X | X | X | X | X | X | X | X | X | 0400 | 07FF |
| INPUT 4076 | 0 | 1 | | | | | | | | | | | | X | X | X | 5000 | 5007 |
| Output 4054, 4056, 4076 | 1 | 0 | | | | | | | | | | | | | X | X | 9000 | 9003 |
| ROM 2716 | 1 | 1 | | | 0 | X | X | X | X | X | X | X | X | X | X | X | C000 | C7FF |
| ROM 2716 | 1 | 1 | | | 1 | X | X | X | X | X | X | X | X | X | X | X | C800 | CFFF |
FIG. 16 Address Layout
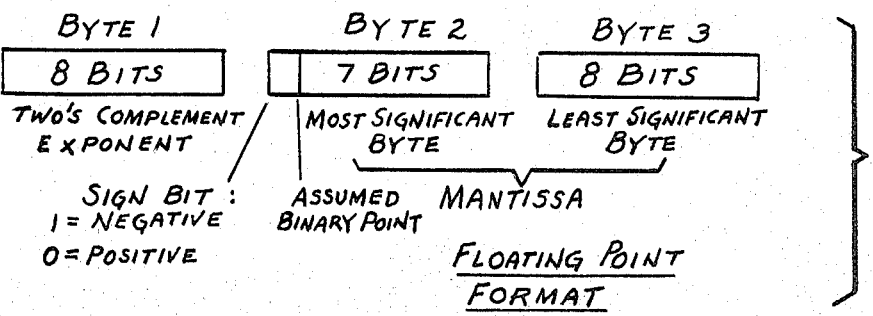
FIG. 17

INSTRUMENT FOR MEASUREMENT OF EXPOSURE FROM A LASER RADIATION

FIELD OF THE INVENTION

This invention relates to laser safety inspection devices, and more particularly to a laser power-energy measuring instrument for measuring the optical energy of a laser device as a function of time and for comparing the measured value to the accessible emission limit for Class I lasers.

BACKGROUND OF THE INVENTION

The nature of light emitted by lasers, with its characteristic coherence and narrow beam divergence, is such that exposure of the eye to relatively small laser energies can result in damage to the retina.

At the present time there is no acceptable instrument for determining compliance with the legally established performance safety standards for lasers and laser products, and there is need for an improved instrument which can measure laser energy in the visible band and which can determine the time at which the optical energy will exceed the accessible emission limit for a Class I laser, and more specifically, which is capable of measurement accuracy of the order of ±3 percent for CW or pulsed signals where the peak power is between 10 $\mu$W and 100 mW and the pulses are greater than 18 $\mu$sec. in width, and which is portable for field use.

A body of patent literature exists which patents disclose devices for converting light signals into electrical signals, but these do not serve the intended purpose. Such U.S. Patents, and others noted during a preliminary search are: Rex U.S. Pat. No. 3,687,558; Yata et al U.S. Pat. No. 3,836,262; Egli et al U.S. Pat. No. 3,843,265; List U.S. Pat. No. 3,846,028; Mohler U.S. Pat. No. 3,966,325; Frank et al U.S. Pat. No. 4,008,966; Jenkins et al U.S. Pat. No. 4,035,088 and Maeda U.S. Pat. No. 4,201,472.

SUMMARY OF THE INVENTION

The instrument of the present invention is adapted for use by official inspection personnel, such as by Food and Drug Administration (FDA) personnel in determining the duration of safe viewing of a source of visible laser radiation. A laser whose output can enter the naked human eye indefinitely and cause no discernible damage is classified as a Class I laser. The laser meter of the present invention measures the optical energy as a function of time and compares the measured value with the accessible emission limit for Class I lasers (promulgated under 21 CFR, Subchapter J, Part 1040) at various critical points in time. A 3-digit engineering-notation display format is used to output the computed time at which the laser energy exceeds the Class I limit as well as the total energy measured in 10 seconds.

The laser meter incorporates sophisticated detector circuitry and a dedicated micro computer ($\mu$C). Numerical results of measurements are indicated by a 0.4 inch-high crystal display (LCD). The display is back-lit for measurements under conditions of low ambient light.

The instrument preferably employs a photodiode detector and a spectral-flattening filter, such as UDT Model PIN-10DSB detector and Model 115 radiometric filter. The instrument can be designed to contribute no more than ±3 percent error to energy measurements made, using the above-mentioned filter-detector combination in the wavelength range of 476 to 633 nm.

Although accurate CW measurements can be made at average powers from 2 $\mu$W to 10 mW (or up to 100 mW with the use of a 10-percent-transmission filter), the instrument is preferably optimized for measurement of modulated or scanned optical signals, such as those encountered in laser light shows and supermarket checkout scanners. For the purpose of comparison to Class I limits, it is preferred that the detector incorporate a circular aperture stop having a 7-millimeter diameter.

The Class I accessible emission limits for laser radiation of wavelengths 400 to 1400 nm that may be programmed into the microcomputer employed in the instrument are listed in Table 1. In each of two measurement modes specifically designed for measurement of pulsed or modulated signals, the times at which the laser emission is compared to the Class I limit is determined by the optical signal itself. Within constraints presently to be discussed, each sample taken in these modes coincides with the end of an optical pulse. The instrument performs well for pulses greater than 18 $\mu$sec. in width.

TABLE 1

Class I Accessible Emission Limits for Laser Radiation of Wavelength 400 to 1400 nm

| Emission Duration (t) in seconds | Class I Accessible Emission Limit in Joules |
|---|---|
| $1.0 \times 10^{-9} < t \leq 2.0 \times 10^{-5}$ | $2.0 \times 10^{-7}$ |
| $2.0 \times 10^{-5} < t \leq 10$ | $7.0 \times 10^{-4} t^{\frac{3}{4}}$ |
| $10 < t \leq 1.0 \times 10^{4}$ | $3.9 \times 10^{-3} t$ |
| $t > 1.0 \times 10^{4}$ | $3.9 \times 10^{-7} t$ |

Accordingly, an object of the present invention is to provide improved safety in the laser industry and in laser usage.

Another object is to overcome the deficiencies and disadvantages of the prior art such as noted above.

A further object of the invention is to provide an improved portable instrument for the measurement of exposure from laser radiation and for making measurements in testing laser products for compliance with P.L. 90-602, relating to the determination as to whether the products exceed the accessible emission limit for a Class I laser, the instrument having a high measurement accuracy, particularly for CW or pulsed signals where the peak power is between 10 $\mu$W and 100 mW and the pulses are greater than 18 $\mu$sec. in width.

A further object of the invention is to provide an improved laser meter which can be advantageously employed for measurement of modulated or scanned optical signals, such as those encountered in laser light shows, supermarket checkout scanners, and other optical applications wherein there is a substantial risk of exceeding the Class I limit for accessible emission.

A still further object of the invention is to provide an improved portable laser meter which is particularly well adapted for handling relatively short pulses of optical energy and for determining compliance with legal restrictions with respect to accessible emission limits.

A still further object of the invention is to provide an improved portable laser meter to directly determine the hazard of direct viewing, as indicated by the Class I accessible emission limits for laser radiation, which incorporates a microprocessor for the processing of measured optical laser energy data, which is relatively easy to operate, which outputs numerical data in units of Joules and seconds directly, which automatically determines the time at which an optical laser signal exceeds the Class I limit, and which can evaluate complex scan patterns for safety in a short time.

BRIEF DESCRIPTION OF THE DRAWINGS

Further objects and advantages of the invention will become apparent from the following description and claims, and from the accompanying drawings, wherein:

FIG. 5 is a wiring diagram of the trigger and overrange circuitry employed in the laser meter.

FIG. 6 illustrates wave forms showing the front end timing relationships of signals developed in the laser meter.

FIGS. 7A and 7B together form a circuit diagram of the time counter and timing control circuits employed in the laser meter.

FIG. 13 is a coding diagram for coding decimal point location, minus sign, overflow indication and half-digit in the instrument.

FIG. 15 is a memory map illustrating how the microcomputer memory is partitioned into four segments.

FIG. 16 is a typical address layout.

FIG. 17 illustrates a floating point format as employed with software for the microcomputer.

DESCRIPTION OF A PREFERRED EMBODIMENT

General Considerations

Figure 1:
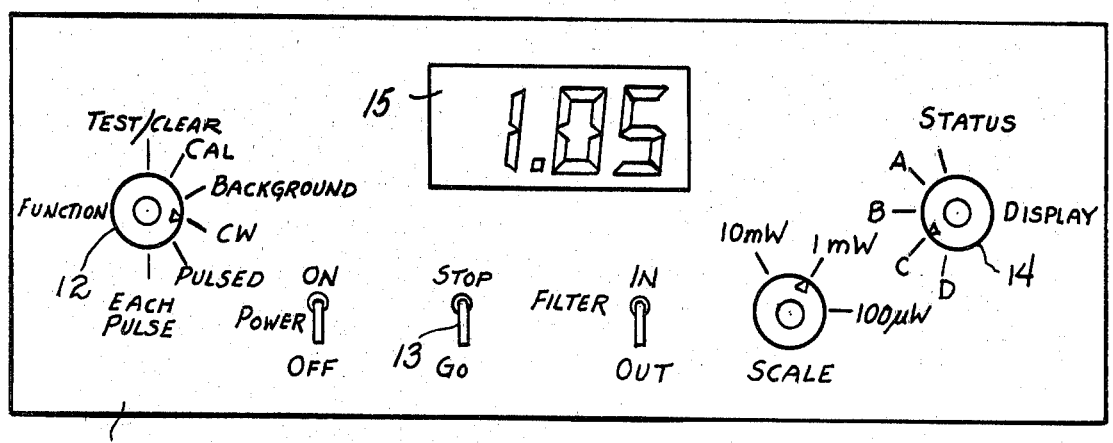
FIG. 1 is a front elevational view of the front panel of a laser meter constructed in accordance with the present invention.

Referring to the drawings, FIG. 1 shows the instrument panel 11 of a typical laser meter according to the present invention. The instrument has a 6-position function switch knob 12 enabling the instrument to perform six functions, and has a display unit 15 which can display five quantities. The panel 11 is provided with a two-position momentary, center-off switch lever 13, having a "go" position and a "stop" position. A function can be executed by rotating the knob 12 of the function switch to the appropriate position and activating the switch lever 13 to the "go" position. A function can be aborted by activating lever 13 to the "stop" position. The various measurement modes have several features in common: with the exception of the Test/Clear mode, each function incorporates a data acquisition phase, a processing phase, and a display phase.

When the instrument enters the data acquisition phase, "A---" is displayed. Then at least one data point is input to the microcomputer. Each data point consists of an accumulated time and energy sample and can be represented as $(t_i, E(t_i))$. When the acquisition period terminates, "P---" is displayed and the data is processed. The specific processing performed is slightly different in each mode. However, for each data point, $E(t_i)$ is first multiplied by a calibration factor C to correct for errors caused by the attenuation of optical filters or the gain variation between detectors. The background energy in time $t_i$, denoted $B(t_i)$ is then subtracted to yield $E'(t_i)$, the corrected energy. Thus, $E'(t_i)$ equals $(CE(t_i) - B(t_i))$. The corrected energy is then compared to the accessible emission limit for a Class I laser with an exposure duration of $t_i$ seconds. The time duration at which the exposure first exceeded, or can be projected to exceed, the Class I limit is then determined.

The data acquisition hardware consists of a short-term measurement section and a long-term measurement section. The former accumulates energy for the first 257 μsec of a run and the latter accumulates energy from the beginning to the end of the run (up to 10 seconds). There is a separate background and calibration value stored for each measurement section. Each data sample input to the microcomputer is accompanied by measurement-section identification information so that the appropriate calibration and background values will be used.

Errors that can jeopardize the validity of the data are indicated as shown in Table 2. The memory space error will be explained with the operation of the Pulsed mode, and the RAM and ROM errors will be discussed along with the Test/Clear function. An over-range indication is displayed when the instantaneous power of an input signal exceeds the full-scale range selected by the range switch during the measurement period. If the scale setting at the time of any data sample is determined to be different from the scale setting at the beginning of a run, this error is also indicated. In the Calibrate, Background, and CW modes, the error indication may not appear long enough to be observed. Therefore, it is advisable to check the status register after each measurement in these modes.

TABLE 2

| | Error Indications | | |
|---|---|---|---|
| Error | Data acquisition phase | Processing phase | Display phase (status register) |
| None | A--- | P--- | S--- |
| Memory space exceeded | AS-- | PS-- | SS-- |
| Overrange | A-O- | P-O- | S-O- |
| Scale change during measurement | A--S | P--S | S--S |
| Error in RAM test | | | SL-- |
| Error in ROM test | | | SH-- |

Figure 2:
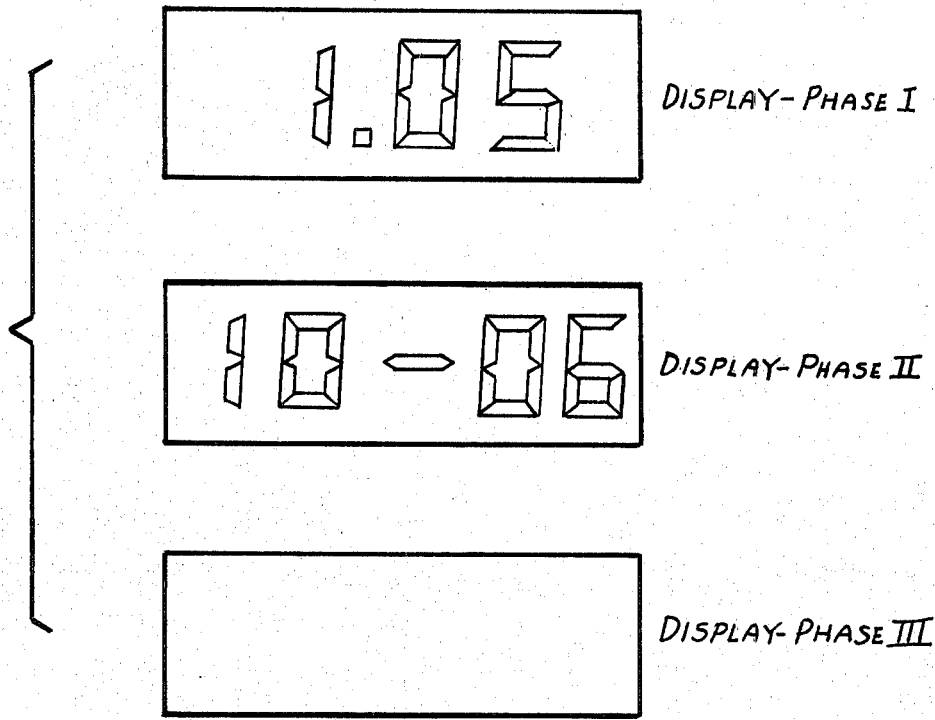
FIG. 2 illustrates the display format of the laser meter.

After a measurement is made, the laser meter displays the status register or numerical data according to the setting of the Display switch knob, shown at 14. Numerical data is presented on the 4½-digit liquid crystal display (LCD) unit 15 in a sequential engineering-notation format. Numerical data is displayed in three phases. Execution of any function requested by the "go" switch does not begin until the current display cycle is completed. A display cycle begins with the display of a 3-digit mantissa for approximately 2 seconds. The power of 10 multiplier associated with the same quantity is then output for 2 seconds. Finally, the display blanks for ½ second and the sequence repeats. FIG. 2 shows the LCD during the three phases of the display sequence. If the quantity displayed in FIG. 2 is energy, the value is 1.05 microjoules ($\mu$J). (For multipliers consisting of positive powers of 10, the minus sign is not opaqued during phase II). Since the display incorporates engineering notation, all powers of 10 displayed are multiples of 3.

The quantities displayed for the A, B, C and D settings of the display switch knob 14 correspond to the function executed as shown in Table 3. For each mode the data displayed follows the general format of the Pulsed mode, for which A displays the width of the first pulse in seconds, B displays the energy of the first pulse in Joules, C displays the time to exceed Class I in seconds, and D displays the total energy in joules. Similarities to and differences from this format are explained with the description of each function.

TABLE 3

| Function | Quantities displayed Displayed Value | | | |
|---|---|---|---|---|
| | A | B | C | D |
| Calibrate | 257 10-06 sec. | Correction factor for short-term section | Time for Cal. source to exceed Class I, sec. | Correction factor for long-term section |
| Background | 257 10-06 | Background energy in 257 $\mu$sec, J | Time for background to exceed Class I, sec. | Background energy in 10 sec., J |
| CW | 10.0 10 00 | Total energy in 10 sec, J | Time to exceed Class I, sec. | Total energy in 10 sec., J |
| Pulsed | Width of first pulse, sec. | Energy of first pulse, J | Time at which Class I was exceeded or time to exceed Class I, sec. | Total energy in 10 sec., J |
| Each Pulse | Width of first pulse, sec. | Energy of first pulse, J | Time at which Class I was exceeded, sec. | Energy of the pulse that exceeds Class I, J |

Test/Clear

The Test/Clear function tests the display and the microcomputer memory. The display is tested by first opaquing all segments of the LCD for 2 seconds and then making all segments transparent for 2 seconds. If the display is functioning properly, it will first indicate −1.8.8.8.8 and then be completely blank. Otherwise, a hardware or software error has occurred. After exercising the display, the Test/Clear function checks all memory in the system for proper storage. A storage error in the random access memory (RAM) is indicated in the status register as SL − − (low memory error). An error in the read-only (program) memory (ROM) is indicated as "SH − −" (high memory error). Test/Clear sets all displayed numerical data to zero, the background energy to zero, and the calibration factors to 1.00. In addition to being executible from the "go" switch, the Test/Clear function is initiated whenever the instrument is turned on.

Background

Execution of the Background function causes the instrument to accumulate for 10 seconds, beginning immediately at the end of a display cycle, and to input two data points to the microcomputer. "A − − −" is displayed during the measurement. The measured data, E(257 $\mu$sec) and E(10 sec), are multiplied by the calibration factors $C_S$ and $C_L$, respectively, where $C_S$ is the calibration factor for the short-term measurement section and $C_L$ is the calibration factor for the long-term measurement section. Although the quantities displayed are in units of energy, the microcomputer computes and stores background in units of average power. The values stored after execution of the Background function are $b_S = C_S E(257\ \mu sec)/(257\ \mu sec)$ and $b_L = C_L E(10\ sec)/(10\ sec)$. Data processing in the Background mode is performed in less than 50 msec.

The data displayed after a Background run follows the same format as the Pulsed mode. The width of the "first pulse" is the short-term measurement period, 257 $\mu$sec. The energy of the "first pulse" is $C_S E(257\ \mu sec)$, the short-term background energy. The total background energy measured in 10 seconds is displayed, as well as the time at which a laser of the same average power would exceed the Class I limit.

A certain amount of background will be measured with no input to the detector because of the offset of the front-end amplifiers. For this reason, a background measurement should always be performed before a laser energy measurement. Both measurements should be made using the same setting of the scale switch. If the instrument is in proper adjustment, the background measured with no input should be greater than zero and less than 0.1 percent of full scale. For example, on the 100 $\mu$W scale, the full-scale total energy is 1 mJ, and therefore the "dark" long-term background should be less than 1 $\mu$J.

Calibrate

Calibrate, like the Background function, causes the instrument to accumulate for 10 seconds, beginning immediately at the end of a display cycle, and to input two data points, E(257 $\mu$sec) and E(10 sec), to the microcomputer. "A − − −" is displayed during the accumulation period. The average power for both the short-term and long-term measurement sections are then computed from the following equations, wherein $p_S$ is the short-term power and $p_L$ is the long-term power:

$$p_S = E(257\ \mu sec)/(257\ \mu sec)$$

$$p_L = E(10\ sec)/(10\ sec).$$

The background average power values $b_S$ and $b_L$ are subtracted and the result is divided into the known average power of the calibration source to compute the calibration factors $C_S$ and $C_L$. The instrument is presently programmed to be calibrated by an optical source having an average power of 75 $\mu$W. (Possible alternatives are discussed below). Thus, $C_S = 75\ \mu W/(p_S - b_S)$ and $C_L = 75\ \mu W/(p_L - b_L)$. As in the Background mode, data processing is performed in less than 50 msec.

After the Calibration data is processed, the width of the "first pulse" output in display mode A is 257 $\mu$sec and the time at which a 75-$\mu$W laser would exceed the Class I limit (52 sec) is output in display mode C. The calibration factors for the short-term and long-term measurement sections, $C_S$ and $C_L$, are output in display modes B and C, respectively.

A summary of the recommended setup procedure is as follows: (1) On the 100 µW scale, accumulate background, even if the calibration source fits snugly over the detector; (2) calibrate; (3) if the calibration factors differ from 1.00 by more than ±50 percent or if step (1) was performed with a snugly fitting calibration source, accumulate ambient background; and (4) perform any number of laser measurements. Step (3) should be repeated whenever the scale setting is changed. If the detector exhibits good linearity, the calibration factors determined on the 100 µW scale will be valid on the 1 mW and 10 mW scales.

Once the setup procedure is completed, measurements can be made in the CW, Pulsed, or Each Pulse mode. In the CW mode, one data point is input to the microcomputer. The total measured energy in 10 seconds is multiplied by the long-term calibration factor and corrected for background to find $E'(10\ \text{sec}) = C_L E(10\ \text{sec}) - B_L(10\ \text{sec})$. $E'(10\ \text{sec})$ is then compared to the accessible emission limit for Class I at 10 seconds, 3.9 mJ. If $E'(10\ \text{sec})$ is greater than 3.9 mJ, the average power $E'(10\ \text{sec})/(10\ \text{sec})$ is calculated and the equation $$E = P_{ave} t = 7.0 \times 10^{-4} t^{\frac{3}{4}}$$

is solved for t, such that $$t = [(7.0 \times 10^{-4})/P_{ave}]^4.$$

$P_{ave} = E'(10\ \text{sec})/(10\ \text{sec})$ is substituted into this equation to find the time at which a CW laser having average power $P_{ave}$ would exceed the Class I limit. If $\frac{1}{4}$ sec $\leq t < 10$ sec, it is output in display mode C. If $t < \frac{1}{4}$ sec, the time to exceed Class I is set to zero; that is, the laser is hazardous for direct viewing for any duration.

If $E'(10\ \text{sec}) < 3.9$ mJ, however, $P_{ave}$ is divided into 3.9 mJ to determine the projected time at which a laser of average power $E'(10\ \text{sec})/(10\ \text{sec})$ would exceed the Class I limit. If 3.9 mJ/$P_{ave}$ is equal to or less than $10^4$ sec, this value is output in display mode C. If 3.9 mJ/$P_{ave} > 10^4$ sec, $10^4$ sec is output in display mode C.

Display mode A outputs the width of the "first pulse", 10 seconds. The energy of the "first pulse" and the total energy in 10 seconds, display registers B and D, are identical in the CW mode and equal to $E'(10\ \text{sec})$. Data processing in the CW mode is performed in less than 50 msec.

Pulsed

The Pulsed and Each Pulse modes are designed for evaluating the hazard from pulsed or scanned lasers, either random or periodic. In the Pulsed mode, data is again accumulated for 10 seconds. However, up to 255 data points can be read into the microcomputer.

Execution of the Pulsed mode results in a display of "— — — —" at the end of the current display cycle. The data accumulation does not begin until the instrument is triggered by a signal having an amplitude of at least 10 percent of full scale and a risetime less than 50 µsec. Once a trigger is detected, "A — — —" is displayed and accumulation begins. Energy and time are accumulated and samples are input to the microcomputer as determined by the detection of end-of-pulses and the state of a variable timer.

End-of-pulses are detected with the falltime is less than 50 µsec. The end of the first pulse always cases $(t_1, E(t_1))$ to be input to the microcomputer. The falling edge of the first pulse also triggers the variable timer. The variable timer is a retriggerable one-shot, the period of which is a function of t. The period is approximately 450 µsec at the beginning of a run and expands to 56 msec by the end of 10 seconds. If the end of the second pulse occurs less than 450 µsec after the end of the first pulse, $(t_2, E(t_2))$ is latched in the front-end but not input to the microcomputer. This process repeats until no end-of-pulse is detected during the entire variable-timer period. When the variable timer times out, the most recent $(t_i, E(t_i))$ sample latched by the front-end is input to the microcomputer. One constraint on the front-end is the 50 µsec required to read in a data sample. If an end-of-pulse occurs less than 50 µsec after the end of the first pulse or the timeout of the variable timer, the data will still contribute to the total energy but will not be latched as a data sample.

The variable timer is designed to limit the memory capacity required to process pulsed data over the 10-second measurement period. Without it, much more memory hardware would be required in order to process each pulse for any pulse frequency that might occur. The expansion of the variable timer period during a run effectively regulates the number of data samples taken for a wide range of pulse frequencies. The expansion is justified by the fact that the contribution of a single pulse to the total energy declines as t approaches 10 seconds.

The effect of the variable timer will be explained using periodic signals for example. A pulsed optical signal having a period less than 450 µsec will result in the input of only two samples to the microcomputer, $(t_1, E(t_1))$ and $(10\ \text{sec}, E(10\ \text{sec}))$. For a pulsed optical signal with a period of 60 msec, a sample will be input to the microcomputer at the end of each pulse for the entire 10-second measurement period. In this case, a total of 167 data points will be read in: 166 samples triggered by ends of pulses and one sample at 10 seconds. For a periodic signal with period T such that 450 µsec $< T <$ 56 msec, each pulse will be sampled until the variable timer period expands to be greater than T. The remaining pulses will contribute to the total energy but will not be measured individually. The number of data points input to the microcomputer is approximately 180 for pulse frequencies between 20 Hz and 2 kHz. A memory-space-exceeded error message (see Table 2) will result if for any reason the variable timer fails to regulate the number of data samples.

Ends-of-pulses that occur less than 257 µsec into the measurement period cause data to be read in from the short-term measurement section. Ends-of-pulses that occur subsequently cause data to read in from the long-term measurement section. The gain of the short-term section is 16 times that of the long-term section. Since measurement-section information is read by the microcomputer when accepting a data sample, this factor is taken into account during the data processing phase.

Data processing of samples accumulated in the Pulsed mode begins as "P — — —" is output to the display. The energy of each sample is corrected using the stored constant for calibration and background. Samples are processed in the order they were read in to find $E'(t_i) = CE(t_i)/B(t_i)$, where $C = C_S$ if $t_i \leq 257$ µsec and $C = C_L$ if $t_i > 257$ µsec. $B(t_i)$ is the background energy, computed by multiplying the background average power b by the sample time $t_i$, where $b = b_S$ if $t_i \leq 257$ μsec and $b = b_L$ if $t_i > 257$ μsec. The time and energy data for the first pulse are output in display modes A and B, respectively. After $E'(t_i)$ is computed for each data sample, it is compared to the Class I limit at time $t_i$. If a sample is processed for which $E'(t_i)$ exceeds the Class I limit, $t_i$ is output as the time to exceed Class I (display mode C), $E'(10\ \text{sec})$ is processed to determine the total energy (display mode D), processing terminates, and the display phase begins. Thus the "time to exceed Class I" that is actually output in the Pulsed mode is not the exact time that the laser exceeded the Class I limit but the time corresponding to the end of the pulse that exceeded the limit. If no data sample is found to exceed the Class I limit, $E'(10\ \text{sec})$ is processed in the same manner as in the CW mode to calculate a prior or extrapolate to a later time to exceed Class I.

Data processing in the Pulsed mode can last up to 7 seconds, depending on the number of data samples measured and the relationship of the energy to the Class I limit. For example, if the first pulse exceeds the Class I limit, processing will be completed in less than 50 msec.

Each Pulse

Initiation of the Each Pulse mode also results in a display of "— — — —" until a trigger is detected. Rather than accumulating data for 10 seconds as in all other measurement modes, however, the instrument measures the energy and duration of each pulse detected until the memory is full (255 samples). There is approximately 500 μsec of deadtime during which a data sample is stored before the instrument is ready to accept the next pulse. Thus, the duration of the acquisition phase can be as short as 128 msec for a periodic 2-kHz optical signal. If input pulses are very infrequent, the acquisition phase can be terminated using the "stop" switch. Unlike the other accumulation modes, however, actuation of the "stop" switch in the Each Pulse mode causes the data accumulated to that point to be processed and the results to be displayed. The "stop" switch is also very useful in both the Pulsed and Each Pulse modes for aborting a run in the event that no trigger is detected.

In the Each Pulse mode, data samples input from the short-term measurement section are stored beginning at the bottom of memory, and data samples input from the long-term measurement section are stored beginning at the top of memory. Data accumulation terminates before the two can overlap. As a result of this data storage technique, the data processed as the "first pulse" will actually be either the first pulse input from the short-term measurement section or, if no data is input from the short-term measurement section, the last pulse input from the long-term measurement section. Thus, the width and energy of the first pulse output by display modes A and B, respectively, relate to the first pulse processed and not necessarily the first pulse detected.

Unless data acquisition was terminated prematurely, data processing in the Each Pulse mode lasts approximately 7 seconds. Data is processed in the same manner as in the Pulsed mode with the exception that the position of a data point $(t_i, E(t_i))$ in the stored array is not necessarily related to $t_i$. Again, processing time will be shortened if a pulse exceeding the Class I limit is processed early in the stored array of data samples. If a pulse is found to exceed the Class I limit, the pulse width will appear in display mode C and the energy of that pulse will appear in display mode D. If no pulse is found to exceed the Class I limit, $10 \times 10^3$ is displayed in mode C and zero is displayed in mode D.

It should be noted that under high ambient room-light conditions, data gathered from the short-term measurement section in the Pulsed or Each Pulse mode can be processed with considerable error. Although background from room lighting typically has a period of 8.33 msec, the short-term measurement section can only sample the background waveform for 257 μsec. Thus, the computed energy of a pulse input from the short-term measurement section is influenced by the time relationship between the room-light waveform and both the background measurement and the input pulse periods. Variation of 20 percent or more from measurement to measurement in the short-term background accumulated in the Background mode indicates the possibility of large error in the measurement of pulses less than 8.33 msec in width. Errors can be minimized with the use of optical bandpass filters that attenuate the ambient room-light reaching the detector.

System Hardware

The laser meter is a microprocessor-based system with a sophisticated integrating front end for accumulating data and an LCD for output. A simplified block diagram of the system appears in FIG. 3. Mode and scale information is read into a microcomputer 28 from the front-panel controls and time and energy data are read in from the 24- and 12-bit latches shown respectively at 17, 16, and 27.

Optical signals are converted to electrical current by the silicon photodetector, shown at 18. The photocurrent is then converted via a current-to-voltage converter 19 to a voltage and amplified by a variable-gain amplifier 20 by a factor of 1 on the 10-mW scale, 10 on the 1-mW scale, and 100 on the 100-μW scale. The long-term measurement section consists of a voltage-to-frequency (V/F) converter 21 and a 24-bit binary counter 22. The short-term measurement section consists of an analog integrator 23, sample and hold (S/H) 24 and analog-to-digit (A/D) converter 25. Time information is accumulated with a resolution of 1-μsec in a second 24-bit binary counter 26. Both counters remain reset until a measurement is made. In all measurement modes except Each Pulse, data are accumulated for 10 seconds as determined by the time counter. In the Each Pulse mode, both counters are reset after each pulse.

Data are latched in the 24-bit latches 17 and 27 as determined by the Timing Control section, shown at 29. In the CW mode, one sample is latched and read into the microcomputer 28 after 10 seconds. In the Calibrate and Background modes, a sample is also taken at 257 μsec as follows: (1) The time is latched from the corresponding 24-bit counter 26; (2) the S/H 24 is switched from sample to hold; (3) the A/D is triggered to begin a conversion; (4) after approximately 20 μsec, the conversion is complete and the A/D 25 causes the data to be latched in the 12-bit latch 16; and (5) the time and energy data are read into the microcomputer 28. When energy data are input to the microcomputer in any mode, the Timing Control unit 29 determines whether the microcomputer 28 reads data from the A/D 25 or the V/F 21. If $t \leq 257$ μsec, data are read from the A/D 25 and if $t > 257$ μsec, data are read from the V/F 21.

In the Pulsed mode, timing information is extracted from the input signal using a bandpass filter 30. Transitions of more than one-tenth of full scale that occur in less than 50 μsec will give rise to the appropriate trigger. The 24-bit counters 22, 26 remain reset until a beginning-of-pulse trigger is detected. At this time, the 10-second measurement period begins. The end of the first pulse causes time and energy data to be latched and interrupts the microcomputer 28 to request data input. All subsequent ends of pulses during the 10-second measurement period cause data to be latched, except as mentioned above in connection with Pulsed mode. However, the data latched from subsequent pulses are only read into the microcomputer 28 when allowed by the variable timer, shown at 31. This is also described above.

In the Each Pulse mode, the counters 22, 26 begin accumulating after a beginning-of-pulse trigger and are reset after the data associated with the next end-of-pulse trigger is latched. This process repeats until 255 data points have been read into the microcomputer 28 from the latches 16 or 27, and 17. The variable timer 31 prevents beginning-of-pulse triggers from being accepted while the data measured from the previous pulse are being stored in the microcomputer memory.

The dedicated microcomputer 28 reads mode and scale information from the front-panel controls, generally designated at 32, reads in data during the accumulation period, processes the data and compares it to the accessible emission limit for Class I laser radation, and outputs the results to the liquid-crystal display 15.

A typical instrument weighs about 8 pounds (3.6 kg) and may be packaged in a case measuring about $8\frac{1}{4} \times 3 \times 11$ inches ($21 \times 7.6 \times 28$ cm). Power supplies rated at 5 V., 500 mA and $\pm 15$ V, $\pm 150$ mA. are sufficient to power the circuitry.

In the schematic diagrams shown in the drawings, many signals appear on more than one drawing. For this reason, signal names are used for identification. Also, open circles are used to represent input terminals (sink) and open squares are used to represent output terminals (source).

Analog Front End

The analog front-end accepts current pulses from the photodetector 18, amplifies and integrates the signal, and converts it to digital form. Triggers are generated from input pulses and overrange conditions are detected.

Figure 4:
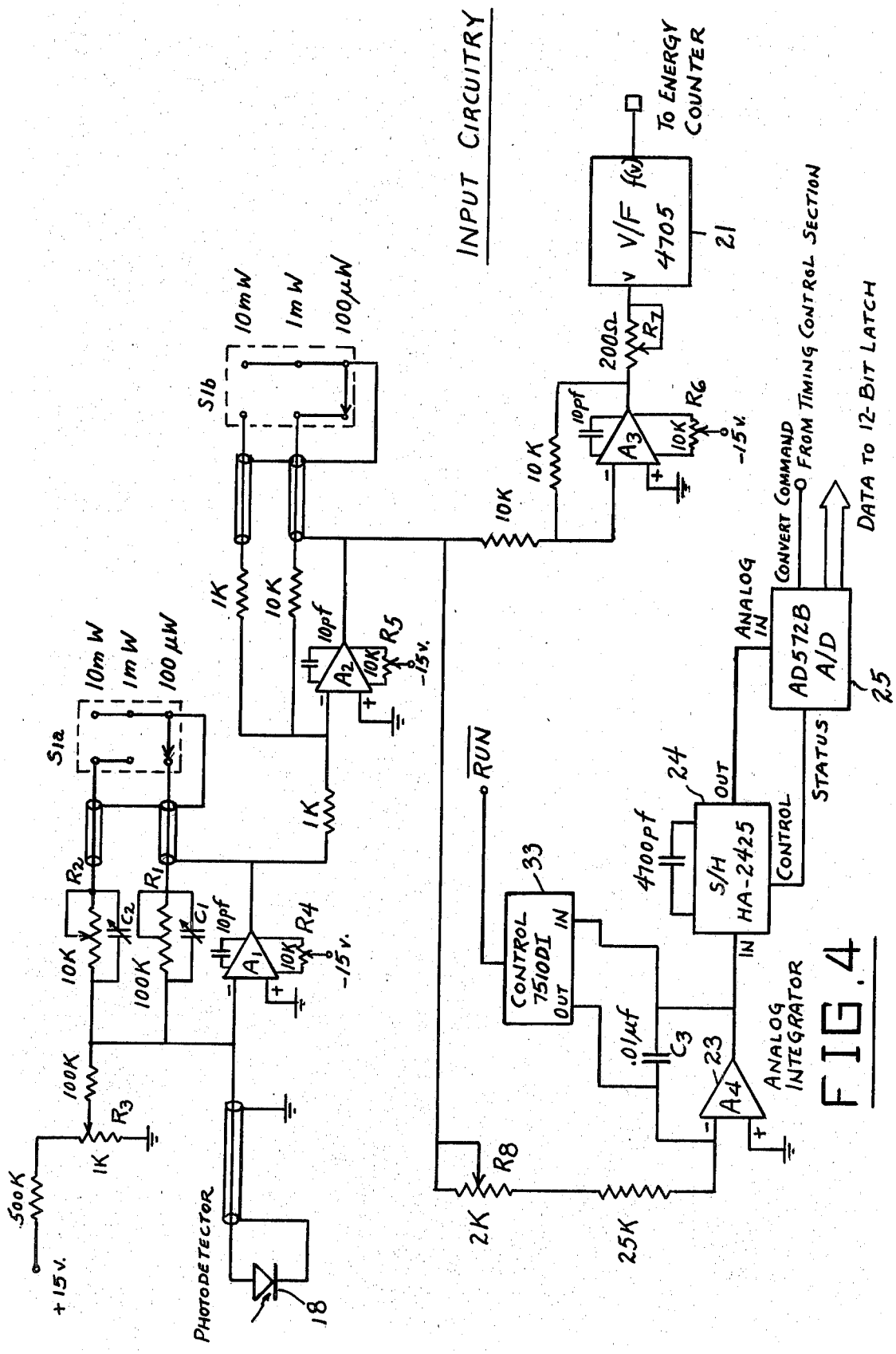
FIG. 4 is a wiring diagram of the input circuitry of the laser meter.

The short-term and long-term measurement sections are shown in FIG. 4. All resistors, trimpots, and capacitors are temperaturestable to minimize degradation of accuracy with temperature. Common to both measurement sections are the photodiode 18 and the amplifier comprised of operational amplifiers $A_1$ and $A_2$. The photodetector 18 is operated in the unbiased mode to minimize integrator errors. Amplifier $A_1$ converts the photocurrent to a voltage. $R_1$ is set so that the output of $A_1$ is 1.00 V. for 100 $\mu$W into the detector on the 100-$\mu$W scale, and $R_2$ is set so that the output of $A_1$ is 1.00 V. for 1 mW into the detector on the 1-mW scale. (Trimpots $R_1$ through $R_{10}$ are preferably cermet multi-turn devices with low temperature coefficients. Amplifiers $A_1$, $A_2$, and $A_3$ may be of the NE531 type.) Capacitors $C_1$ and $C_2$ add to the cable capacitance between the gain trimpots and the scale switch $S_{1a}$ to compensate for the source capacitance in the photodetector 18. Capacitors $C_1$ and $C_2$ are adjusted to minimize the risetime of the output of $A_1$ while avoiding overshoot.

Amplifier $A_2$ inverts the output of $A_1$ with a gain of 1.00 on the 10 mW scale and 10.0 on the 1 mW and 100 $\mu$W scales. The output of $A_2$ is adjusted to zero for no light falling on the detector, using $R_3$, $R_4$ and $R_5$. This is best accomplished by adjusting $R_5$ on the 10 mW scale; $R_4$ on the 1 mW scale, and $R_3$ on the 100 $\mu$W scale. By iterating this procedure several times, the offset is adjusted to within several millivolts of zero for all scales. The NE531 operational amplifiers used exhibit minimal offset drift with time or temperature. With $C_1$ and $C_2$ adjusted properly, the risetime at the output of $A_2$ is 10 $\mu$sec on the 100-$\mu$W scale, 4.2 $\mu$sec on the 1-mW scale and 4.0 $\mu$sec on the 10-mW scale for a full-scale step in optical power at the detector.

The short-term measurement section integrates the output of $A_2$ and converts it to digital form. It is comprised of integrator $A_4$ (shown at 23), Harris model HA-2425 sample/hold (shown at 24), and Analog Devices AD572B analog-to-digital converter (shown at 25). $A_4$ is an OP-07E operational amplifier, chosen for its low offset voltage and current. When no measurement is being made, integration capacitor $C_3$ is discharged by a field-effect-transistor (FET) switch in control unit 33 (Analog Devices AD7510DI). During the accumulation period, the FET switch is open and $A_4$ integrates the output of $A_2$. The gain of the integrator is adjusted using $R_8$ so that an input of 10 V. (from $A_2$) will integrate to 10 V. in 257 $\mu$sec. When an end-of-pulse is detected in the Pulsed or Each Pulse mode or after 257 $\mu$sec of accumulation in the Calibrate or Background mode, the A/D 25 is triggered to begin conversion by the timing control section 29. The status output of the A/D 25 goes high, switching the S/H 24 from the sample to the hold mode for 20 $\mu$sec while the A/D conversion is in progress. When the conversion is complete, the 12-bit output of the A/D 25 is clocked into the 12-bit latch 16 for input to the microcomputer 28.

The long-term measurement section also integrates the output of $A_2$, but uses a different technique. The negative-going output of $A_2$ is inverted by unity-gain inverter $A_3$. The output of the V/F converter 21 (Teledyne Philbrick 4705) is a train of TTL-compatible logic pulses approximately 350 nsec wide having a frequency proportional to the output voltage of $A_3$. The pulses from the V/F 21 are totalized in a 24-bit counter 22, thus accumulating the integral of the output of $A_3$. This technique is very accurate for long-term measurements because the V/F 21 is linear over a side dynamic range (output frequencies from 1 Hz to 1 MHz) and the digital "integrator" does not drift. Since the V/F converter 21 operates on positive inputs only, the offset of amplifier $A_3$ is adjusted to approximately +8 mV, ensuring subtraction of noise and amplifier offset with background. The V/F 21 is not suited to short-term measurements, since the response time is approximately 12 $\mu$sec for a 10-V. step input. $R_7$ trims the gain of the V/F 21. Not shown are the trims for the gain of the A/D 25 and the offset of the A/D and V/F converters. For accuracy of measurement, the gain resistors associated with operational amplifiers $A_2$ and $A_3$ are $\pm 0.05$ percent tolerance with $\pm 25$ ppm/C° temperature coefficient.

The trigger and overrange detection circuitry is shown in FIG. 5. If the output of $A_2$ (FIG. 4) exceeds 10 V., the output of the CMP-02E comparator 34 goes low, causing the output of the Schmitt trigger 35 to go high, setting the CD4043 flipflop 36. The state of the overrange latch is sampled by the microcomputer whenever laser energy data is read in. The latch is reset by the "go" switch whenever a new measurement is initiated. The bandpass filter 30 used to detect input transients (amplifier $A_5$) has 3-dB breakpoints at 16 and 480 kHz and has a passband gain of 1.0. A beginning-of-pulse trigger 40 (FIG. 6) is generated when the output of $A_5$ exceeds the threshold set by $R_9$ in the negative direction, and an end-of-pulse trigger 41 is generated when the output of $A_5$ exceeds the threshold set by $R_{10}$ in the positive direction. The amplitude of the output of $A_5$ is a function of both the risetime and the amplitude change of the output of $A_2$.

The timing relationships of the various signals in the input circuitry are shown in FIG. 6 for a typical 100-$\mu$W input pulse, 30 $\mu$sec wide. Most of the signals in the figure have been described previously. The convert command 37 is generated by the falling edge 38 of the end-of-pulse signal 41, which makes allowance for the fall time at the output of $A_2$; however, the time $t_f$ is latched into the corresponding 24-bit latch 17 on the rising edge 39 of the end-of-pulse trigger. The interrupt request to the microcomputer ($\overline{IRQ}$) is approximately 50-$\mu$sec wide. It is triggered by the falling edge 38 of an end-of-pulse trigger and remains low until the data have been read in.

It should be noted that the speed of the analog front-end is limited by the speed of the detector. If a detector 18 faster in the unbiased mode than the UDT mode PIN-10DSB is used, the minimum pulse-width requirement of 18 msec could be reduced by a factor of two or more.

Digital Front-End

The digital front-end (FIGS. 7A, 7B) inputs energy and time information, as well as the position of the various front panel switches, to the microprocessor ($\mu$P) 28. It is comprised of CMOS and low-power Schottky (LS) TTL integrated circuits for low-current consumption. LSTTL can be identified in the digital front-end schematic diagrams by the 1000-ohm pullup resistors on the outputs, which are used to ensure CMOS compatibility. LSTTL is used where greater output drive or higher speed than CMOS exhibits is necessary.

Figure 7B:
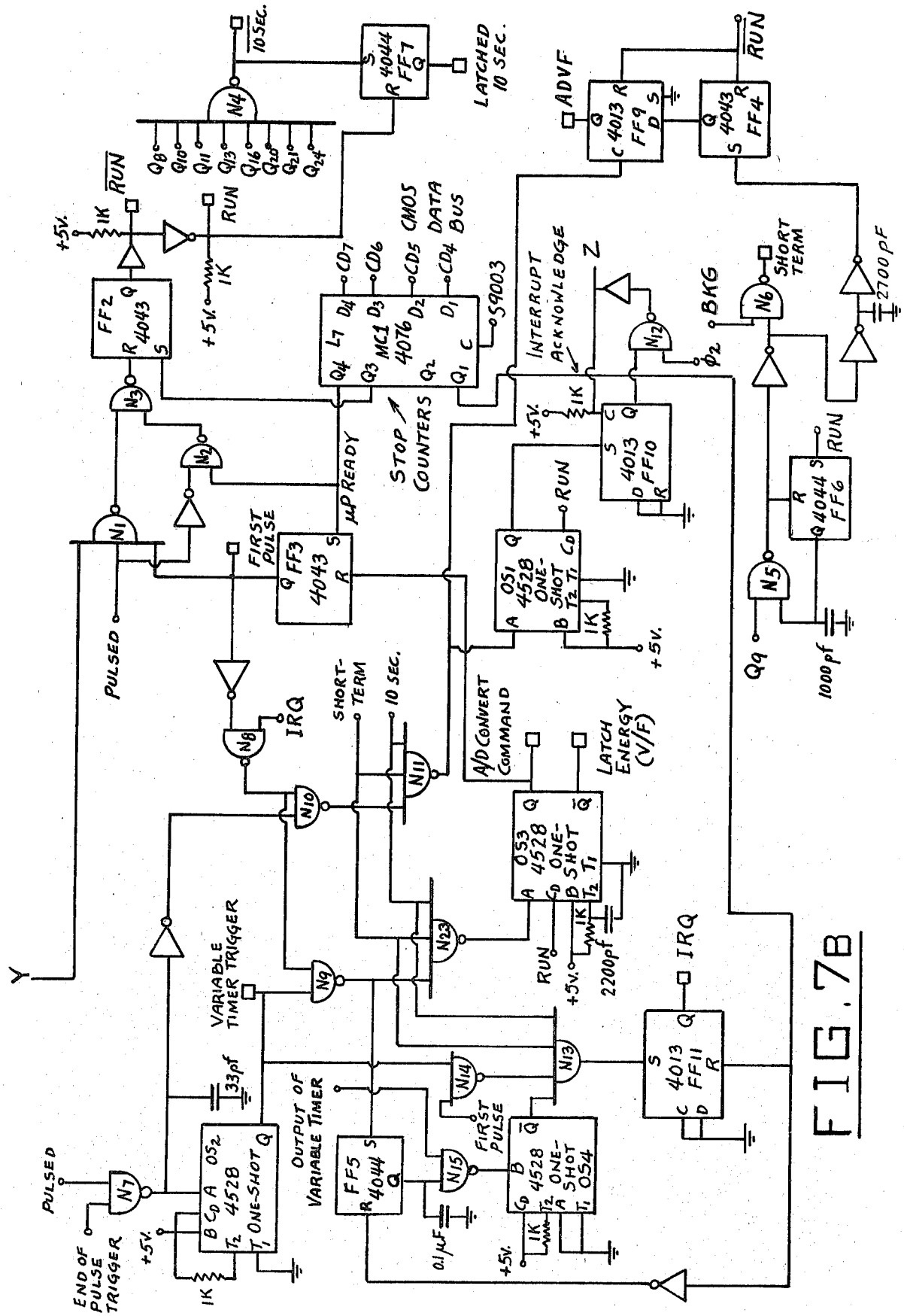

The time counter and timing control circuitry appears in FIGS. 7A and 7B. When a measurement is requested from the frontpanel controls (shown at 32) the measurement period is initiated by the microprocessor by pulsing the "$\mu$P ready" line (see FIG. 7B). The MC14076B latch $L_7$ is used as an output port. Data is strobed into $L_7$ from the CMOS data bus when memory location 9003 (hexadecimal) is addressed (see below).

Prior to data accumulation, $FF_2$ (FIG. 7B) is set from turn-on initialization or from the end of the previous run. Thus, $\overline{RUN}$ is a logic "1" and the time and energy counters are reset. In the Calibrate, Background, and CW modes, NAND gate $N_1$ is disabled and $N_2$ is enabled. Therefore the "$\mu$P ready" pulse resets $FF_2$ and the accumulation period begins. In the Pulsed and Each Pulse modes, $N_2$ is disabled. (The Pulsed signal is a logic "1" in both the Pulsed and Each Pulse modes. See FIG. 11). $FF_3$, which was set by the "$\mu$P" pulse, indicates that the next input pulse is the first of the accumulation period. $FF_3$ and the "Pulsed" signal enable $N_1$ so that the next beginning-of-pulse trigger will reset $FF_3$ and begin the accumulation period. $FF_3$ is reset by the first end-of-pulse detected, to indicate that the first pulse has been measured. Once the accumulation period has begun, the time counter, comprised of the three 74LS393 units, shown at 42, increments at a 1 MHz rate. Time and energy data are latched in $L_1 \ldots L_6$ and $L_8 \ldots L_{13}$, respectively, whenever an end-of-pulse, short-term, or 10 sec pulse is detected.

The $\overline{10\text{ sec}}$ signal is generated from the time counter by $N_4$ and exhibits a negative transition (transition from logic "1" to logic "0") when the 10-second accumulation period is over. ($N_4$ detects the binary code represented by 989680 (hex), which corresponds to $10 \times 10^6$ $\mu$sec). $FF_7$, which was reset prior to the measurement period, is set by the $\overline{10\text{ sec}}$ signal to ensure that the end of the accumulation will be detected by the microprocessor. Note that flipflops $FF_1 \ldots FF_4$ are contained in a single CD4043 integrated circuit (IC) and are set or reset by logic "1" levels; flipflops $FF_5 \ldots FF_8$ are contained in a single CD4044 IC and are set or reset by logic "0" levels.

The short-term signal exhibits a negative transition at the end of the short-term measurement period. $FF_6$ is initially set prior to the accumulation, and thus $N_5$ is initially enabled. When output $Q_9$ of the time counter goes high, indicating that 256 $\mu$sec of the measurement period have elapsed, $N_5$ resets $FF_6$. The combination of $N_5$ and $FF_6$ behaves as a single pulse generator, which is reset when RUN is a logic "0" and triggered the first time $Q_9$ goes to a logic "1". The 1000 pF capacitor stretches the output pulse width to 1.4 $\mu$sec. The Short-Term signal causes data to be latched in the Calibrate and Background modes only, since the inverted pulse from $N_5$ is gated with the "BKG" signal, which is a logic "1" in the Calibrate and Background modes only (see FIG. 11).

End-of-pulse triggers 41 cause time and energy data to be latched in the Pulsed and Each Pulse modes only. $N_7$ is disabled in any but these modes. Time informaton is latched on the leading edge 39 (positive transition) of the end-of-pulse trigger 41, and energy storage is initiated on the trailing edge 38 (negative transition) of the end-of-pulse trigger 41. Until the end of the first pulse, the output of $N_8$ is forced high by the inverted output of $FF_3$. This ensures that the first end-of-pulse trigger 41 will always cause time and energy data to be latched. However, after the first pulse, $N_9$ and $N_{10}$ are enabled by $N_8$ only when the microprocessor is not being interrupted ($\overline{IRQ}$ is a logic "0"). This prevents data from being destroyed before it is read completely by the microcomputer.

Figure 8:
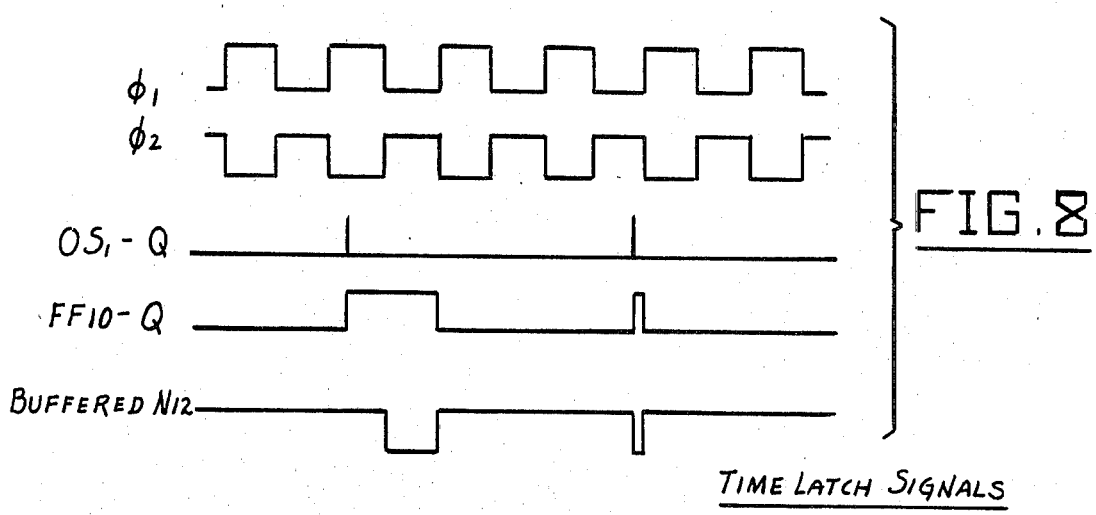
FIG. 8 illustrates wave forms showing the time latch signals developed in the laser meter.

Time information is latched in $L_1 \ldots L_6$ when any input to $N_{11}$ goes low. This occurs in response to either the short-term signal, the $\overline{10\text{ sec}}$ signal, or the leading edge 39 of the end-of-pulse trigger 41 (provided $N_7$ and $N_8$ are enabled). A negative transition on one of the inputs to $N_{11}$ causes $N_{11}$ to trigger one-shot $OS_1$, which in turn sets $FF_{10}$ with a pulse several hundred nanoseconds wide. $FF_{10}$ then enables $N_{12}$ to output one negative and one positive transition, where the positive transition is in phase with the $\phi_1$ clock (see FIG. 8). The positive transition of the output signal of $N_{12}$ clocks data into latches $L_1 \ldots L_6$ and clocks a zero into $FF_{10}$. Since the time counter increments on negative transitions of $\phi_1$, 500 nsec is allowed for all 24 bits of the counter to settle before the data are latched. (The actual propagation delay between $\phi_1$ and $Q_{24}$ of the time counter is approximately 300 nsec).

When $N_7$ is enabled, the trailing edge 38 of the end-of-pulse trigger 41 causes one-shot $OS_2$ to output a pulse several hundred nanoseconds wide. $N_9$ gates the output pulse of $OS_2$ in the same manner that $N_{10}$ gates the inverted output of $N_7$. The output of $N_{23}$ duplicates the output of $N_{11}$ in response to the short-term and $\overline{10\text{ sec}}$ signals; however, it outputs a pulse in response to the trailing edge 38 rather than the leading edge 39 of the end-of-pulse trigger 41. The output of $N_{23}$ triggers one-shot $OS_3$, which resets the "First Pulse" flipflop $FF_3$, causes long-term energy data to be stored in latches $L_8$ ... $L_{13}$ (see FIG. 9), and triggers the A/D to begin conversion for input of energy data from the short-term measurement section.

The ADVF signal (the output of $FF_9$) is a logic "0" if data stored in the latches were acquired at $t \leq 256$ μsec and a logic "1" if the data were acquired at $t > 256$ μsec. $FF_4$ and $FF_9$ are both initially reset when the instrument enters a data acquisition mode. $FF_4$ is set by the pulse generated by $N_5$. Two inverters and a capacitor serve to delay the pulse so that $FF_4$ is set after the short-term signal goes high (assuming $N_6$ is enabled). This ensures that the ADVF signal will be a logic "0" when the data latched as a result of the short-term signal is read into the microcomputer. The state of $FF_4$ is clocked into $FF_9$ on each positive transition of the output of $N_{11}$. Thus, whenever the time data are latched in $L_1 \ldots L_6$, the state of the ADVF flipflop is updated to correspond to the relationship between t and 256 μsec at the time the data are latched.

Once time and energy data have been latched, they are read into the microcomputer as determined by the IRQ (interrupt request) signal. $N_{13}$ sets $FF_{11}$ requesting data input to the μC in response to the short-term signal, the $\overline{10 \text{ sec}}$ signal, or the output of $N_{14}$ or $OS_4$.

$N_{14}$ outputs a pulse in response to the output of $OS_2$, corresponding in time to the trailing edge 38 of the end-of-pulse signal 41, whenever it is enabled by the first-pulse signal. This occurs at the end of the first pulse in the Pulsed mode and at the end of every pulse for which time and energy data are accumulated in the Each Pulse mode. A pulsed logic "0" out of $N_{14}$ causes $N_{13}$ to set $FF_{11}$, interrupting the microcomputer.

In the pulsed mode when $N_{15}$ is enabled by the output of $FF_5$, $OS_4$ outputs a pulse several hundred nanoseconds wide in response to a positive transition of the variable-timer output, causing the μC to be interrupted. The variable timer 31 is a retriggerable one-shot triggered by the output of $OS_2$. The variable timer output is normally a logic "1" and goes to a logic "0" when the timer is triggered. $FF_5$ is set by $N_9$ when $N_9$ triggers $OS_3$, and is cleared by the inverted interrupt-acknowledge signal after the time and energy data are read into the μC. The microcomputer 28 requires approximately 50 μsec to read in the data, after which $FF_5$ and the IRQ flipflop ($FF_{11}$) are cleared under μC control by pulsing the interrupt-acknowledge line ($Q_1$ of $L_7$).

The output of $FF_5$ is delayed by a 0.1 μF capacitor so that $N_{15}$ is not enabled before the variable timer 31 is triggered. In the Each Pulse mode, each time and energy sample is read into the μC immediately after it is taken; therefore, $N_{15}$ will be enabled and then disabled before the variable timer output goes high. In the pulsed mode, however, $N_{15}$ is only disabled in this manner when the μC reads in data from the first pulse. Subsequent laser pulses cause $N_{15}$ to be enabled so that the μC will be interrupted each time the variable timer is allowed to time out.

An example of the operation of $N_{15}$ and $OS_4$ is as follows: If a burst of four laser pulses is detected in which the pulse period is 300 μsec, the first pulse data are latched and read into the μC immediately (interrupt in response to $N_{14}$). The variable timer is retriggered and $FF_5$ is set by each end-of-pulse, and the variable-timer output remains low until approximately 450 μsec after the end of the fourth pulse (assuming no additional laser pulses are detected during that 450 μsec). When the variable timer output goes high, $OS_4$ is triggered, the μC is interrupted, and the data latched 450 μsec earlier (cumulative time and energy as of the end of the fourth pulse) will be read into the microcomputer. If additional pulse bursts occur during the Run period and the time between bursts is greater than 56 msec, time and energy data as of the end of each burst are read into the μC in response to $OS_4$. If the time between bursts is less than 56 msec, data will be read in for each burst until the variable timer period expands to be greater than the time between bursts. At the end of the Run period, time and energy samles are taken and the μC is interrupted as determined by the $\overline{10 \text{ sec}}$ signal.

Figure 9:
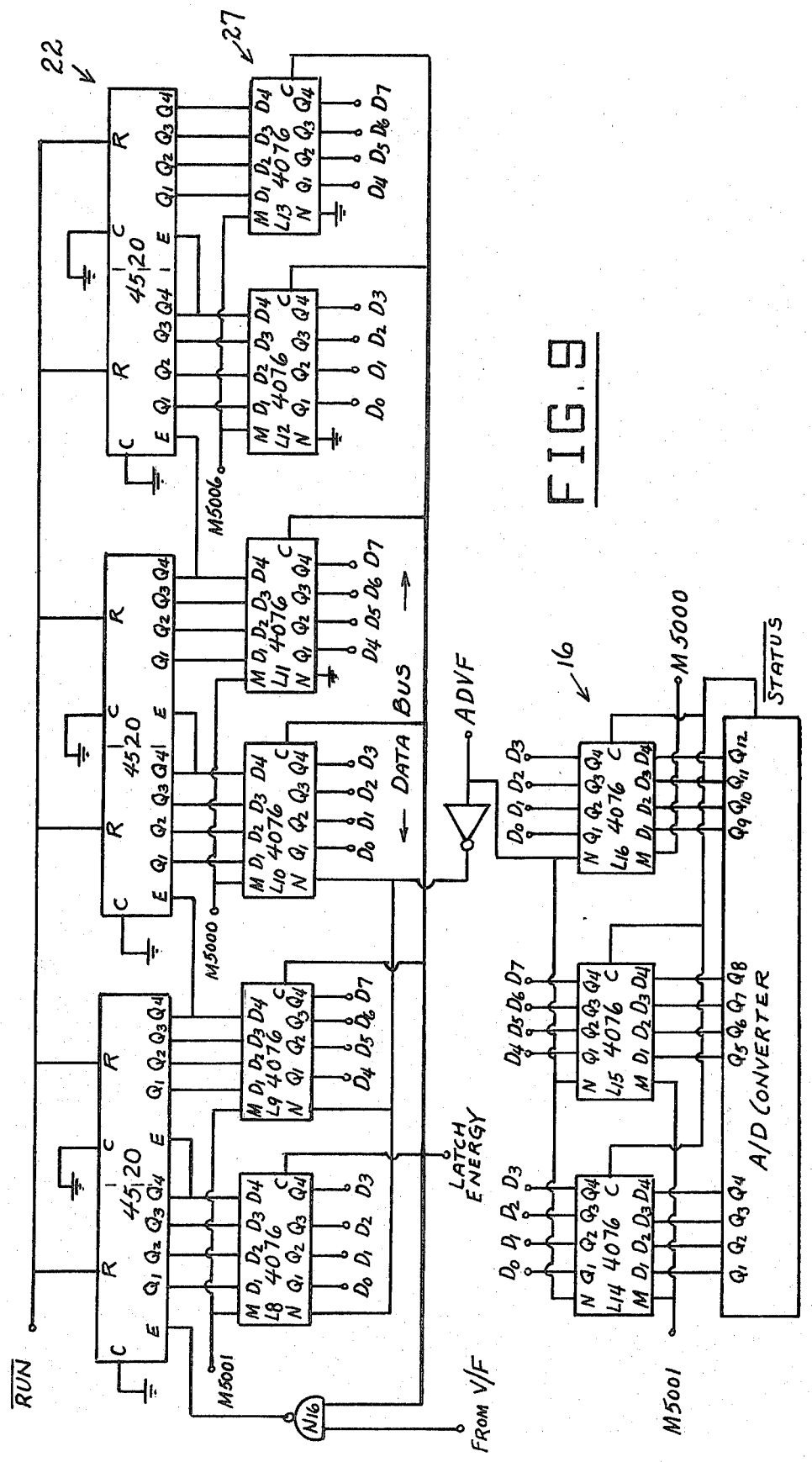
FIG. 9 is a wiring diagram of the energy counters and latches employed in the laser meter.

The energy information read into the microcomputer is accumulated in the circuitry shown in FIG. 9. A 24-bit CMOS counter 22 (comprised of three MC14520s) accumulates energy data from the V/F converter 21. To prevent loss of accuracy, the time counters in FIG. 7A are not halted when data are latched; however, the energy counters are halted by $N_{16}$ while energy data are latched. The 24-bit CMOS counter 22 can require up to 1.8 μsec to settle. The Latch Energy pulse is slightly wider than 2 μsec so that all 24 bits will be settled when the data are clocked into the latches 27. At the end of an optical pulse, the count rate out of the V/F converter 21 is sufficiently low so that the error introduced by disabling $N_{16}$ during the Latch Energy pulse is minimal.

As indicated above, the 12-bit short-term energy data from the A/D 25 is clocked into latches, generally shown at 16, and comprising $L_{14} \ldots L_{16}$, when status goes high at the end of a conversion. When the processor reads energy data from the front-end, the ADVF controls whether the data bus sees the contents of $L_8 \ldots L_{10}$ or $L_{14} \ldots L_{16}$. When ADVF is a logic "0" ($t \leq 256$ μsec) the processor will read data from $L_{14} \ldots L_{16}$, and when ADVF is a logic "1" ($t > 256$ μsec) the processor will read data from $L_8 \ldots L_{10}$. Note that the processor reads data from $L_{11} \ldots L_{13}$ in either case. This is no problem when reading $L_{14} \ldots L_{16}$, since the contents of $L_{11} \ldots L_{13}$ will still be zero after 256 μsec, even at the maximum output frequency of the V/F (1 MHz). Like the time counter, the energy counter remains reset when the instrument is not in the RUN mode.

Figure 10:
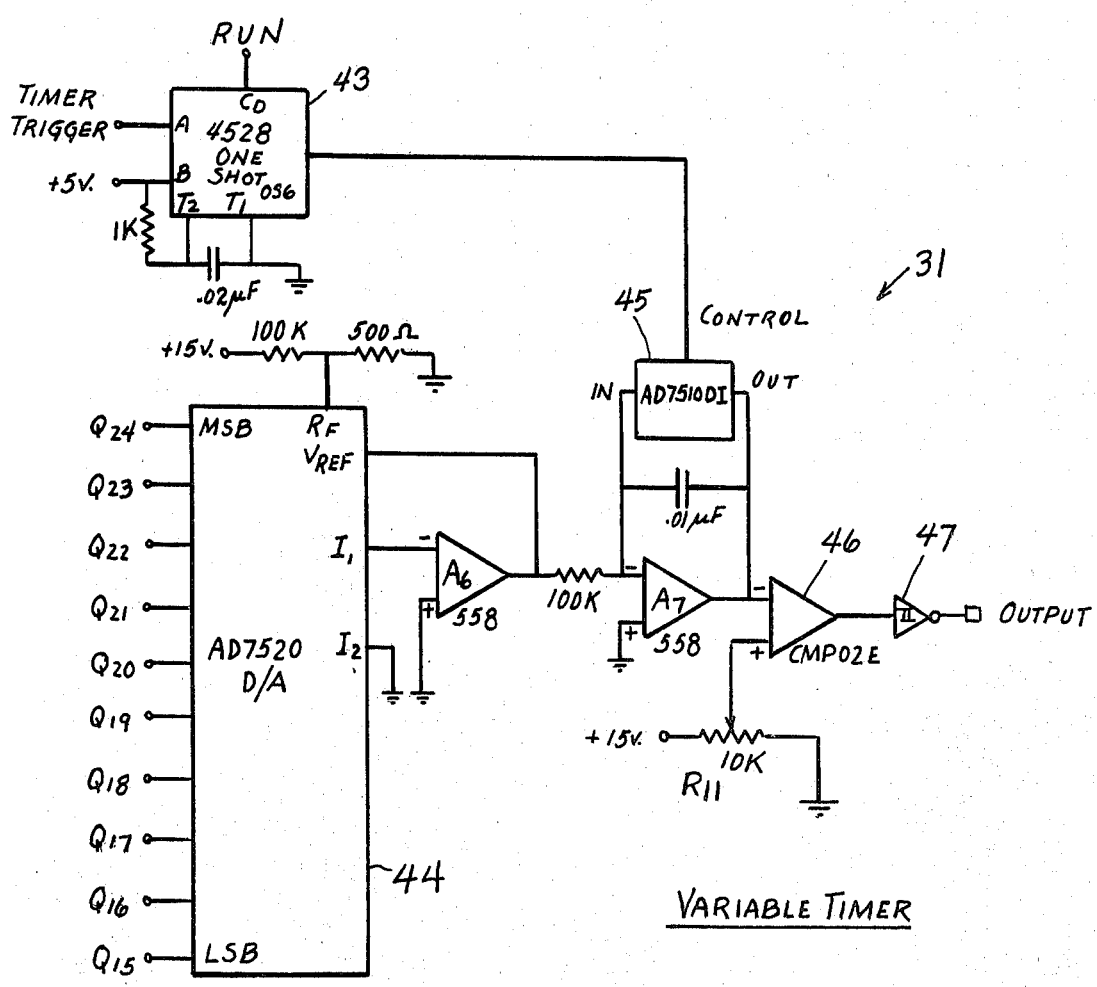
FIG. 10 is a wiring diagram of the variable timer employed in the laser meter.

The schematic diagram of the variable timer 31 appears in FIG. 10. The timer 31 is comprised of a one-shot 43, a D/A (digital-to-analog) converter 44, two operational amplifiers $A_6$, $A_7$, an FET switch 45, a comparator 46, and a Schmitt trigger 47. As in the analog front-end, all resistors and capacitors shown in FIG. 10 are temperature stable, with the exception of those associated with $OS_6$. Amplifier $A_7$ comprises a resettable integrator, which is reset (in the RUN mode) in response to a trigger, by $OS_6$ and the AD7510DI analog switch 45. The output pulse of $OS_6$ is 8 μsec wide, which allows sufficient settling time for the 558 op-amp $A_7$ during reset.

The AD7520 D/A converter 44 appears in the feedback loop of $A_6$ and is driven by outputs $Q_{15} \ldots Q_{24}$ of the time counter 26. In this configuration, the D/A 44 is used as a divider and the voltage gain of $A_6$ is proportional to 1/t. The input voltage to the $A_6$-D/A combination is 15(500/100 K)=75 mV. The gain of $A_6$ is 1024 when the MSB (most-significant bit) is a "1" and the remaining bits are "0". The gain would be 1.0 if all bits could go to logic "1"; however, since the run terminates at 10 seconds, the minimum gain achieved in normal operation is 1.68. When all bits are logic "0", $A_6$ saturates.

The output voltage of $A_6$ is integrated by $A_7$. Thus, the output of $A_7$ is a ramp, the slope of which is inversely proportional to the time into the run. The output of the CMP02E comparator 46 is a logic "1" or a logic "0" when the output of $A_7$ is less than or greater than the voltage on the wiper of $R_{11}$, respectively. $R_{11}$ is set for approximately 6 volts, which results in a timer period of 450 μsec at the beginning and 56 msec at the end of a run. It should be noted that $Q_{15} \ldots Q_{24}$ of the time counter remain zero until 16.4 msec into the run. Thus, the timer period does not vary significantly until several times 16.4 msec into the run. The Schmitt-trigger 47 inverts and squares-up the output of the comparator 46. The variable timer output is thus normally a logic "1" and goes low for the timer period when a trigger occurs.

Experimental measurements made on the variable timer show that the relationship between time into the run and timer period is very close to a straight line for times between 100 msec and 10 sec. The slope of the line is $5.6 \times 10^{-3}$. The number of pulses expected to be input into the microcomputer in 10 seconds by the digital front-end as gated by the variable timer is expected to be $1/(5.6 \times 10^{-3})$ or approximately 178. For periodic input signals, the number of data points read into the processor was determined experimentally to be between 174 and 210 for pulse frequencies between 20 Hz and 2 kHz. The variable timer thus effectively regulates memory space usage in the Pulsed mode. It should be noted that after 100 msec into the run, only pulses closer together than 0.56 percent of the time into the run are interpreted as a single pulse.

Figure 11:
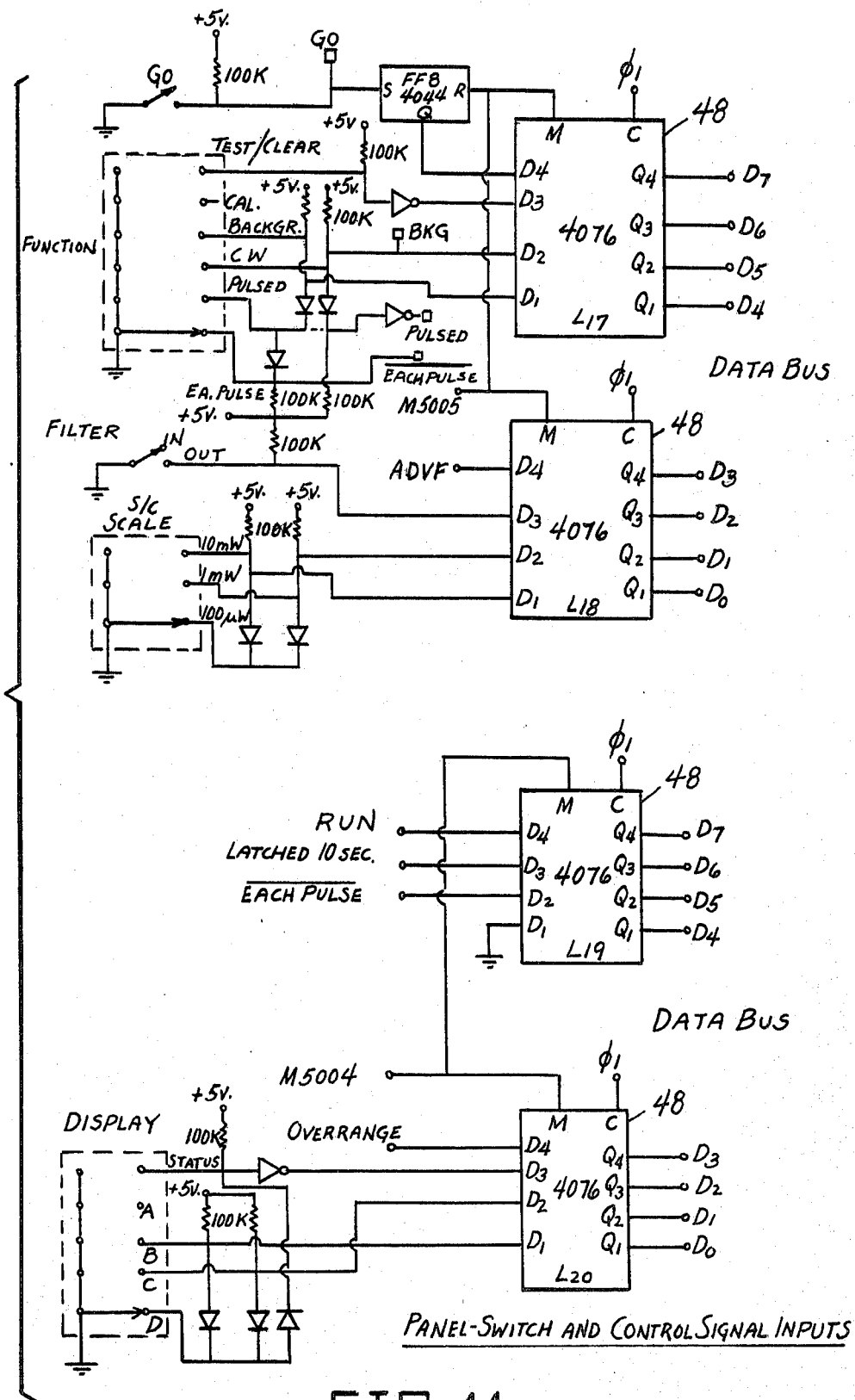
FIG. 11 illustrates wiring diagrams of circuits providing panel-switch and control signal inputs for the laser meter.

The panel-switch settings and the state of signals such as ADVF and RUN are read into the microcomputer by way of latches $L_{17} \ldots L_{20}$, as shown in FIG. 11. The codes read into the microcomputer from the function, filter, scale and display switches are shown below in Table 4. When the processor reads 000 from the function switch, it also checks the Each Pulse signal to determine whether the Pulsed or Each Pulse mode is indicated. The multi-bit switch codes are generated using the diode-resistor logic shown in FIG. 11. To minimize the number of wires between the switches and the circuit board, the diodes shown are mounted directly on the rotary switches.

TABLE 4

| Switch | Panel Switch Coding | |
| --- | --- | --- |
| | Code | Function |
| Function | 000 | Each Pulse or Pulsed |
| | 001 | CW |
| | 010 | Background |
| | 011 | Calibrate |
| | 100 | Test/Clear |
| Filter | 0 | × 10 Filter out |
| | 1 | × 10 Filter in |
| Scale | 00 | 100 μW |
| | 01 | 1 mW |
| | 10 | 10 mW |
| Display | 000 | D |
| | 001 | C |
| | 010 | B |
| | 011 | A |
| | 100 | Status |

The latched Go, RUN, Latched 10 sec, and Overrange signals are all logic "1" when asserted. Each Pulse is a logic "0" when asserted. Again, the ADVF signal is a logic "0" for t ≤ 256 μsec and a logic "1" for t > 256 μsec. $FF_8$ (the Go flipflop) is set by the Go switch and cleared when the setting of the function switch is read by the microcomputer.

Data are input to the microcomputer from the digital frontend by enabling the tristate output of the 4076 latches, which places the data on the microcomputer data bus. The B-series CMOS latches, shown at 16, 17, 27, and 48, have sufficient output current to drive the data bus. The latch outputs are enabled by the M5000 ... M5007 signals, which are generated by the address decoder. The 500X corresponds to the address output by the microcomputer when reading in the data.

Display Circuitry

Figures 12, 12A, 12B:
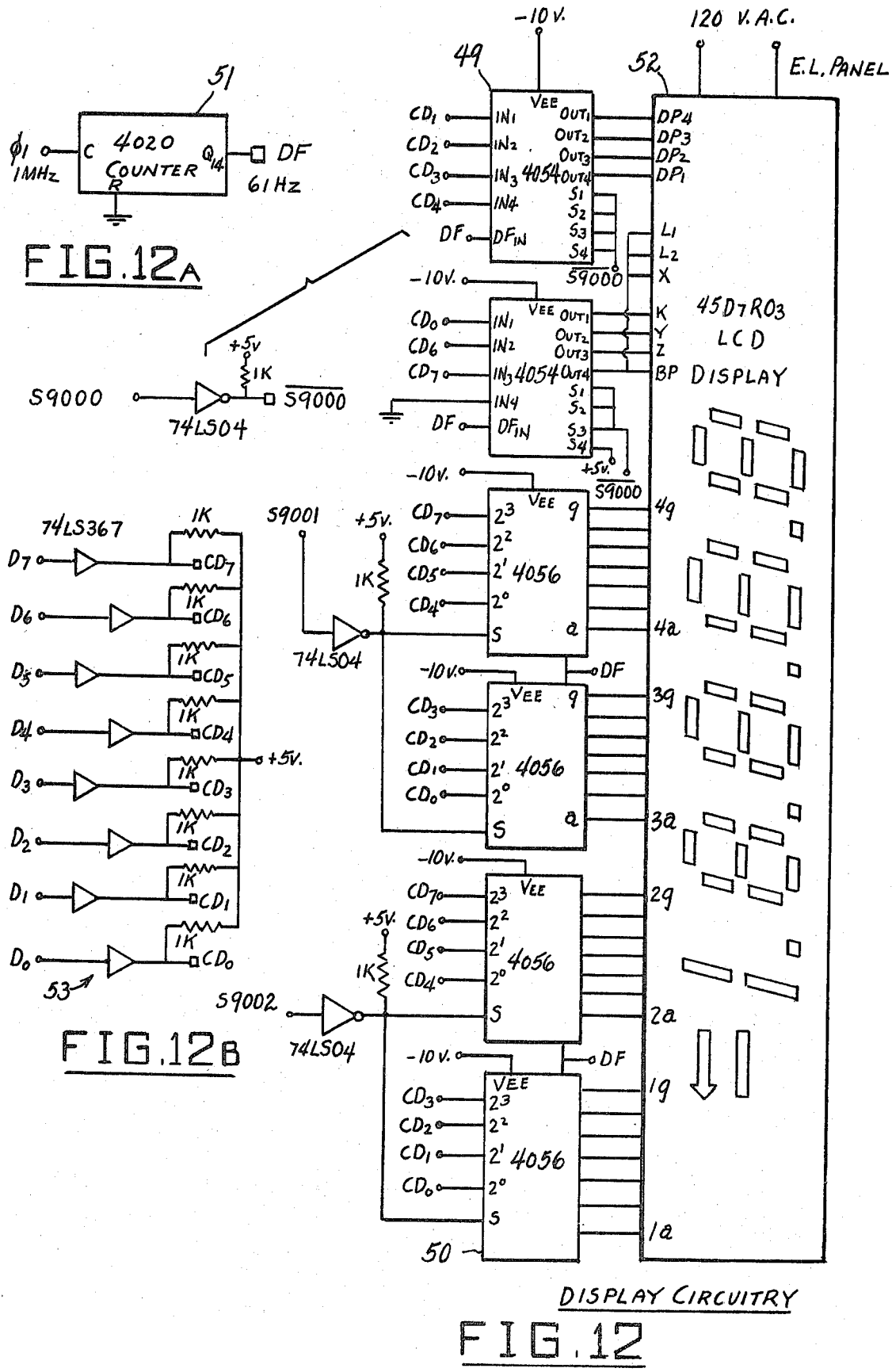
FIGS. 12, 12A and 12B are wiring diagrams of the display circuitry employed in the laser meter.

The liquid crystal display is driven by, and displays the contents of two CD4054 latch drivers 49 and four CD4056 latch/LCD drivers 50 (FIG. 12). The backplane is driven between +5 and −10 volts at the 61 Hz DF frequency generated by the MC14020 counter 51 shown in FIG. 12A. Segments of the display are transparent when driven in phase and opaque when driven out of phase with the backplane drive signal. The 45D7R03 LCD 52 provides good legibility with low power consumption. An electroluminescent panel behind the LCD is powered by 120 Vac and provides green backlighting so that the data display is visible if data are taken in a dimly lit environment.

The four rightmost characters of the display are output two characters at a time when the processor stores data in the CD4056s, configured at locations 9001 and 9002. This is accomplished using a CMOS replica of the microcomputer data bus ($CD_0 \ldots CD_7$), generated by 74LS367 buffers 53 and 1 k pullup resistors. The CD4056 drivers 50 each contains a 4-bit latch, a binary-to-seven-segment decoder, and segment drivers. When location 9001 or 9002 is addressed by the microcomputer, a store pulse is generated by the address decoder to strobe the appropriate latches. The decimal point location, minus sign, overflow indication, and half-digit are all coded in location 9000, as shown in FIG. 13. Data output by the microcomputer to the CD4054 latch drivers 49, configured at location 9000, are stored in the internal latches of the CD4054 display drivers 49.

Microcomputer Hardware

Figure 14:
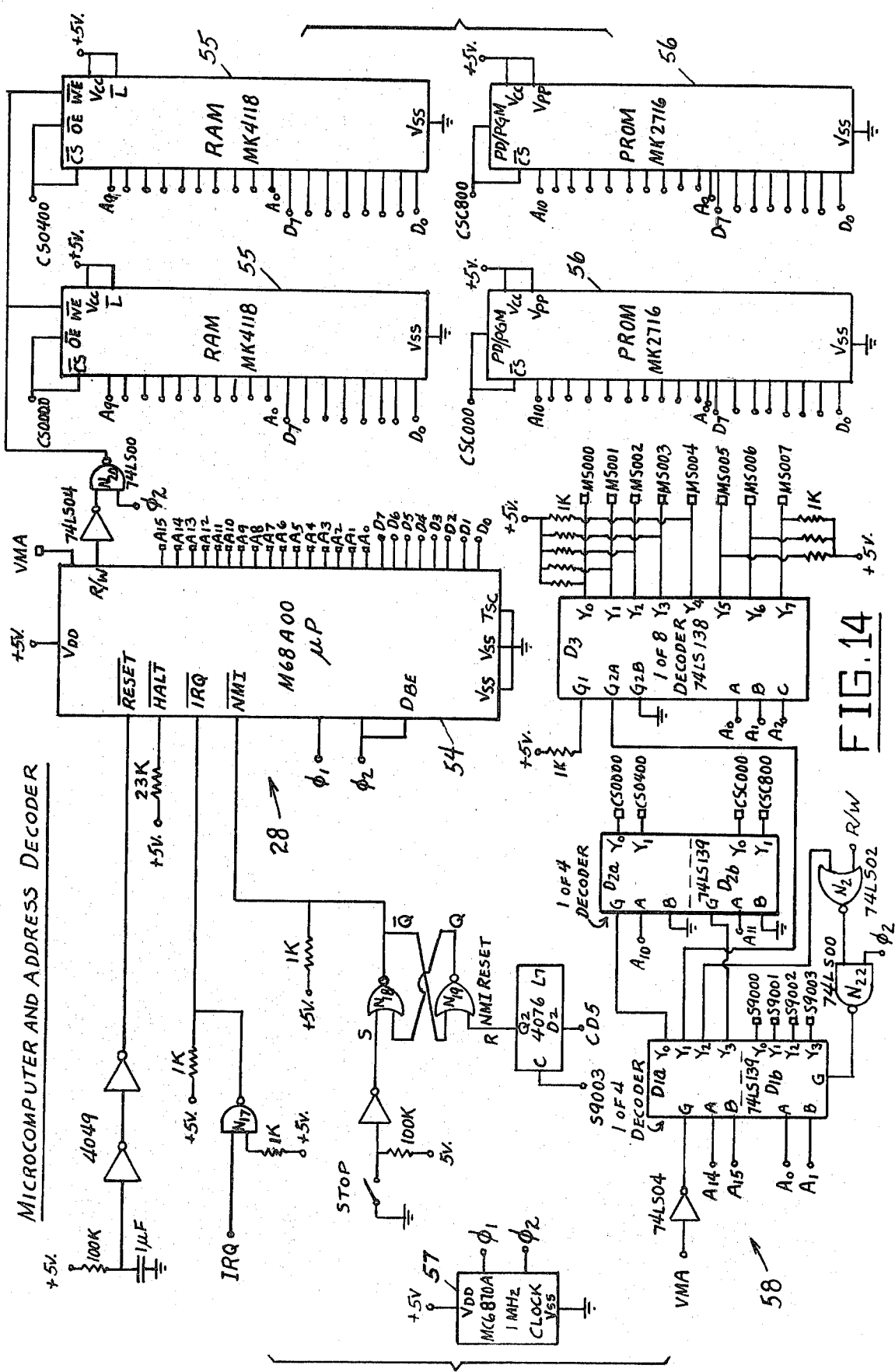
FIG. 14 is a wiring diagram of the microcomputer and address decoder circuits employed in the laser meter.

The microcomputer 28 is comprised of an M68A00 microprocessor 54, two MK4118N-4 1 k×8 random access memories (RAM) 55, two MK2716T-7 2K×8 U-V erasable, programmable, read-only memories (EPROM) 56, and MC6870A 1 MHz crystal oscillator 57 (FIG. 14). The address ($A_0 \ldots A_{15}$), data ($D_0 \ldots D_7$), and control lines are connected as indicated in the figure. The halt line of the processor is tied high with a pullup resistor so that the processor may be halted by a clip-on logic analyzer probe during troubleshooting. The interrupt signal from the interrupt latch ($FF_{11}$ in FIG. 7B) is inverted by $N_{17}$, a 74LS00, to provide the proper signal polarity and sink current for the $\overline{IRQ}$ input of the microprocessor. The NMI input is driven by $N_{18}$, which is a 74LS02. $N_{18}$ and $N_{19}$ are wired as a latch that is set by the Stop switch and cleared from the microcomputer by pulsing the NMI reset line ($Q_2$ of $L_7$, see FIG. 7B). An RC circuit on the $\overline{RESET}$ input of the processor holds the $\overline{RESET}$ line low for multiple machine cycles after a power-up. The RC stage is buffered by CMOS inverters to reduce loading effects on the time constant and to square up the signal. The R/W signal from the microprocessor is NANDed with $\phi_2$ to provide the timing for the WE (write-enable) input of the MK4118 random access memories 55.

Address Decoder

Figure 3:
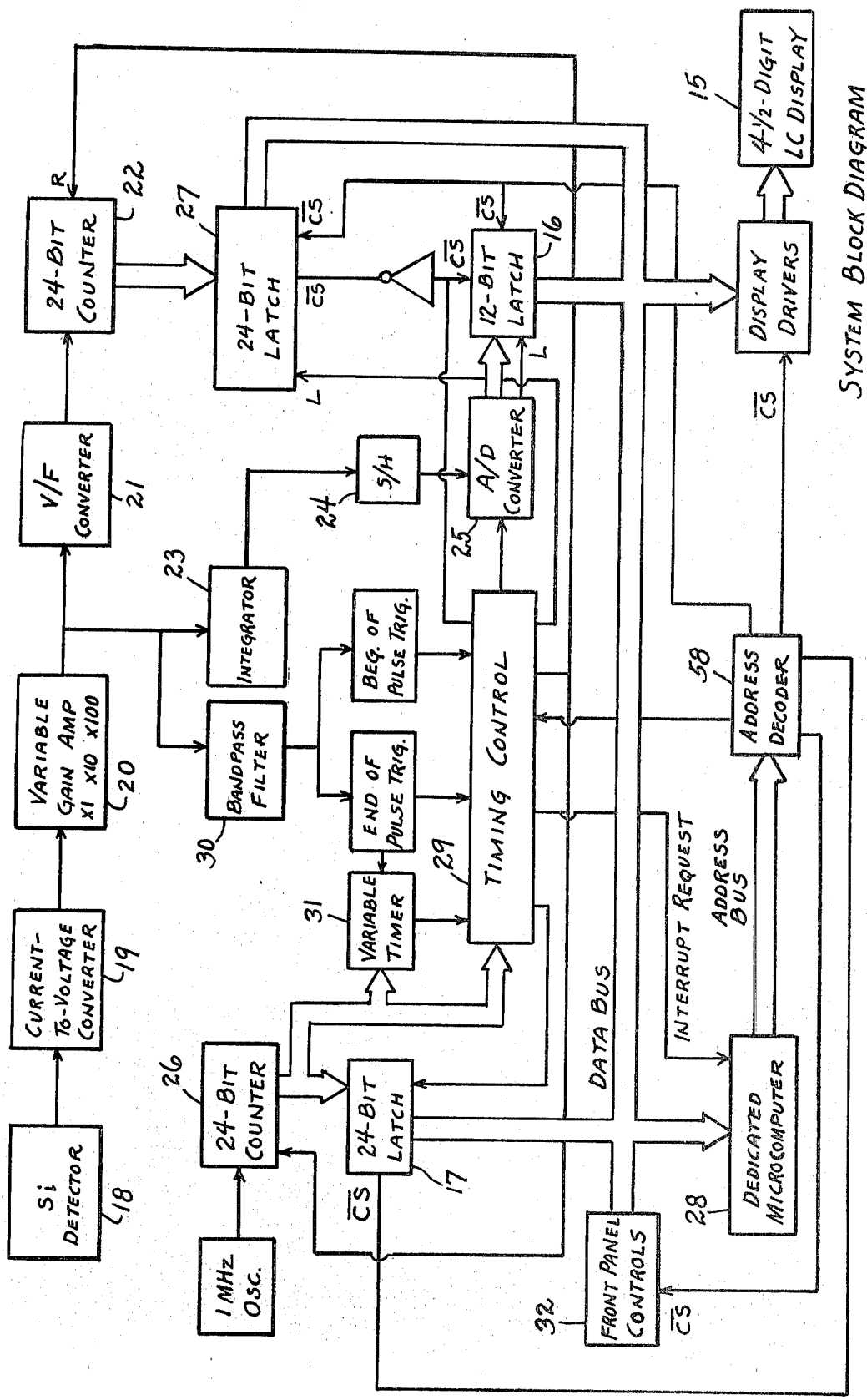
FIG. 3 is a system block diagram of the laser meter.

The address decoder, shown at 58 in FIGS. 3 and 14, is comprised of 74LS138 and 74LS139 decoders $D_3$, $D_{1a}$, $D_{1b}$, $D_{2a}$, $D_{2b}$ and gates $N_{21}$ and $N_{22}$ (FIG. 14). LSTTL is used for speed in address decoding. Decoder $D_{1a}$ is used to partition the microcomputer memory into four segments: RAM, input, output and ROM (FIG. 15). When $A_{15}A_{14}$ is 00, $Y_0$ goes low, enabling $D_{2a}$. Chip selects for the two RAM ICs are then decoded further from $A_{10}$. When $A_{15}A_{14}$ is 01, $D_3$ is enabled and data input strobes M5000 . . . M5007 are decoded from address bits $A_2$, $A_1$ and $A_0$.

A code of 10 on address lines $A_{15}$ and $A_{14}$ enables $D_{1b}$ when R/W is low and $\phi_2$ is high. It is necessary to gate $Y_2$ of $D_{1a}$ with R/W and $\phi_2$ in order to assure proper timing for data storage in the 4054, 4056 and 4076 latches. This is important, since the S9000 . . . S9003 signals, which are decoded from $A_1$ and $A_0$, are used to clock data from the CMOS data bus into the appropriate latches. When $A_{15}A_{14}$ is 11, $D_{2b}$ is enabled. Chip selects for the two EPROMs are then decoded from $A_{11}$ by $D_{2b}$.

The addresses are assigned so that there would be no interference with memory resident in the software development facility used in writing and testing the laser meter program. For this reason, several don't-care bits are assigned to logic "1" in the input and output address designations (FIG. 16). Hexidecimal notation is used throughout in referring to the address of memory locations.

System Software

The laser meter program occupies less than $3\frac{1}{2}$ k of ROM. General-purpose subroutines provide such functions as basic arithmetic, square-root, and format conversion. The routines specific to the laser meter read data from the latches designated M5000 through M5007, process the data, and store the results in the display circuitry located from S9000 through S9002. Program listings of routines referred to herein may be found in the Appendix. The laser meter software was written with extensive use of subroutines. Thus, the major routines consist largely of subroutine calls.

Numerical data are processed using the binary floating-point format shown in FIG. 17. Three bytes are used to represent each number: 1 byte for the two's complement exponent, 1 sign bit, and 15 bits for the straight-binary mantissa. The mantissa is always normalized such that the most significant bit is a "1" except for the number zero, which is represented as 80 0000(+0) or 80 8000(−0). (All floating-point binary numbers in this discussion are represented in hexadecimal (HEX) notation). The binary point is assumed to be to the left of the most significant mantissa bit. As a result, the (non-zero) mantissa alone represents a fraction between 0.50 and 0.99997 (decimal). This floating-point format provides a dynamic range of $10^{-38}$ to $10^{+38}$ and a resolution of 0.00305 percent (1 part in 32,768).

Several examples of binary floating-point numbers (represented in HEX) are presented in Table 5. The laser meter program converts input binary integer data to this format. Data are converted to engineering-notation BCD for display only.

TABLE 5

| Examples of Binary Floating-point Format | |
|---|---|
| Floating-point notation | Decimal Equivalent |
| 80 0000 | 0.0000 |
| 01 4000 | 1.0000 |
| 01 C000 | −1.0000 |
| 00 4000 | 0.5000 |
| 00 6000 | 0.7500 |
| FA 51EC | 0.0100 |
| F0 53E3 | $1.0000 \times 10^{-5}$ |
| 04 5000 | 10.000 |
| 07 6400 | 100.00 |
| 22 4A81 | $1.0000 \times 10^{10}$ |

Main Program

The laser meter main program is procedure RESET3, which is entered at power-on. It is a continuous loop that monitors the display function switches, displays the appropriate quantity, executes the function indicated and loops back to display.

RESET3 begins by setting the stack pointer to the top of RAM and executing the Test/Clear function by calling procedure TEST (see below). It then initializes the calibration factors to 1.0, and checks the setting of the display switch. If status information is desired, the contents of the status register are output to the display. If numerical data are selected, the parameter selected by the display is passed to subroutine BCDC3 and there converted to engineering-notation BCD (see above, under "System Software"). Subroutine DSPLY3 is then called, which outputs one display cycle of BCD data in the manner described above under "General Considerations".

After displaying one value, the processor checks the state of the Go flipflop. If it is a logic "0", the display switch is read and another display cycle initiated. If the output of the Go flipflop is a logic "1", the function switch is read, and the indicated function is executed. If the desired function is Test/Clear, the program loops back to the beginning. Otherwise, a data input subroutine is called (INPUT4 for Each Pulse or INPUT3 for Calibrate, Background, CW, or Pulsed). Once the data have been accumulated, it is converted to floating-point by subroutine IFLOAT.

Data processing is performed on the floating-point input data as determined by the setting of the function switch upon the initiation of the measurement. Data accumulated in either the CW, Pulsed, or Each Pulse mode are processed by subroutine MEAS. Data accumulated in the Calibrate and Background modes are processed by subroutines CAL3 and BKGND, respectively. The results are stored in registers corresponding to display-switch settings A, B, C, and D, and the program loops back to read the display switch setting.

Function Subroutines

The subroutines that execute major functional operations are TEST, which executes the Test/Clear function; INPUT4, which reads in data in the Each Pulse mode; and INPUT3, which reads data in the Calibrate, Background, CW, and Pulsed modes. This section discusses these routines and the subroutines they call.

Subroutines TEST provides a means for the operator to check the operation of the liquid crystal display and tests RAM and ROM memory for proper operation, as described above under "TEST/CLEAR". After the display test is performed, TEST calls TRAM, which tests RAM by storing FF, AA, 55 and 00 (as determined by subroutine GENTP) in each RAM location except location 00 and the stack. After a code is stored in a location, the location is read and compared to the stored code. If any one location fails on any one code, an error flag is set in location 00. (Location 00 is always cleared by RESET3 prior to a call to TEST.). Since the last code stored in each location is 00, TRAM has the effect of clearing locations 01 through 07EF.

Regardless of the results of TRAM, TEST proceeds by calling TROM, which tests ROM in 1 k blocks. A checksum resides in the first location of each 1 k block (locations C000, C400, C800 and CC00). The subroutine sums all bytes of one memory block except the first (ignoring carry) and compares the result to the checksum. If the sum does not equal the checksum, the appropriate error flag is set in location 00. This procedure repeats until all four 1 k blocks have been tested. It should be noted that FF was stored in all unused locations of EPROM for two reasons: (1) so that the checksum will be consistent and not be dependent on the random contents of unused locations, and (2) so that unused locations could be filled at a later data without erasing the entire ROM.

Upon return from TROM, TEST checks location 00 to see if any error flags are set. If a RAM error is detected, SL— — is stored in the status register. If no RAM error is detected but a ROM error is detected, SH— — is stored in the status register. If no errors are detected, S— — — is returned in the status register when control flows back to RESET3.

A subroutine call to INPUT4 is made by RESET3 when a measurement in the Each Pulse mode is initiated from the front panel. INPUT4 begins by storing — — — — in the display and reinitializing the status register to S— — —. It sets a flag to identify the data-acquisition phase of the Each Pulse mode of NMI3, the non-maskable interrupt handling routine. Pointers are set up for storage of short-term and long-term measurement section data. INPUT4 then pulses the Stop Counters line, the Interrupt Acknowledge line, the NMI flip-flop Reset line, and finally, the Ready line. When the first trigger is detected, A— — — is stored in the display and INPUT4 waits for an interrupt.

The routine that handles interrupt requests (in response to the IRQ input) is INTER3. It reads time and energy data from the digital front-end and stores it temporarily until INPUT4 can file it in the appropriate array. INTER3 checks the status of the ADVF line and keeps count of the number of data points input from the A/D. The dead-time of the front end is minimized by using the wait-for-interrupt instruction to enter INTER3 and by minimizing the time necessary to read in the data and acknowledge the interrupt.

When INTER3 returns control to INPUT4, the interrupt mask is set so that a new data sample is not accepted until the most recent sample is stored properly. The front end is also taken out of the RUN mode (by pulsing the Stop Counters line) in order to reset the counters for measurement of the next pulse. Data stored temporarily by INTER3 is placed in either the short-term or the long-term array as indicated by the ADVF signal. Memory locations 0100 through 06FF are reserved for storage of input data. The short-term array is filled from location 0100 upward and the long-term array is filled from location 06FF downward. Each data sample occupies six locations. Initially the time and energy data are both in the form of 24-bit binary integers. Each integer in each array is replaced by its 3-byte floating-point equivalent by subroutine IFLOAT.

After a data sample has been stored, INPUT4 checks the setting of the scale and filter switches. If a change has occurred since the beginning of the measurement, the error is indicated as A— —S on the display and S— —S in the status register. If the overrange flipflop is set, A—O— is displayed and S—O— is stored. INPUT4 then sets up the front-end to process the next pulse. The entire process repeats until the long-term and short-term arrays are about to overlap. At that point, data input ceases. The long-term array is shifted down in memory to eliminate any empty space between it and the short-term array. If the data acquisition phase terminates normally, the data will be shifted by exactly six locations (one data sample). If the Stop switch is used to terminate a measurement, however, there may be many unused locations between the two arrays. Repacking the data permits the output of INPUT4 to be processed in the same manner as data from a 10-second run accumulated by INPUT3. After repacking the data, INPUT4 stores P— — — in the display to indicate that the data are being processed (assuming no scale or overrange error) and returns to control to RESET3.

Subroutine INPUT3 is called by RESET3 when the Calibrate, Background, CW, or Pulsed function is initiated from the front panel. It also begins by storing — — — in the display and S— — — in the status register, setting up the front-end, and waiting for the first trigger. However, INPUT3 does not stop the counters between measurements; it terminates only after the measurement has proceeded for 10 seconds. In the Calibrate, Background, and CW modes, the measurement begins when INPUT3 pulses the ready line. In the Pulsed mode, the measurement begins when a trigger is detected. A— — — is displayed in either case when the measurement period begins.

Data are input to INPUT3 by INTER3 in the same manner as data input to INPUT4. However, all the data samples are stored sequentially in memory, beginning at location 0100. In the Calibrate and Background modes, two samples are taken: one at 256 $\mu$sec and one at 10 seconds. In the CW mode, only one sample is taken at 10 seconds. The number of samples read in the Pulsed mode is limited by the variable timer to approximately 200. If the variable timer malfunctions and the number of samples read into the microcomputer overflows the available memory storage capacity, INPUT3 stores PS— — in the display and SS— — in the status register. A counter maintained by INPUT3 accumulates the number of data samples input from the A/D. This information is passed to subroutine MEAS for proper processing of the data. After each sample is read, INPUT3 also checks the setting of the scale and filter switches and the state of the overrange flipflop and indicates errors in the same manner as INPUT4.

Data input terminates when the memory space error occurs or INPUT3 detects a logic "1" on the Latched 10-second line. The counters are stopped (and reset) after the data point for 10 seconds has been read in. INPUT3 then stores P— — — in the display (assuming no errors) and returns control to RESET3.

When control returns from INPUT3 or INPUT4, RESET3 converts the data from 24-bit integer to floating-point numbers by calling subroutine IFLOAT. This routine is described below. RESET3 then calls the appropriate data processing routine, as determined by the setting of the function switch at the beginning of the data acquisition period.

Data Processing Subroutines

Once input data have been converted to floating-point notation, a subroutine call is made to either CAL3, BKGND, or MEAS. CAL3 and BKGND perform the required calculations in the Calibrate and Background modes, respectively. MEAS processes data accumulated in either the Each Pulse, Pulsed, or CW mode. If the Class I limit is not exceeded to 10 seconds, control flows to procedure TXEED, which extrapolates the time to exceed Class I from the sample taken at 10 seconds.

CAL3 and BKGND are sufficiently similar that they are written as a single routine with two entry points and occasional branches where the functions differ. Both assume that two data points have been read into memory, as described above under "Function Subroutines". The first loop through either routine processes the A/D (short-term) data and the second pass through the loop processes the V/F (long-term) data. For the purpose of this discussion, however, CAL3 and BKGND will be considered separately.

CAL3 determines the average power of both the short-term and long-term data, subtracts background, and computes the correction factors $C_S$ and $C_L$ from the known average power of the calibration source. CAL3 begins by initializing $C_S$ and $C_L$ to 1.0. It then calls subroutine TSCALE, which converts the input time counts to seconds by dividing by $1.0 \times 10^6$ μsec/sec. The time measurement from the first data sample is stored in display register A. The first energy sample is then converted from counts to Joules by subroutine ESCALE.

ESCALE converts energy data from counts to Joules using the scale and measurement-section information acquired with the data. The routine beings by dividing the energy counts by the conversion factor for the 100 μW scale: $1.6 \times 10^{11}$ for A/D and $1.0 \times 10^{10}$ for V/F data. (The gain of the short-term measurement section is a factor of 16 greater than the gain of the long-term measurement section.). The result is then multiplied by 10, 100, or 1000, as determined by the stored settings of the scale and filter switches. The data are then multiplied by the appropriate correction factor ($C_S$ or $C_L$), as indicated by the measurement-section information.

Upon return from ESCALE, CAL3 finds the average power in watts by dividing the energy by the time. The background average power $b_S$ or $b_L$ is then subtracted and the result divided into 75 μW to determine the new correction factors $C_S$ and $C_L$, which are stored in locations reserved for $C_S$ and $C_L$ and in display registers B and D, respectively. Control then flows to procedure TXEED, where the time at which a 75-μW laser would exceed the Class I limit is determined and stored in display register C.

BKGND recomputes the background average power constants $b_S$ and $b_L$ from the measured data. As in CAL3, BKGND begins by calling TSCALE, storing the results (for the A/D data) in display register A, calling ESCALE, and computing average power for the two input data samples. It should be noted that when ESCALE is called by BKGND, the calibration factors are not initialized to 1.0. Thus, the values from prior computation or initialization are used. Also, there is no subtraction of prior background measurements in the Background mode.

The average power computed by BKGND for the two input data samples is stored in the locations reserved for $b_S$ and $b_L$. The energy used to compute $b_S$ and $b_L$ is stored in display registers B and D, respectively. BKGND finally transfers control to procedure TXEED, where the time at which a laser having the same average power as the background would exceed the Class I limit is determined and stored in display register C.

Subroutine MEAS processes data accumulated in the CW, Pulsed, and Each Pulse modes. The number of data points to be processed is not assumed (as in CAL3 and BKGND) but is indicated by an end-of-array pointer that is input to MEAS with the data. A counter also input with the data indicates the number of data points in the array that were read in from the A/D. The remaining data points are assumed to have been read from the V/F.

For each input sample $(t_i, E(t_i))$, MEAS calls TSCALE and ESCALE to convert from counts to seconds and Joules. Again, ESCALE uses the measurement-section and scale information to compute energy in Joules and then multiplies by the appropriate correction factor. MEAS then computes the background energy in time $t_i$ from either $b_S$ or $b_L$ and subtracts this from the corrected energy sample to yield $E'(t_i) = C_K E(t_i) - B_K(t_i)$, where K=S or L as appropriate. For the first entry in the array, the computed $t_i$ is stored in display register A and $E'(t_i)$ is stored in display register B. As stated previously, the first entry in the array will be (10 sec, E(10 sec)) in the CW mode, $(t_1, E(t_1))$ in the Pulsed mode, and either $(t_J, E(t_J))$ or $(t_N, E(t_N))$ in the Each Pulse mode, where J is the first A/D sample and N is the last V/F sample (see above under "Each Pulse").

For each data sample, MEAS first compares the time to 20 μsec. If $t_i \leq 20$ μsec, $E'(t_i)$ is compared to the Class I limit for 20 μsec, 0.2 microjoules. If $t_i > 20$ μsec, $t_i$ is compared to 10 seconds. If $t_i \geq 10$ seconds, control flows to procedur TXEED (see below). For 20 μsec $< t_i < 10$ sec, the Class I energy limit for exposure time $t_i$ is computed as follows: $E = 7.0 \times 10^{-4} t_i^{\frac{1}{3}}$. The first data sample found to exceed the Class I limit results in an exit from subroutine MEAS. Before exiting, MEAS stores $t_i$ for the offending sample in display register C and fills display register D according to the measurement mode. In the CW and Pulsed modes, MEAS uses the end-of-array pointer to locate the energy of the final sample (which is assumed to be taken at 10 seconds). The sample is processed and the resulting total energy in 10 seconds is stored in display register D. In the Each Pulse mode, display register D is filled with the energy of the pulse that exceeded the Class I limit. If no pulse is found to exceed the limit in this mode, zero is stored in display register D.

Control flows to procedure TXEED when $t_i = 10$ seconds is encountered and no sample has exceeded the Class I limit. TXEED computes the average power, E'(10 sec)/10 sec and divides it into the Class I limit for 10 sec $\leq$ t $\leq 10^4$ sec, which is 3.9 mJ. The result is the extrapolated time to exceed Class I. If the computed time is greater than $10^4$ sec, $10^4$ sec is stored in display register C. If the computed time is less than 10 seconds, the time to exceed Class I is recomputed by solving $P_{ave}t = 7.0 \times 10^{-4} t^{\frac{1}{3}}$ for t, as described above under "CW". As indicated above under "CW", if the computed time is between ¼ second and 10 seconds, the time is stored in display register C. If the time is less than ¼ second, the time stored in display register C is zero and the laser is considered to exceed Class I for any exposure duration.

Format Conversion Subroutines

Format conversion subroutines are used to convert numerical data from binary integers to floating-point numbers and from floating-point numbers to BCD engineering notation for display. The subroutines that perform these conversions are IFLOAT, FLOAT3, and BCDC3.

Subroutine FLOAT3 converts a single 24-bit binary integer to the floating-point format described above under "System Software". It shifts the integer so that its most significant nonzero bit will appear in the most-significant-bit position of the second floating-point byte and adjusts the exponent byte accordingly. Any nonzero remainder beyond the 15 bits of floating-point mantissa is rounded off using subroutine ROUND2 (see below).

Subroutine IFLOAT converts the array of input data samples from 24-bit integers to floating-point numbers by calling subroutine FLOAT3. Each integer is replaced in the array by its floating-point equivalent. IFLOAT returns control to RESET3 when all samples have been converted, which is determined from the end-of-array pointer.

BCDC3 inputs one 3-byte floating-point number and outputs a 6-byte engineering-notation BCD number that is suitable for storage in the display drivers in two installments (for display phases 1 and 2). The routine first determines if the input number is zero. If so, 0.00 10 00 is stored for display. If not, the routine initializes the power of ten to zero and checks to see if the input is between 1.0 and 1000. The actual binary-to-BCD conversion that forms the mantissa (display phase 1) is performed on numbers in this range. If the input number is larger than 999.9, it is divided by 1000 and the power of 10 increased by 3. If the number is smaller than 1.0, the code to display a negative power of 10 is stored for display phase 2 (i.e. 10-XX), the number is multiplied by 1000, and the power of 10 is increased by 3. This process iterates until the number arrives within the range of 1.0 to 999.9. The power of ten is converted to BCD automatically in the microprocessor by the use of the decimal-adjust instruction.

To this point, the power of ten has been computed in multiples of 3, appropriate to engineering notation, so that the mantissa is a number between 1.0 and 1000. In the next step, BCD3 multiplies this number by 1.0, 10, or 100 in order to place the number in the range 100 to 999.9. In this step, the location of the decimal point is determined. The number between 100 and 999.9 is then converted to a binary integer. The binary-to-BCD conversion is performed by successive subtraction of 100 to 10, with the remainder becoming the 1's digit. The number is rounded off to the nearest 1's digit. When the 3-digit BCD integer is combined with the decimal point and the power of ten, it provides a complete BCD engineering-notation representation of the input floating-point binary number.

Arithmetic Subroutines

Various arithmetic routines of interest are briefly described herein for completeness. They include subroutines to perform the arithmetic operations of addition, subtraction, multiplication, division, square root, and roundoff on floating-point binary numbers. Many of the algorithms were adapted from integer arithmetic algorithms published elsewhere, for example, in "Principles of Digital Computer Operation" by M. David Freedman, John Wiley & Sons, New York, 1972. The comparison subroutine (COMPAR3) is also described herein.

FSUB2 reads a minuend and a subtrahend, changes the sign of the subtrahend, and passes both to the addition subroutine. After execution, the difference will be found in the sum location of FADD2. FADD2 adds two floating-point numbers by determining which number is larger, shifting the smaller number until the exponents are equal, adding the mantissas, and rounding off. The roundoff routine (ROUND2) rounds down if the remainder is less than ½ or if the remainder is equal to ½ and the least significant bit of the mantissa is a "0". ROUND2 rounds up when the remainder is greater than ½ or when the remainder is equal to ½ and the least significant bit of the mantissa is a "1". If a roundoff results in overflow, the mantissa is shifted and the exponent adjusted accordingly to maintain the correct floating-point format.

FMULT2 multiplies two floating point numbers. The exponents are added and the sign of the product is determined from the signs of the multiplier and multiplicand. The mantissas are multiplied using the shift-and-add algorithm presented in the above-identified publication of Freedman. The product is rounded to the proper floating-point format by subroutine ROUND2. FDIV2 divides a dividend by a divisor. The exponent of the divisor is subtracted from that of the dividend and the sign of the quotient is determined. If the divisor is zero, division by 1.0 is performed and an error flag is set. If the mantissa of the divisor is nonzero, the division is performed using the subtract-and-shift method presented in Freedman.

Roundoff for FDIV2 is not performed by ROUND2. Instead, the fraction R/D is compared to ½, where R is the remainder and D is the divisor. In order to avoid further division, $R/D \geq \frac{1}{2}$ is rearranged to form $2R-D \geq 0$. The quotient is rounded up if $2R-D>0$, down if $2R-D<0$, and the LSB of the quotient is tested in the manner used in ROUND2 if $2R-D=0$.

The square-root routine uses a successive approximation technique presented in "Get the Most from your 4-Function Calculator", by Henry M. Morris, EDN, Vol. 19, No. 13, July 5, 1974. The algorithm calculates a next estimate B from a prior estimate A using $B=(N/A+A)/2$, where N is the argument of the routine. A first estimate of 2.0 is used and the algorithm is iterated until two successive estimates agree to within one LSB. An attempt to take the square root of a negative number results in the setting of an error flag and the computation of the square root of the absolute value of the argument.

Subroutine COMPAR3 compares two floating-point numbers, Y and Z. If $Y \leq Z$, a "0" is returned in the MSB of the B accumulator. If $Y>Z$, a "1" is returned in the MSB of the B accumulator. Note that BCDC3 does not make use of COMPAR3. The need for COMPAR3, which is called by MEAS, was not obvious until long after BCDC3 was written. BCDC3 could be revised to make advantageous use of COMPAR3.

Miscellaneous Subroutines

The only routines not discussed to this point are DELAY3, DLY3, and NMI3. DELAY3 simply occupies the processor for approximately 0.5 second (at a system clock frequency of 1 MHz) by decrementing the index register from the largest 16-bit integer (FFFF) to zero. DLY3 calls DELAY3 four times to produce a total delay of about 2 seconds.

NMI3 is the handling routine for non-maskable interrupts to the processor. When the NMI flipflop is set by the Stop switch, NMI3 reinitializes the stack pointer, waits 1.5 seconds by calling DELAY3 three times, and returns control to either RESET3 or INPUT4. Control returns to INPUT4 only if the instrument is in the accumulation phase of the Each Pulse mode. This is determined from the indicator flag described above under "Function Subroutines". If control returns to INPUT4, the accumulation phase is not resumed. Instead, the data is repacked, as described above under "Function Subroutines" and then processed.

If NMI3 is entered at any time other than during the accumulation phase of the Each Pulse mode, control is returned to RESET3 and the previously processed data is displayed. It should be noted that if the Stop switch is depressed during data processing, the resulting display may contain a mix of results from the most recent and the previous measurement.

The final listings in the Appendix are a directory of checksums and vectors. Also included are complete machine-code listings of all four 1k blocks of ROM. Again, the checksums are computed assuming that FF is stored in all unused locations.

Conclusions

Incorporation of a microprocessor into an instrument for measuring optical laser energy has enabled the provision of a portable device to directly determine the hazard of direct viewing, as indicated by the Class I accessible emission limits for laser radiation. The herein-described laser meter is reasonably easy to operate, outputs numerical data in units of Joules and seconds directly, and automatically determines the time at which an optical laser signal exceeds the Class I limit. Complex scan patterns can be evaluated for safety in a short time.

The flexibility inherent in a microprocessor system facilitates modification and expansion of the functional operation of the instrument. The herein-described laser meter could be programmed to compare input signals to limits for other classes. The expected average power of the calibration source could be reprogrammed to any convenient value.

The instrument as described herein could be connected to an external printer for hard copy of the status, A, B, C and D registers. The software could easily be modified to provide for printout of all data samples collected. If the instrument is manufactured in large quantities, a custom liquid crystal display could be designed to display the numerical data in a single static display, rather than the three-phase cyclic method used. The power of ten or the physical unit prefixes (micro, nano, pico, etc.) could be displayed at the same time as the BCD mantissa for additional clarity. Also, a detector with a faster response could permit measurement of pulses shorter than 18 $\mu$sec.

While an improved instrument for the measurement of exposure from laser radiation has been disclosed in the form of a specific embodiment in the foregoing description, it will be understood that various modifications within the scope of the invention may occur to those skilled in the art. Therefore it is intended that adaptations and modifications should and are intended to be comprehended within the meaning and range of equivalents of the disclosed embodiment.

APPENDIX

PROGRAM LISTINGS

MOTOROLA M68SAM CROSS-ASSMBLER

```
M68SAM IS THE PROPERTY OF MOTOROLA SPD, INC.
    COPYRIGHT 1974 TO 1975 BY MOTOROLA INC

MOTOROLA M6800 CROSS ASSEMBLER, RELEASE 1.2

00000               NAM     RESET3
00010         *
00020         *           RESTART SUBROUTINE
00030         *
00040         *   AT TURN-ON, THIS ROUTINE SETS THE STACK
00050         *   POINTER, PERFORMS A DISPLAY AND MEMORY TEST,
00060         *   AND BEGINS SCANNING THE DISPLAY SWITCH.
00070         *   AFTER THE DESIRED QUANTITY IS DISPLAYED,
00080         *   THE "GO" INPUT IS SENSED.  IF "GO" IS A
00090         *   LOGIC 1, THE DESIRED FUNCTION (TEST, CALIBRATE,
00100         *   MEASURE BACKGROUND, MEASURE CW, AND MEASURE
00110         *   PULSED) IS EXECUTED AND THE PROGRAM LOOPS
00120         *   BACK TO THE DISPLAY FUNCTION.
00130         *
00140         *   SUBROUTINES CALLED:   BCDC3, DLY3, DSPLY3, CAL3,
```

```
00150                    *           BKGND, MEAS, INPUT3, INPUT4, IFLOAT, TEST
00160        C802    BCDC3   EQU     $C802
00170        0050    EFP     EQU     $50         FLOATING-POINT NUMBER
00180        0051    MFP1    EQU     EFP+1
00190                    *
00200        C680    DLY3    EQU     $C680
00210        C6D0    DSPLY3  EQU     $C6D0
00220        C40D    CAL3    EQU     $C40D
00230        C408    BKGND   EQU     $C408
00240        C948    MEAS    EQU     $C948
00250        C530    INPUT3  EQU     $C530
00255        C010    INPUT4  EQU     $C010
00260        C700    IFLOAT  EQU     $C700
00270        C690    TEST    EQU     $C690
00280                    *
00290        0000    FLAGS   EQU     $00         ERROR FLAGS
00300        0075    S1      EQU     $75         STATUS REGISTER
00310        0076    S2      EQU     S1+1
00320                    *
00330        9000    DISP1   EQU     $9000       LOCATION OF LIQUID
00340        9001    DISP2   EQU     DISP1+1     CRYSTAL DISPLAY
00350        9003    OUT     EQU     $9003       OUTPUT PORT
00360                    *
00370        0078    EACAL   EQU     $78         A/D CORRECTION FACTOR
00380        007B    EVCAL   EQU     EACAL+3     V/F CORRECTION FACTOR
00390                    *
00394        00A9    EACH    EQU     $A9         MEASURE EACH PULSE INDICATOR
00396                    *
00400        005A    TEMP1   EQU     $5A         TEMPORARY STORAGE
00410        005B    TEMP2   EQU     TEMP1+1     TEMPORARY STORAGE
00420        0071    TEMP4   EQU     $71         TEMPORARY STORAGE
00430                    *
00440 C730                   ORG     $C730
00450                    *
00460 C730 0F              SEI                 SET INTERRUPT MASK.
00470 C731 86 40           LDA A   #$40
00480 C733 B7 9003         STA A   OUT
00490 C736 8E 07FE         LDS     #$07FE      SET STACK TO UPPER END OF
00500                    *                      RAM.
00505 C739 B6 5005         LDA A   $5005       CLEAR "GO" FLIPFLOP.
00510 C73C CE 0000  L50    LDX     #0000       CLEAR ERROR FLAGS.
00520 C73F DF 00           STX     FLAGS
00530 C741 BD C690         JSR     TEST        TEST DISPLAY AND MEMORY.
00560 C744 CE 0140         LDX     #$0140      INITIALIZE CALIBRATION
00570 C747 DF 78           STX     EACAL       FACTORS TO 1.0.
00580 C749 DF 7B           STX     EVCAL
00590 C74B B6 5004  L51    LDA A   $5004       READ SETTING OF DISPLAY
00600 C74E 84 07           AND A   #07         SWITCH.
00610 C750 81 04           CMP A   #04         STATUS?
00620 C752 26 0F           BNE     L52
00630 C754 96 75           LDA A   S1          YES.  STORE STATUS IN
00640 C756 DE 76           LDX     S2          DISPLAY.
00650 C758 B7 9000         STA A   DISP1
00660 C75B FF 9001         STX     DISP2
00670 C75E BD C680         JSR     DLY3        DELAY.
00680 C761 20 1A           BRA     L53
00690 C763 5F       L52    CLR B               COMPUTE DISPLAY VECTOR
 0700 C764 48              ASL A               FROM SWITCH CODE.
 0710 C765 48              ASL A
 0720 C766 D7 5A           STA B   TEMP1
00730 C768 97 5B           STA A   TEMP2
00740 C76A DE 5A           LDX     TEMP1       LOAD INDEX WITH DISPLAY
00750 C76C A6 66           LDA A   $66,X       VECTOR.  FETCH QUANTITY TO
00760 C76E 97 50           STA A   EFP         BE DISPLAYED AND PASS TO
00770 C770 EE 67           LDX     $67,X       BCDC3.
00780 C772 DF 51           STX     MFP1
```

```
00790 C774 BD C802          JSR     BCDC3       CONVERT TO BCD.
00800 C777 BD C6D0          JSR     DSPLY3      DISPLAY.
00804 C77A 7F 00A9          CLR     EACH        INITIALIZE EACH PULSE
00806                *                          INDICATOR.
00810 C77D B6 5005    L53   LDA A   $5005       READ "GO" SWITCH.
00820 C780 2A C9            BPL     L51         GO?
00830 C782 84 70            AND A   #$70        YES. MASK OUT ALL BUT
00840 C784 48               ASL A               FUNCTION CODE.
00850 C785 2B B5            BMI     L50         IF TEST, LOOP BACK.
00860 C787 97 71            STA A   TEMP4       A MEASURE FUNCTION HAS BEEN
00870                *                          SELECTED. SAVE FUNCTION
00872                *                          CODE.
00874 C789 26 10            BNE     L61         PULSED MODE?
00876 C78B B6 5004          LDA A   $5004       YES. EACH PULSE MODE?
00878 C78E 85 20            BIT A   #$20
00880 C790 26 09            BNE     L61
00882 C792 C6 80            LDA B   #$80        YES. INDICATE EACH PULSE
00884 C794 D7 A9            STA B   EACH        MODE.
00000                       NAM     DSPLY3
00010          *
00020          *                    DISPLAY SUBROUTINE
00030          *
00040          *    THIS SUBROUTINE OUTPUTS THE RESULT OF THE
00050          *    BCD CONVERSION SUBROUTINE TO THE LIQUID
00060          *    CRYSTAL DISPLAY. THE MANTISSA AND THE POWER
00070          *    OF TEN ARE OUTPUT FOR APPROXIMATELY 2.0
00080          *    SECONDS EACH AND THEN CONTROL FLOWS TO
00090          *    SUBROUTINE DELAY3 FOR 0.5 SECONDS OF
00094          *    DISPLAY BLANKING. CONTROL RETURNS TO THE
00096          *    CALLING ROUTINE FROM DELAY3.
00100          *
00110          *    SUBROUITNES CALLED: DLY3, DELAY3
00120    C680        DLY3    EQU     $C680
00125    C670        DELAY3  EQU     $C670
00130                *
00140    0053        MB1     EQU     $53         BCD MANTISSA
00150    0054        MB2     EQU     MB1+1
00160    0056        PB1     EQU     MB1+3       BCD POWER OF TEN
00170    0057        PB2     EQU     PB1+1
00180                *
00190    0059        BL1     EQU     $59         STORAGE FOR DATA THAT
00200    005A        BL2     EQU     BL1+1       BLANKS THE DISPLAY.
00210                *
00220    005C        TEMP    EQU     $5C         INDEX REGISTER TEMPORARY
00230                *                           STORAGE
00240    9000        DISP1   EQU     $9000       LOCATION OF LIQUID
00250    9001        DISP2   EQU     DISP1+1     CRYSTAL DISPLAY
00260                *
00270    C6D0                ORG     $C6D0
00280                *
00290 C6D0 7F 0059           CLR     BL1         STORE DATA TO BLANK
00300 C6D3 CE FFFF           LDX     #$FFFF      THE DISPLAY.
00310 C6D6 DF 5A             STX     BL2
00320 C6D8 CE 0053           LDX     #MB1        POINT INDEX TO BCD MANTISSA.
00330 C6DB DF 5C             STX     TEMP        SAVE INDEX.
00335 C6DD DE 5C     L40     LDX     TEMP        RESTORE INDEX.
00340 C6DF A6 00             LDA A   0,X         STORE DATA IN THE DISPLAY.
00350 C6E1 EE 01             LDX     1,X
00360 C6E3 B7 9000           STA A   DISP1
00370 C6E6 FF 9001           STX     DISP2
00390 C6E9 DE 5C             LDX     TEMP
00400 C6EB 08                INX                 POINT INDEX REGISTER TO THE
00410 C6EC 08                INX                 NEXT DATA WORD.
00420 C6ED 08                INX
00425 C6EE DF 5C             STX     TEMP        SAVE INDEX.
```

```
00886 C796 BD C010         JSR     INPUT4    INPUT PULSE DATA UNTIL
00888                *                       MEMORY FULL.
00890 C799 20 03           BRA     L62
00892 C79B BD C530 L61     JSR     INPUT3    READ IN DATA FOR 10 SECONDS.
00900 C79E BD C700 L62     JSR     IFLOAT    CONVERT TO FLOATING-POINT.
00910 C7A1 96 71           LDA A   TEMP4     FETCH FUNCTION CODE.
00920 C7A3 81 60           CMP A   #$60      CALIBRATE?
00930 C7A5 26 05           BNE     L54
00940 C7A7 CE C40D         LDX     #CAL3     YES.
00950 C7AA 20 0C           BRA     L60
00960 C7AC 81 40   L54     CMP A   #$40      BACKGROUND?
00970 C7AE 26 05           BNE     L55
00980 C7B0 CE C408         LDX     #BKGND    YES.
00990 C7B3 20 03           BRA     L60
01000 C7B5 CE C948 L55     LDX     #MEAS     MEASURE MODE.
01010 C7B8 AD 00   L60     JSR     0,X       EXECUTE DESIRED FUNCTION.
01020 C7BA 20 8F           BRA     L51       LOOP BACK FOR DISPLAY OF
01030                *                       DATA.
01040                      END
```

SYMBOL TABLE

```
BCDC3  C802   EFP    0050   MFP1   0051   DLY3   C680   DSPLY3 C6D0
CAL3   C40D   BKGND  C408   MEAS   C948   INPUT3 C530   INPUT4 C010
IFLOAT C700   TEST   C690   FLAGS  0000   S1     0075   S2     0076
DISP1  9000   DISP2  9001   OUT    9003   EACAL  0078   EVCAL  007B
EACH   00A9   TEMP1  005A   TEMP2  005B   TEMP4  0071   L50    C73C
L51    C74B   L52    C763   L53    C77D   L61    C79B   L62    C79E
L54    C7AC   L55    C7B5   L60    C7B8

00430 C6F0 8C 005C          CPX     #TEMP     HAS ALL DATA BEEN PROCESSED?
00440 C6F3 27 05            BEQ     L50
00442 C6F5 BD C680          JSR     DLY3      NO.  USE LONG DELAY.
00444 C6F8 20 E3            BRA     L40
00446 C6FA 7E C670 L50      JMP     DELAY3    YES.  USE SHORT DELAY.
00450               *                         TRANSFER CONTROL TO
00460               *                         SUBROUTINE DELAY3.
00470                       END
```

SYMBOL TABLE

```
DLY3   C680   DELAY3 C670   MB1    0053   MB2    0054   PB1    0056
PB2    0057   BL1    0059   BL2    005A   TEMP   005C   DISP1  9000
DISP2  9001   L40    C6DD   L50    C6FA

00000                       NAM     TEST
00010               *
00020               *           DISPLAY AND MEMORY TEST SUBROUTINE
00030               *
00040               *       THIS ROUTINE TESTS THE LIQUID CRYSTAL DISPLAY
00050               *       BY FIRST TURNING ON ALL SEGMENTS AND THEN
00060               *       TURNING OFF ALL SEGMENTS.  THEN RAM IS TESTED
00070               *       FOR DATA RETENTION FROM LOCATION 0001 THROUGH
00080               *       07EF, AND ROM IS SUMMED IN 1 K BLOCKS AND THE
00090               *       SUM COMPARED TO THE CHECKSUM FOR THAT 1 K
00100               *       BLOCK.  AN ERROR IN RAM RESULTS IN A STATUS
00110               *       OF SL-- (LOW MEMORY ERROR) AND AN ERROR IN ROM
00120               *       RESULTS IN A STATUS OF SH-- (HIGH MEMORY ERROR).
00130               *
00140               *       SUBROUTINES CALLED:   DLY3, TRAM, TROM
00150        C680           DLY3    EQU     $C680
00160        C610           TRAM    EQU     $C610
00170        C634           TROM    EQU     $C634
00180               *
```

```
00190           0000         FLAGS   EQU     $00         ERROR FLAGS
00200           0076         S2      EQU     $76         STATUS REGISTER
00210                        *
00220           9000         DISP1   EQU     $9000       LOCATION OF LIQUID
00230           9001         DISP2   EQU     DISP1+1     CRYSTAL DISPLAY
00240                        *
00250  C690                          ORG     $C690
00260                        *
00270  C690 86 FF                    LDA A   #$FF        OPAQUE ALL SEGMENTS IN
00280  C692 CE 8888                  LDX     #$8888      LIQUID CRYSTAL DISPLAY.
00290  C695 B7 9000                  STA A   DISP1
00300  C698 FF 9001                  STX     DISP2
00310  C69B BD C680                  JSR     DLY3        DELAY.
00320  C69E 7F 9000                  CLR     DISP1       BLANK DISPLAY.
00330  C6A1 CE FFFF                  LDX     #$FFFF
00340  C6A4 FF 9001                  STX     DISP2
00350  C6A7 BD C680                  JSR     DLY3        DELAY.
00360  C6AA BD C610                  JSR     TRAM        TEST RAM.
00370  C6AD BD C634                  JSR     TROM        TEST ROM.
00374  C6B0 CE 5EEE                  LDX     #$5EEE      INITIALIZE STATUS TO
00376  C6B3 DF 76                    STX     S2          S---.
00380  C6B5 96 00                    LDA A   FLAGS
00390  C6B7 85 70                    BIT A   #$70        ANY RAM ERRORS?
00400  C6B9 27 05                    BEQ     L31
00410  C6BB C6 5A                    LDA B   #$5A        YES.  STORE SL-- IN
00420  C6BD D7 76    L33             STA B   S2          STATUS REGISTER.
00430  C6BF 39       L32             RTS                 RETURN TO CALLING ROUTINE.
00440  C6C0 85 0F    L31             BIT A   #0F         NO.  ANY ROM ERRORS?
00450  C6C2 27 FB                    BEQ     L32
00460  C6C4 C6 5B                    LDA B   #$5B        YES.  STORE SH-- IN
00470  C6C6 20 F5                    BRA     L33         STATUS REGISTER.
00480                        *
00490                                END
```

SYMBOL TABLE

```
DLY3    C680    TRAM    C610    TROM    C634    FLAGS   0000    S2      0076
DISP1   9000    DISP2   9001    L33     C6BD    L32     C6BF    L31     C6C0
00000                           NAM     TRAM
00010                   *
00020                   *                       TEST RAM SUBROUTINE
00030                   *
00040                   *       THIS ROUTINE TESTS RAM LOCATIONS 01 THROUGH
00050                   *       07EF FOR RETENTION OF FF, AA, 55, AND
00060                   *       00.  IF AN ERROR IS DETECTED, THE PROPER ERROR
00070                   *       FLAG IS SET IN LOCATION 00.
00072                   *
00080                   *       DATA OUTPUT FORMAT:
00085                   *
00088                   *       $0000      XXXXXXXX
00090                   *                  76543210
00092                   *
00094                   *       BIT 6: SET BY AN "FF" FAILURE.
00096                   *       BIT 5: SET BY AN "AA" OR "55" FAILURE.
00098                   *       BIT 4: SET BY AN "00" FAILURE.
00100                   *
00123           C7E0    GENTP   EQU     $C7E0       SUBROUTINES CALLED: GENTP.
00126                   *
00130           0001    RSTRT   EQU     $01         FIRST LOCATION OF RAM
00134                   *                           TO BE TESTED
00138           07F0    REND    EQU     $07F0       END OF RAM
00140                   *
00150  C610                     ORG     $C610
00160                   *
```

```
00170 C610 86 FF              LDA A   #$FF        SET A FOR THE FIRST TEST
00180                 *                           PATTERN.
00190 C612 C6 40              LDA B   #$40        STORE THE ERROR CODE FOR
00200                 *                           FF IN B.
00210 C614 CE 0001  LABLA3    LDX     #RSTRT      POINT X TO THE FIRST
00220                 *                           LOCATION OF RAM TO
00230                 *                           BE TESTED.
00240 C617 A7 00    LABLA1    STA A   0,X         DOES THE RAM LOCATION RETAIN
00250 C619 A1 00              CMP A   0,X         THE TEST PATTERN?
00260 C61B 27 04              BEQ     LABLA0
00270 C61D DA 00              ORA B   00          NO.  SET THE APPROPRIATE
00280 C61F D7 00              STA B   00          ERROR FLAG IN LOCATION 00.
00290 C621 08      LABLA0     INX                 POINT X TO THE NEXT RAM
00300                 *                           LOCATION.
00310 C622 8C 07F0            CPX     #REND       HAVE ALL LOCATIONS BEEN
00320                 *                           TESTED?
00330 C625 26 F0              BNE     LABLA1
00340 C627 81 00              CMP A   #00         YES.  HAVE ALL FOUR TEST
00350                 *                           PATTERNS BEEN USED?
00360 C629 26 01              BNE     LABLA2      IF SO,
00370 C62B 39                 RTS                 RETURN TO CALLING ROUTINE.
00380 C62C BD C7E0  LABLA2    JSR     GENTP       SET UP A AND B FOR THE NEXT
00390                 *                           TEST PATTERN IN THE SEQUENCE
00400 C62F 20 E3              BRA     LABLA3      AND REPEAT THE PROCEDURE.
00410                 *
00420                          END
```

SYMBOL TABLE

```
GENTP  C7E0   RSTRT  0001   REND    07F0   LABLA3 C614   LABLA1 C617
LABLA0 C621   LABLA2 C62C
00000                        NAM     GENTP
00010         *
00020         *        TEST PATTERN GENERATION SUBROUTINE
00030         *
00040         *    THIS ROUTINE LOADS THE A ACCUMULATOR WITH AA,
00050         *    55, OR 00 AND THE B ACCUMULATOR WITH 20 OR 10,
00060         *    DEPENDING ON THE CONTENTS OF THE A ACCUMULATOR
00070         *    UPON ENTRY.  THE ROUTINE IS USED IN TESTING
00080         *    RAM TO RETURN THE NEXT TEST PATTERN, GIVEN THE
00090         *    PREVIOUS TEST PATTERN.  THE B ACCUMULATOR IS
00100         *    LOADED WITH THE CODE NECESSARY TO SET THE ERROR
00110         *    FLAG CORRESPONDING TO THE TEST PATTERN STORED
00112         *    IN A.
00114         *
00116         *    DATA INPUT FORMAT:
00118         *
00120         *        THE SUBROUTINE UTILIZES THE DATA
00122         *        PASSED VIA ACCUMULATOR A.
00124         *
00126         *        ACCUMULATOR A:      FF
00128         *                            AA
00130         *                            55
00132         *                            00
00134         *
00136         *    DATA OUTPUT FORMAT:
00138         *
00140         *        THE GENERATED TEST PATTERN IS
00142         *        RETURNED IN ACCUMULATOR A AND
00144         *        THE CORRESPONDING ERROR FLAG
00146         *        PATTERN IS STORED IN ACCUMULATOR B.
00148         *
00150         *        ACC. A:  FF          ACC. B:  40
00152         *                 AA                   20
```

```
 0154              *               55              20
 0156              *               00              10
 0180              *
00184 C7E0                ORG     $C7E0
00188              *
00192 C7E0 81 FF          CMP A   #$FF        DOES A CONTAIN FF?
00196 C7E2 26 05          BNE     LABL9C
00200 C7E4 86 AA          LDA A   #$AA        YES.  STORE AA IN A.
00204 C7E6 C6 20          LDA B   #$20        STORE THE ERROR CODE FOR
00208              *                          AA IN B.
00210 C7E8 39             RTS                 RETURN TO CALLING ROUTINE.
00220 C7E9 4D     LABL9C  TST A               IS THE MSB OF THE A
00230              *                          ACCUMULATOR A 1?
00240 C7EA 2A 04          BPL     LABL9D
00250 C7EC 44             LSR A               YES.  A IS ASSUMED TO CONTAIN
00260              *                          AA.  SHIFT LEFT TO FORM 55.
00270 C7ED C6 20          LDA B   #$20        STORE THE ERROR CODE FOR
00280              *                          55 IN B.
00290 C7EF 39             RTS                 RETURN TO CALLING ROUTINE.
00300 C7F0 4F     LABL9D  CLR A               A CONTAINED 55.  CLEAR A.
00310 C7F1 C6 0A          LDA B   #10         STORE THE ERROR CODE FOR
00320              *                          00 IN B.
00330 C7F3 39             RTS                 RETURN TO CALLING ROUTINE.
00340              *
00350                     END

SYMBOL TABLE

LABL9C C7E9   LABL9D C7F0
00000                      NAM     TROM
00010              *
00020              *        TEST READ-ONLY MEMORY SUBROUTINE
00030              *
00040              *     THIS SUBROUTINE TESTS A TOTAL OF 4K OF ROM.
00050              *     THE ROM IS EXAMINED AS A SET OF 1K BLOCKS.
00060              *     A CHECKSUM IS ASSUMED TO OCCUPY THE FIRST
00070              *     BYTE OF EACH 1K BLOCK. THE BLOCK IS TESTED
00080              *     BY SUMMING ALL LOCATIONS OTHER THAN THE
00090              *     THE CHECKSUM AND COMPARING THE SUM TO THE
00100              *     CHECKSUM.
00110              *
00160              *     DATA OUTPUT FORMAT:
00170              *
00180              *     ERROR FLAG $0000      XXXXXXXX
00190              *                           76543210
00200              *
00210              *     BIT 0: SET DUE TO AN ERROR IN $CC00-$CFFF
00220              *     BIT 1: SET DUE TO AN ERROR IN $C800-$CBFF
00230              *     BIT 2: SET DUE TO AN ERROR IN $C400-$C7FF
00240              *     BIT 3: SET DUE TO AN ERROR IN $C000-$C3FF
00491              *
00500      0005    ETEMP   EQU     $0005       TEMP. STORAGE FOR APPROPRIATE
 0510              *                           ERROR FLAG BIT FOR CURRENT 1K
 0520      0004    CHECKS  EQU     $0004       TEMP. CHECKSUM STORAGE.
 0550      C000    BLOCK   EQU     $C000       FIRST LOCATION OF ROM.
 0560      D000    END     EQU     $D000       END OF ROM.
 0570      0000    ERRORF  EQU     $0000       ROM ERROR FLAG.
 0575      0006    TEMP    EQU     $0006       TEMP. POINTER FOR SUM.
 0580              *
 0590 C634                 ORG     $C634
 0595              *
 0600 C634 86 08          LDA A   #$08        STORE "1" IN B3 OF ETEMP.
 0610 C636 97 05          STA A   ETEMP       STORAGE FOR THE ERROR FLAG.
 0620 C638 CE C000        LDX     #BLOCK      INITIALIZE THE INDEX
```

```
 00630                  *                         REGISTER TO POINT TO THE
 00640                  *                         BEGINNING OF ROM.
 00650 C63B A6 00   LABLB0 LDA A  0,X            STORE THE CHECKSUM IN TEMP.
 00660 C63D 97 04          STA A  CHECKS         STORAGE.
 00670 C63F A6 01          LDA A  1,X            INITIALIZE A TO THE CONTENTS
 00680                  *                         OF THE FIRST USABLE BYTE
 00685                  *                         OF THE 1K BLOCK.
 00690 C641 08             INX                   INITIALIZE THE INDEX REGISTER
 00700 C642 08             INX
 00710 C643 C6 02          LDA B  #$02           INITIALIZE ACC B.
 00715 C645 7F 0006        CLR    TEMP
 00720 C648 AB 00   LABLB1 ADD A  0,X            ADD TO A THE CONTENTS OF THE
 00730 C64A 08             INX                   LOCATION POINTED TO BY THE IN
 00740 C64B CB 01          ADD B  #$01           REGISTER.
 00741 C64D 24 F9          BCC    LABLB1         IS ACC B EQUAL TO (1) 00?
 00742 C64F 7C 0006        INC    TEMP
 00743 C652 37             PSH B                 NO. CHECK TEMP TO SEE
 00744 C653 D6 06          LDA B  TEMP           WHETHER THE 1K BLOCK
 00745 C655 C1 04          CMP B  #$04           HAS BEEN SUMMED.
 00746 C657 33             PUL B
 00760 C658 26 EE          BNE    LABLB1
 00770 C65A 91 04          CMP A  CHECKS         DOES A EQUAL THE CHECKSUM?
 00780 C65C 27 06          BEQ    LABLB2
 00790 C65E 96 05          LDA A  ETEMP          NO. SET THE APPROPRIATE BIT
 00800 C660 9A 00          ORA A  ERRORF         IN THE ERROR FLAG.
 00810 C662 97 00          STA A  ERRORF
 00820 C664 74 0005 LABLB2 LSR    ETEMP          SHIFT THE BIT IN THE
 00825                  *                         TEMPORARY ERROR FLAG.
 00830 C667 8C D000        CPX    #END           END OF ROM?
 00880 C66A 26 CF          BNE    LABLB0
 00890 C66C 39             RTS                   YES. RETURN TO CALLING PROG.
 00900                     END
```

SYMBOL TABLE

```
ETEMP  0005  CHECKS 0004  BLOCK  C000  END    D000  ERRORF 0000
TEMP   0006  LABLB0 C63B  LABLB1 C648  LABLB2 C664
00000                     NAM    INPUT4
00010                  *
00020                  *  DATA INPUT SUBROUTINE
00030                  *
00040                  *  THIS SUBROUTINE WAITS FOR AN INTERRUPT
00050                  *  TO INPUT DATA TO TEMPORARY STORAGE AND
00060                  *  THEN STORES IT IN TWO ARRAYS, ONE FOR A/D
00065                  *  DATA AND ONE FOR V/F DATA. THE INPUT
00067                  *  COUNTERS ARE RESET AFTER EACH PULSE IS
00069                  *  MEASURED. THE ROUTINE TERMINATES WHEN THE
00070                  *  MEMORY HAS BEEN FILLED.
00090                  *  THE SETTING OF THE SCALE SWITCH IS
00100                  *  COMPARED AFTER EACH DATA SAMPLE TO THE
00110                  *  SETTING UPON ENTRY. IF THERE IS A
00120                  *  DISCREPANCY, AN ERROR IS INDICATED AS
00130                  *  SHOWN BELOW. UPON ENTRY, THE ROUTINE
00140                  *  OUTPUTS ---- TO THE LCD. ONCE A "RUN"
00150                  *  CONDITION HAS BEEN DETECTED, A--- IS
00160                  *  DISPLAYED. THE ERROR CODES ARE AS
00165                  *  FOLLOWS:
00170                  *    A--S   SCALE CHANGE DURING MEASUREMENT
00180                  *    A-O-   INPUT OVERRANGE
00210                  *  THIS INFORMATION IS ALSO STORED IN THE
00220                  *  STATUS REGISTER. WHEN DATA INPUT HAS
00230                  *  BEEN COMPLETED, P--- IS DISPLAYED WHILE
00240                  *  THE DATA IS PROCESSED.
00259                  *
```

```
00260        006D       COUNT   EQU     $6D         NUMBER OF A/D DATA POINTS
00265        00A6       NUMBER  EQU     $A6         DATA POINT COUNT
00270                   *
00280        0075       S1      EQU     $75         STATUS STORAGE LOCATION
00290        0076       S2      EQU     S1+1
00300        0077       S3      EQU     S2+1
00310                   *
00320        0080       T1      EQU     $80         INPUT TIME TEMPORARY
00330        0081       T2      EQU     T1+1        STORAGE
00335        0082       T3      EQU     T2+1
00340        0083       E1      EQU     T3+1        INPUT ENERGY TEMPORARY
00350        0084       E2      EQU     E1+1        STORAGE
00355        0085       E3      EQU     E2+1
00360                   *
00370        0086       TEMP    EQU     $86         INDEX REGISTER TEMPORARY
00380                   *                           STORAGE
00382        00A4       TEMP2   EQU     $A4         INDEX REGISTER TEMPORARY
00384                   *                           STORAGE
00386        00A8       TEMP3   EQU     $A8         PREVIOUS A/D COUNT, INDICATOR
00388                   *
00389        00AA       EP      EQU     $AA         EACH PULSE INDICATOR
00390        0088       SCALE   EQU     $88         SCALE CODE
00410        0100       ASTART  EQU     $0100       LOCATION OF FIRST A/D DATA
00420                   *                           POINT
00424        06FA       VSTART  EQU     $06FA       LOCATION OF FIRST V/F DATA
00426                   *                           POINT
00430        9000       DISP1   EQU     $9000       LOCATION OF LIQUID CRYSTAL
00440        9001       DISP2   EQU     DISP1+1      DISPLAY
00450        9002       DISP3   EQU     DISP2+1
00460                   *
00470        9003       OUT     EQU     $9003       DATA OUTPUT PORT
00480                   *
00490 C010                      ORG     $C010
00500                   *
00510 C010 7F 9000              CLR     DISP1       STORE ---- IN LCD.
00520 C013 CE EEEE              LDX     #$EEEE
00530 C016 FF 9001              STX     DISP2
00540 C019 DF 76               STX     S2          STORE S--- IN STATUS
00550 C01B 86 5E               LDA A   #$5E        REGISTER.
00560 C01D 97 76               STA A   S2
00580 C01F 7F 006D              CLR     COUNT       SET NUMBER OF A/D DATA
00590                   *                           POINTS TO ZERO.
00592 C022 7F 00A6              CLR     NUMBER      SET TOTAL NUMBER OF DATA
00594                   *                           POINTS TO ZERO.
00596 C025 86 80               LDA A   #$80        INITIALIZE EACH PULSE
00598 C027 97 AA               STA A   EP          MODE INDICATOR.
00600 C029 CE 0100              LDX     #ASTART     POINT INDEX REGISTER TO
00610 C02C DF 86                STX     TEMP        FIRST AVAILABLE A/D STORAGE
00620                   *                           LOCATION.
00624 C02E CE 06FA              LDX     #VSTART     POINT INDEX REGISTER TO
00626 C031 DF A4                STX     TEMP2       FIRST AVAILABLE V/F STORAGE
00628                   *                           LOCATION.
00630 C033 B6 5005             LDA A   $5005       READ SETTING OF SCALE
00640 C036 84 03               AND A   #03         SWITCH.
00650 C038 F6 5005             LDA B   $5005       READ SETTING OF FILTER
00660 C03B C4 04               AND B   #04         SWITCH.
00670 C03D 27 01                BEQ     L20
00680 C03F 4C                   INC A               FILTER IN. ADJUST BY INDI-
00690                   *                           CATING NEXT HIGHER SCALE.
00700 C040 97 88       L20     STA A   SCALE       STORE SCALE INFORMATION.
00710 C042 86 70               LDA A   #$70        PULSE STOP LINE. SET
00720 C044 B7 9003              STA A   OUT         INTERRUPT ACKNOWLEDGE LINE.
00730 C047 86 90               LDA A   #$90        PULSE READY LINE AND RESET
00740 C049 B7 9003              STA A   OUT         NMI FLIPFLOP.
00750 C04C 86 10               LDA A   #$10
00760 C04E B7 9003              STA A   OUT
```

```
00761 C051 B6 5004 L21    LDA A   $5004       WAIT FOR FIRST TRIGGER.
00762 C054 2A FB          BPL     L21
00775 C056 7F 9003        CLR     OUT         CLEAR INTERRUPT ACKNOWLEDGE.
00780 C059 CE DEEE        LDX     #$DEEE      FIRST TRIGGER HAS OCCURRED.
00790 C05C FF 9001        STX     DISP2       STORE A--- IN DISPLAY.
00792 C05F 96 6D   L36    LDA A   COUNT       SAVE PREVIOUS A/D COUNT.
00794 C061 97 A8          STA A   TEMP3
00800 C063 C6 10          LDA B   #$10        SET UP B FOR INTERRUPT ACK-
00810                *                        NOWLEDGEMENT.
00820 C065 0E            CLI                  CLEAR INTERRUPT MASK.
00830 C066 3E            WAI                  WAIT FOR INTERRUPT.
00840                *
00850 C067 0F            SEI                  AN INTERRUPT HAS OCCURRED.
00860                *                        MASK FURTHER INTERRUPTS.
00896 C068 86 40   L22   LDA A   #$40         STOP COUNTERS.
00898 C06A B7 9003       STA A   OUT
00900 C06D 7F 9003       CLR     OUT
00904 C070 96 A8         LDA A   TEMP3        A/D DATA?
00906 C072 91 6D         CMP A   COUNT
00908 C074 26 05         BNE     L30
00910 C076 DE A4         LDX     TEMP2        NO. FETCH APPROPRIATE
00912 C078 5F            CLR B                POINTER. INDICATE V/F DATA.
00914 C079 20 04         BRA     L31
00916 C07B C6 80   L30   LDA B   #$80         YES. INDICATE A/D DATA.
00918 C07D DE 86         LDX     TEMP         FETCH APPROPRIATE POINTER.
00920 C07F D7 A8   L31   STA B   TEMP3        SAVE DATA SOURCE INDICATION.
00930 C081 96 80         LDA A   T1           STORE TIME IN ARRAY.
00940 C083 A7 00         STA A   0,X
00950 C085 96 81         LDA A   T2
00960 C087 A7 01         STA A   1,X
00970 C089 96 82         LDA A   T3
00980 C08B A7 02         STA A   2,X
00990 C08D 96 83         LDA A   E1           STORE ENERGY IN ARRAY.
01000 C08F A7 03         STA A   3,X
01010 C091 96 84         LDA A   E2
01020 C093 A7 04         STA A   4,X
01030 C095 96 85         LDA A   E3
01040 C097 A7 05         STA A   5,X
01044 C099 7C 00A6       INC     NUMBER       INCREMENT DATA-POINT COUNT.
01050 C09C B6 5005       LDA A   $5005        RECOMPUTE SCALE CODE.
01060 C09F 84 03         AND A   #03
01070 C0A1 F6 5005       LDA B   $5005
01080 C0A4 C4 04         AND B   #04
01090 C0A6 27 01         BEQ     L23
01100 C0A8 4C            INC A
01110 C0A9 91 88   L23   CMP A   SCALE        COMPARE TO ORIGINAL
01120 C0AB 27 0B         BEQ     L24          SETTING.
01130 C0AD 96 77         LDA A   S3           SCALE SETTING HAS CHANGED
01140 C0AF 84 F0         AND A   #$F0         DURING MEASUREMENT.
01150 C0B1 8A 05         ORA A   #05          STORE S--S IN STATUS REGISTER
01160 C0B3 97 77         STA A   S3           AND A--S IN DISPLAY.
01165 C0B5 B7 9002       STA A   DISP3
01170 C0B8 B6 5004 L24   LDA A   $5004        CHECK FOR OVERRANGE.
01180 C0BB 84 08         AND A   #$08
01190 C0BD 27 09         BEQ     L25
01200 C0BF 96 77         LDA A   S3           OVERRANGE HAS OCCURRED.
01210 C0C1 84 0F         AND A   #$0F         STORE S-0- IN STATUS REGISTER
01220 C0C3 97 77         STA A   S3           AND A-0- IN DISPLAY.
01222 C0C5 B7 9002       STA A   DISP3
01224 C0C8 96 A8   L25   LDA A   TEMP3        A/D DATA?
01226 C0CA 2B 0E         BMI     L32
01227 C0CC 09            DEX                  NO. POINT INDEX REGISTER
01228 C0CD 09            DEX                  TO NEXT AVAILABLE V/F
01229 C0CE 09            DEX                  ARRAY STORAGE LOCATION.
01230 C0CF 09            DEX
01232 C0D0 09            DEX
```

```
01234 C0D1 09                DEX
01235 C0D2 DF A4             STX   TEMP2
01236 C0D4 9C 86             CPX   TEMP        HAS MEMORY BEEN FILLED?
01237 C0D6 27 28             BEQ   L34
01238 C0D8 20 0C             BRA   L33
01240 C0DA 08        L32     INX               POINT INDEX REGISTER TO
01250 C0DB 08                INX               NEXT AVAILABLE A/D ARRAY
01260 C0DC 08                INX               STORAGE LOCATION.
01270 C0DD 08                INX
01280 C0DE 08                INX
01290 C0DF 08                INX
01300 C0E0 DF 86             STX   TEMP
01310 C0E2 9C A4             CPX   TEMP2       HAS MEMORY BEEN FILLED?
01320 C0E4 27 1A             BEQ   L34
01342 C0E6 86 50    L33      LDA A #$50        PULSE STOP LINE. SET
01344 C0E8 B7 9003           STA A OUT         INTERRUPT ACKNOWLEDGE LINE.
01346 C0EB 86 90             LDA A #$90        PULSE READY LINE.
01348 C0ED B7 9003           STA A OUT
01349 C0F0 86 10             LDA A #$10
01350 C0F2 B7 9003           STA A OUT
01352 C0F5 B6 5004 L2A       LDA A $5004       WAIT FOR NEXT TRIGGER.
01354 C0F8 2A FB             BPL   L2A
01365 C0FA 7F 9003           CLR   OUT         CLEAR INTERRUPT ACKNOWLEDGE.
01370 C0FD 7E C05F           JMP   L36         LOOP BACK TO INPUT DATA.
01371 C100 7F 00AA L34       CLR   EP          DATA INPUT COMPLETE. CLEAR
01372 C103 DE A4             LDX   TEMP2       EACH PULSE INDICATOR.
01374 C105 8C 06FA           CPX   #VSTART     WAS THERE ANY V/F DATA?
01376 C108 27 19             BEQ   L50
01380 C10A 08                INX               YES. POINT INDEX REGISTER
01382 C10B 08                INX               BACK TO LAST ENTRY OF
01383 C10C 08                INX               V/F DATA.
01384 C10D 08                INX
01385 C10E 08                INX
01386 C10F 08                INX
01390 C110 A6 00    L35      LDA A 0,X         REPACK DATA: SHIFT THE V/F
01400 C112 08                INX               ARRAY DOWN IN MEMORY TO FILL
01410 C113 DF A4             STX   TEMP2       ANY UNUSED LOCATIONS BETWEEN
01420 C115 DE 86             LDX   TEMP        THE A/D AND V/F ARRAYS.
01430 C117 A7 00             STA A 0,X
01440 C119 08                INX
01450 C11A DF 86             STX   TEMP
01460 C11C DE A4             LDX   TEMP2       HAVE ALL DATA BEEN PACKED?
01470 C11E 8C 0700           CPX   #$0700
01480 C121 26 ED             BNE   L35
01490 C123 86 CE    L50      LDA A #$CE        YES. STORE P--- IN THE
01500 C125 B7 9001           STA A DISP2       DISPLAY AND
01510 C128 39                RTS               RETURN TO CALLING ROUTINE.
01520                  *
01530                        END
```

SYMBOL TABLE

| | | | | | | | |
|---|---|---|---|---|---|---|---|
| COUNT | 006D | NUMBER | 00A6 | S1 | 0075 | S2 | 0076 | S3 | 0077 |
| T1 | 0080 | T2 | 0081 | T3 | 0082 | E1 | 0083 | E2 | 0084 |
| E3 | 0085 | TEMP | 0086 | TEMP2 | 00A4 | TEMP3 | 00A8 | EP | 00AA |
| SCALE | 0088 | ASTART | 0100 | VSTART | 06FA | DISP1 | 9000 | DISP2 | 9001 |
| DISP3 | 9002 | OUT | 9003 | L20 | C040 | L21 | C051 | L36 | C05F |
| L22 | C068 | L30 | C07B | L31 | C07F | L23 | C0A9 | L24 | C0B8 |
| L25 | C0C8 | L32 | C0DA | L33 | C0E6 | L2A | C0F5 | L34 | C100 |
| L35 | C110 | L50 | C123 | | | | | | |

```
00000                     NAM     INTER3
00010          *
00020          *     INTERRUPT-HANDLING ROUTINE
00030          *
00040          *     THIS ROUTINE READS IN TIME INFORMATION
00050          *     FROM LOCATIONS 5007/5002/5003 AND ENERGY
00060          *     INFORMATION FROM LOCATIONS 5006/5000/5001
00070          *     AND STORES IT TEMPORARILY IN LOW RAM.  IF
00080          *     THE DATA IS INPUT FROM THE A/D CONVERTER,
00090          *     LOCATION 006D IS INCREMENTED.  AFTER DATA
00100          *     HAS BEEN READ IN, THE INTERRUPT ACK-
00110          *     NOWLEDGE LINE OF LOCATION 9003 IS PULSED.
00120          *     THE B ACCUMULATOR IS ASSUMED TO CONTAIN
00130          *     $10 UPON ENTRY.
00140          *
00150   0080   T1      EQU    $80        INPUT TIME TEMPORARY
00160   0081   T2      EQU    T1+1       STORAGE
00170   0083   E1      EQU    T1+3       INPUT ENERGY TEMPORARY
00180   0084   E2      EQU    E1+1       STORAGE
00190          *
00200   006D   COUNT   EQU    $6D        NUMBER OF A/D DATA POINTS.
00210          *
00220 C500             ORG    $C500
00230          *
00250 C500 B6 5007     LDA A  $5007      FETCH TIME COUNTS.
00260 C503 FE 5002     LDX    $5002
00270 C506 97 80       STA A  T1         STORE TIME COUNTS.
00280 C508 DF 81       STX    T2
00290 C50A B6 5005     LDA A  $5005      DATA FROM A/D OR V/F?
00300 C50D 84 08       AND A  #$08
00310 C50F 26 03       BNE    L20
00320 C511 7C 006D     INC    COUNT      DATA IS FROM A/D.
00330          *                         INCREMENT COUNT.
00340 C514 B6 5006 L20 LDA A  $5006      FETCH ENERGY COUNTS.
00350 C517 FE 5000     LDX    $5000
00360 C51A F7 9003     STA B  $9003      ACKNOWLEDGE INTERRUPT.
00370 C51D 97 83       STA A  E1         STORE ENERGY COUNTS.
00380 C51F DF 84       STX    E2
00390 C521 7F 9003     CLR    $9003      CLEAR INTERRUPT ACKNOWLEDGE.
00392 C524 30          TSX               CHANGE CONDITION CODE
00394 C525 86 D0       LDA A  #$D0       REGISTER SO THAT INTERRUPT
00396 C527 A7 00       STA A  0,X        MASK WILL BE SET ON RETURN.
00400 C529 3B          RTI               RETURN.
00410          *
00420                  END
```

SYMBOL TABLE

| T1 | 0080 | T2 | 0081 | E1 | 0083 | E2 | 0084 | COUNT | 006D |
|----|------|----|------|----|------|----|------|-------|------|
| L20 | C514 | | | | | | | | |

```
00000                     NAM     INPUT3
00010          *
00020          *   DATA INPUT SUBROUTINE
00030          *
00040          *     THIS SUBROUTINE WAITS FOR AN INTERRUPT
00050          *     TO INPUT DATA TO TEMPORARY STORAGE AND
00060          *     THEN STORES IT IN AN ARRAY.  THE ROUTINE
00070          *     TERMINATES WHEN A LOGIC 1 ON THE "10
00080          *     SECOND" LINE IS DETECTED.  THE SETTING
00090          *     OF THE SCALE SWITCH IS COMPARED AFTER
00100          *     EACH DATA SAMPLE TO THE SETTING UPON
00110          *     ENTRY.  IF THERE IS A DISCREPANCY, AN
00120          *     ERROR IS INDICATED AS SHOWN BELOW.
00130          *     UPON ENTRY, THE ROUTINE OUTPUTS ----
00140          *     TO THE LCD.  ONCE A "RUN" CONDITION HAS
```

```
00150               *     BEEN DETECTED, A--- IS DISPLAYED.  THE
00160               *     ERROR CODES ARE AS FOLLOWS:
00170               *        A--S   SCALE CHANGE DURING MEASUREMENT
00180               *        A-O-   INPUT OVERRANGE
00190               *        AS--   MEMORY SPACE EXCEEDED (PULSED
00200               *               MODE)
00210               *     THIS INFORMATION IS ALSO STORED IN THE
00220               *     STATUS REGISTER.  WHEN DATA INPUT HAS
00230               *     BEEN COMPLETED, P--- IS DISPLAYED WHILE
00240               *     THE DATA IS PROCESSED.
00254               *
00260        006D   COUNT  EQU    $6D           NUMBER OF A/D DATA POINTS
00270               *
00280        0075   S1     EQU    $75           STATUS STORAGE LOCATION
00290        0076   S2     EQU    S1+1
00300        0077   S3     EQU    S2+1
00310               *
00320        0080   T1     EQU    $80           INPUT TIME TEMPORARY
00330        0081   T2     EQU    T1+1          STORAGE
00335        0082   T3     EQU    T2+1
00340        0083   E1     EQU    T3+1          INPUT ENERGY TEMPORARY
00350        0084   E2     EQU    E1+1          STORAGE
00355        0085   E3     EQU    E2+1
00360               *
00370        0086   TEMP   EQU    $86           INDEX REGISTER TEMPORARY
00380               *                           STORAGE
00390        0088   SCALE  EQU    $88           SCALE CODE
00400        0089   TENSEC EQU    $89           TEN SECOND INDICATOR
00410        0100   ASTART EQU    $0100         LOCATION OF FIRST DATA
00420               *                           POINT
00430        9000   DISP1  EQU    $9000         LOCATION OF LIQUID CRYSTAL
00440        9001   DISP2  EQU    DISP1+1       DISPLAY
00450        9002   DISP3  EQU    DISP2+1
00460               *
00470        9003   OUT    EQU    $9003         DATA OUTPUT PORT
00475        C74B   BACK   EQU    $C74B         REENTRY TO RESET ROUTINE
00480               *
00490 C530                 ORG    $C530
00500               *
00510 C530 7F 9000         CLR    DISP1         STORE ---- IN LCD.
00520 C533 CE EEEE         LDX    #$EEEE
00530 C536 FF 9001         STX    DISP2
00540 C539 DF 76           STX    S2            STORE S--- IN STATUS
00550 C53B 86 5E           LDA A  #$5E          REGISTER.
00560 C53D 97 76           STA A  S2
00570 C53F 7F 0089         CLR    TENSEC        CLEAR 10 SECONDS INDICATOR.
00580 C542 7F 006D         CLR    COUNT         SET NUMBER OF A/D DATA
00590               *                           POINTS TO ZERO.
00600 C545 CE 0100         LDX    #ASTART       POINT INDEX REGISTER TO
00610 C548 DF 86           STX    TEMP          FIRST AVAILABLE STORAGE
00620               *                           LOCATION.
00630 C54A B6 5005         LDA A  $5005         READ SETTING OF SCALE
00640 C54D 84 03           AND A  #03           SWITCH.
00650 C54F F6 5005         LDA B  $5005         READ SETTING OF FILTER
00660 C552 C4 04           AND B  #04           SWITCH.
00670 C554 27 01           BEQ    L20
00680 C556 4C              INC A                FILTER IN.  ADJUST BY INDI-
00690               *                           CATING NEXT HIGHER SCALE.
00700 C557 97 88    L20    STA A  SCALE         STORE SCALE INFORMATION.
00710 C559 86 70           LDA A  #$70          PULSE STOP LINE.  SET
00720 C55B B7 9003         STA A  OUT           INTERRUPT ACKNOWLEDGE LINE.
00730 C55E 86 90           LDA A  #$90          PULSE READY LINE AND RESET
00740 C560 B7 9003         STA A  OUT           NMI FLIPFLOP.
00750 C563 86 10           LDA A  #$10
00755 C565 B7 9003         STA A  OUT
00758 C568 B6 5004  L21    LDA A  $5004         WAIT FOR TRIGGER.
```

```
00760 C56B 2A FB          BPL   L21
00775 C56D 7F 9003        CLR   OUT         CLEAR INTERRUPT ACKNOWLEDGE.
00780 C570 CE DEEE        LDX   #$DEEE      TRIGGER HAS OCCURRED. STORE
00790 C573 FF 9001        STX   DISP2       A--- IN DISPLAY.
00800 C576 C6 10    L26   LDA B #$10        SET UP B FOR INTERRUPT ACK-
00810                *                      NOWLEDGEMENT.
00820 C578 0E            CLI                CLEAR INTERRUPT MASK.
00830 C579 3E            WAI                WAIT FOR INTERRUPT.
00840                *
00850 C57A 0F            SEI                AN INTERRUPT HAS OCCURRED.
00860                *                      MASK FURTHER INTERRUPTS.
00870 C57B B6 5004       LDA A $5004        HAS 10 SECONDS EXPIRED?
00880 C57E 84 40         AND A #$40
00890 C580 27 0C         BEQ   L22
00900 C582 C6 80         LDA B #$80         YES. INDICATE SO.
00910 C584 D7 89         STA B TENSEC
00912 C586 86 40         LDA A #$40         STOP COUNTERS.
00914 C588 B7 9003       STA A OUT
00916 C58B 7F 9003       CLR   OUT
00920 C58E DE 86    L22  LDX   TEMP
00930 C590 96 80         LDA A T1           STORE TIME IN ARRAY.
00940 C592 A7 00         STA A 0,X
00950 C594 96 81         LDA A T2
00960 C596 A7 01         STA A 1,X
00970 C598 96 82         LDA A T3
00980 C59A A7 02         STA A 2,X
00990 C59C 96 83         LDA A E1           STORE ENERGY IN ARRAY.
01000 C59E A7 03         STA A 3,X
01010 C5A0 96 84         LDA A E2
01020 C5A2 A7 04         STA A 4,X
01030 C5A4 96 85         LDA A E3
01040 C5A6 A7 05         STA A 5,X
01050 C5A8 B6 5005       LDA A $5005        RECOMPUTE SCALE CODE.
01060 C5AB 84 03         AND A #03
01070 C5AD F6 5005       LDA B $5005
01080 C5B0 C4 04         AND B #04
01090 C5B2 27 01         BEQ   L23
01100 C5B4 4C            INC A
01110 C5B5 91 88    L23  CMP A SCALE        COMPARE TO ORIGINAL
01120 C5B7 27 08         BEQ   L24          SETTING.
01130 C5B9 96 77         LDA A S3           SCALE SETTING HAS CHANGED
01140 C5BB 84 F0         AND A #$F0         DURING MEASUREMENT.
01150 C5BD 8A 05         ORA A #05          STORE S--S IN STATUS REGISTER
01160 C5BF 97 77         STA A S3           AND A--S IN DISPLAY.
01170 C5C1 B6 5004  L24  LDA A $5004        CHECK FOR OVERRANGE.
01180 C5C4 84 08         AND A #$08
01190 C5C6 27 09         BEQ   L27
01200 C5C8 96 77         LDA A S3           OVERRANGE HAS OCCURRED.
01210 C5CA 84 0F         AND A #$0F         STORE S-0- IN STATUS REGISTER
01220 C5CC 97 77         STA A S3           AND A-0- IN DISPLAY.
01230 C5CE B7 9002       STA A DISP3
01240 C5D1 08      L27   INX                POINT INDEX REGISTER TO
01250 C5D2 08            INX                NEXT AVAILABLE ARRAY
01260 C5D3 08            INX                STORAGE LOCATION.
01270 C5D4 08            INX
01280 C5D5 08            INX
01290 C5D6 08            INX
01300 C5D7 DF 86         STX   TEMP
01310 C5D9 8C 07DE       CPX   #$07DE       HAS MEMORY SPACE BEEN
01320 C5DC 26 12         BNE   L25          EXCEEDED?
01330 C5DE 86 C5         LDA A #$C5         YES. STORE PS-- IN THE
01340 C5E0 B7 9001       STA A DISP2        DISPLAY AND SS-- IN THE
01350 C5E3 86 55         LDA A #$55         STATUS REGISTER.
01360 C5E5 97 76         STA A S2
01370 C5E7 86 40         LDA A #$40         STOP COUNTERS.
01372 C5E9 B7 9003       STA A OUT
```

```
01374 C5EC 7F 9003           CLR     OUT
01376 C5EF 39                RTS             RETURN TO CALLING ROUTINE.
01380 C5F0 96 89      L25    LDA A   TENSEC  STORAGE SPACE HAS NOT BEEN
01390 C5F2 2A 82             BPL     L26     EXCEEDED. HAS TEN SECONDS
01400                  *                     ELAPSED?
01402 C5F4 86 CE             LDA A   #$CE    YES. STORE P--- IN THE
01404 C5F6 B7 9001           STA A   DISP2   DISPLAY.
01430 C5F9 39                RTS             RETURN TO CALLING ROUTINE.
01440                  *
01450                         END
```

SYMBOL TABLE

```
:OUNT  006D   S1     0075   S2     0076   S3     0077   T1     0080
 2     0081   T3     0082   E1     0083   E2     0084   E3     0085
 EMP   0086   SCALE  0088   TENSEC 0089   ASTART 0100   DISP1  9000
 ISP2  9001   DISP3  9002   OUT    9003   BACK   C74B   L20    C557
 21    C568   L26    C576   L22    C58E   L23    C5B5   L24    C5C1
 27    C5D1   L25    C5F0
00000                       NAM    CAL3
00010                *
00020                *       BACKGROUND/CALIBRATION SUBROUTINE
00030                *
00040                *       DEPENDING ON THE ENTRY POINT, THIS ROUTINE
00050                *       EITHER PERFORMS A BACKGROUND OR A CALIBRATION
00060                *       FUNCTION. IN THE BACKGROUND MODE, THE BACK-
00070                *       GROUND AVERAGE POWER IS DETERMINED FOR BOTH
00080                *       THE A/D AND THE V/F CONVERTER. THE BACKGROUND
00090                *       ENERGY MEASURED FROM THE A/D IS STORED IN
00100                *       "ENERGY OF FIRST PULSE" AND THE ENERGY MEASURED
00110                *       FROM THE V/F IS STORED IN "TOTAL ENERGY."
00120                *       IN THE CALIBRATION MODE, THIS ROUTINE FINDS
00130                *       THE CORRECTION FACTOR FOR DATA FROM THE A/D
00140                *       AND V/F CONVERTERS. THE MEASURED AVERAGE
00150                *       POWER IS DIVIDED INTO THE KNOWN AVERAGE POWER
00160                *       OF THE CALIBRATION SOURCE TO DETERMINE THE
00170                *       CORRECTION FACTORS. THE CORRECTION FACTOR FOR
00180                *       THE A/D IS DISPLAYED IN "ENERGY OF FIRST PULSE"
00190                *       AND THE CORRECTION FACTOR FOR THE V/F IS DIS-
00200                *       PLAYED IN "TOTAL ENERGY." IN EITHER MODE,
00210                *       CONTROL FLOWS TO PROCEDURE TXEED, WHERE THE
00212                *       TIME AT WHICH THE BACKGROUND/CALIBRATION SOURCE
00214                *       WOULD EXCEED CLASS I IS DETERMINED.
00230                *
00240                *       SUBROUTINES CALLED: FSUB2, FMULT2, FDIV2,
00250                *           TSCALE, ESCALE
00260                *
00300         CC0B          FSUB2  EQU     $CC0B
00310         001C          EMIN   EQU     $1C      MINUEND EXPONENT
00320         001D          MMIN1  EQU     EMIN+1   MINUEND MANTISSA
00330         001F          ESUB   EQU     EMIN+3   SUBTRAHEND EXPONENT
00340         0020          MSUB1  EQU     ESUB+1   SUBTRAHEND MANTISSA
00350         0019          EDIF   EQU     $19      DIFFERENCE EXPONENT
00360         001A          MDIF1  EQU     EDIF+1   DIFFERENCE MANTISSA
00370                 *
00380         CD90          FMULT2 EQU     $CD90
00390         0023          EMPCND EQU     $23      MULTIPLICAND EXPONENT
00400         0024          MPCND1 EQU     EMPCND+1  MULTIPLICAND MANTISSA
00410         0026          EMPIER EQU     EMPCND+3  MULTIPLIER EXPONENT
00420         0027          MPIER1 EQU     EMPIER+1  MULTIPLIER MANTISSA
00430         0029          EPROD  EQU     EMPIER+3  PRODUCT EXPONENT
00440         002A          MPROD1 EQU     EPROD+1   PRODUCT MANTISSA
00450                 *
00460         CE20          FDIV2  EQU     $CE20
```

```
00470        0034          EDND    EQU     $34             DIVIDEND EXPONENT
00480        0035          MDND1   EQU     EDND+1          DIVIDEND MANTISSA
00490        0037          EDOR    EQU     EDND+3          DIVISOR EXPONENT
00500        0038          MDOR1   EQU     EDOR+1          DIVISOR MANTISSA
00510        003A          EQNT    EQU     EDOR+3          QUOTIENT EXPONENT
00520        003B          MQNT1   EQU     EQNT+1          QUOTIENT MANTISSA
00530                      *
00540        0078          EACAL   EQU     $78             CORRECTION FACTOR
00550        0079          MACAL1  EQU     EACAL+1          FOR A/D
00560        007B          EVCAL   EQU     EACAL+3         CORRECTION FACTOR
00570        007C          MVCAL1  EQU     EVCAL+1          FOR V/F
00590                      *
00600        C7C0          TSCALE  EQU     $C7C0
00610                      *
00620        CAC0          ESCALE  EQU     $CAC0
00630                      *
00700        008C          EADB    EQU     $8C             A/D BACKGROUND EXPONENT
00710        008D          MADB1   EQU     EADB+1          A/D BACKGROUND MANTISSA
00720        008F          EVFB    EQU     EADB+3          V/F BACKGROUND EXPONENT
00730        0090          MVFB1   EQU     EVFB+1          V/F BACKGROUND MANTISSA
00740                      *
00750        0092          ETMP    EQU     $92             T TEMPORARY STORAGE
00760        0093          MTMP1   EQU     ETMP+1          T TEMPORARY STORAGE
00770                      *
00830        0066          ETOT    EQU     $66             TOTAL ENERGY IN 10 SECONDS
00840        0067          MTOT1   EQU     ETOT+1
00850        006A          ETX     EQU     ETOT+4          TIME TO EXCEED CLASS I
00860        006B          MTX1    EQU     ETX+1
00870        006E          EFPUL   EQU     ETX+4           ENERGY IN FIRST PULSE
00880        006F          MFPUL1  EQU     EFPUL+1
00890        0072          EWFP    EQU     EFPUL+4         WIDTH OF FIRST PULSE
00895        0073          MWFP1   EQU     EWFP+1
00900                      *
00910        0095          CABK    EQU     $95             CAL/BKGND INDICATOR
00920        0089          ADVF    EQU     $89             DATA SOURCE INDICATOR
00950                      *
00960        0100          ASTART  EQU     $0100           LOCATION OF FIRST DATA POINT
00970                      *
00980        CB60          TXEED   EQU     $CB60           CONTROL FLOWS TO PROCEDURE
00990                      *                               TXEED.
01000                      *
01010        00F3          ECAL    EQU     $F3             AVERAGE POWER OF CAL SOURCE
01020        4EA5          MCAL1   EQU     $4EA5           (75.00 MICROWATTS).
01030                      *
01032 C408                         ORG     $C408           ENTRY POINT FOR BKGND
01034                      *
01036 C408 7F 0095                 CLR     CABK            INDICATE BACKGROUND MODE.
01038 C408 20 11                   BRA     L10
01040                      *
01042 C40D                         ORG     $C40D           ENTRY POINT FOR CAL3
01044                      *
01046 C40D C6 80                   LDA B   #$80            INDICATE CAL MODE.
01048 C40F D7 95                   STA B   CABK
01052 C411 86 01                   LDA A   #01             INITIALIZE CAL FACTOR FOR
01053 C413 CE 4000                 LDX     #$4000          USE BY ESCALE.
01054 C416 97 78                   STA A   EACAL
01055 C418 DF 79                   STX     MACAL1
01056 C41A 97 7B                   STA A   EVCAL
01057 C41C DF 7C                   STX     MVCAL1
01060 C41E 7F 0089  L10            CLR     ADVF            FIRST DATA ASSUMED FROM A/D.
01070 C421 CE 0100                 LDX     #ASTART         POINT INDEX REGISTER TO THE
01080                      *                               A/D DATA.
01090 C424 A6 00    L00            LDA A   0,X             FETCH TIME COUNTS.
01100 C426 EE 01                   LDX     1,X
01110 C428 97 34                   STA A   EDND
01120 C42A DF 35                   STX     MDND1
```

```
01130 C42C BD C7C0         JSR      TSCALE       CONVERT TO SECONDS.
01140 C42F 96 3A            LDA A    EQNT
01150 C431 DE 3B            LDX      MQNT1
01160 C433 97 92            STA A    ETMP         SAVE T.
01170 C435 DF 93            STX      MTMP1
01180 C437 D6 89            LDA B    ADVF         DATA FROM A/D?
01190 C439 2B 0C            BMI      L02
01200 C43B 97 72            STA A    EWFP         YES. STORE WIDTH OF
01210 C43D DF 73            STX      MWFP1        FIRST PULSE.
01220 C43F B6 0103          LDA A    ASTART+3     FETCH A/D ENERGY COUNTS.
01230 C442 FE 0104          LDX      ASTART+4
01240 C445 20 06            BRA      L01
01250 C447 B6 0109   L02    LDA A    ASTART+9     NO. FETCH V/F ENERGY
01260 C44A FE 010A          LDX      ASTART+10    COUNTS.
01270 C44D 97 34    L01    STA A    EDND         PASS TO ESCALE.
01280 C44F DF 35            STX      MDND1
01290 C451 BD CAC0          JSR      ESCALE       CONVERT TO ENERGY IN J.
01300 C454 96 29            LDA A    EPROD
01302 C456 DE 2A            LDX      MPROD1
01304 C458 97 34            STA A    EDND         PASS TO FDIV2.
01306 C45A DF 35            STX      MDND1
01308 C45C D6 95            LDA B    CABK         BACKGROUND MODE?
01310 C45E 2B 0E            BMI      L11
01312 C460 D6 89            LDA B    ADVF         YES. DATA FROM A/D OR
01314 C462 2B 06            BMI      L12          V/F?
01316 C464 97 6E            STA A    EFPUL        DATA FROM A/D. STORE IN
01318 C466 DF 6F            STX      MFPUL1       "ENERGY OF FIRST PULSE."
01320 C468 20 04            BRA      L11
01322 C46A 97 66    L12    STA A    ETOT         DATA FROM V/F. STORE IN
01324 C46C DF 67            STX      MTOT1        "TOTAL ENERGY."
01332 C46E 96 92    L11    LDA A    ETMP         FETCH T.
01334 C470 DE 93            LDX      MTMP1
01336 C472 97 37            STA A    EDOR         PASS TO FDIV2.
01338 C474 DF 38            STX      MDOR1
01340 C476 BD CE20          JSR      FDIV2        FIND AVERAGE POWER.
01342 C479 96 3A            LDA A    EQNT
01344 C47B DE 3B            LDX      MQNT1
01346 C47D D6 95            LDA B    CABK         BACKGROUND MODE?
01348 C47F 2B 11            BMI      L13
01350 C481 D6 89            LDA B    ADVF         DATA FROM A/D OR
01352 C483 2B 06            BMI      L14          V/F?
01354 C485 97 8C            STA A    EADB         DATA IS FROM A/D. STORE
01356 C487 DF 8D            STX      MADB1        BACKGROUND AVERAGE POWER.
01358 C489 20 44            BRA      L15
01360 C48B 97 8F    L14    STA A    EVFB         DATA IS FROM V/F. STORE
01362 C48D DF 90            STX      MVFB1        BACKGROUND AVERAGE POWER.
01364 C48F 7E CB60          JMP      TXEED        TRANSFER CONTROL TO PROCEDURE
01366                *                            TXEED TO COMPUTE TIME AT
01368                *                            WHICH THIS AVERAGE POWER
01369                *                            WOULD EXCEED CLASS I.
01370 C492 97 1C    L13    STA A    EMIN         PASS CAL DATA TO FSUB2.
01380 C494 DF 1D            STX      MMIN1
01390 C496 D6 89            LDA B    ADVF         DATA FROM A/D?
01400 C498 2B 06            BMI      L03
01410 C49A 96 8C            LDA A    EADB         YES. FETCH A/D BACKGROUND.
01420 C49C DE 8D            LDX      MADB1
01430 C49E 20 04            BRA      L04
01440 C4A0 96 8F    L03    LDA A    EVFB         NO. FETCH V/F BACKGROUND.
01450 C4A2 DE 90            LDX      MVFB1
01460 C4A4 97 1F    L04    STA A    ESUB         PASS TO FSUB2.
01470 C4A6 DF 20            STX      MSUB1
01480 C4A8 BD CC0B          JSR      FSUB2        SUBTRACT BACKGROUND AVERAGE
01490 C4AB 96 19            LDA A    EDIF         POWER.
01500 C4AD DE 1A            LDX      MDIF1
01510 C4AF 97 37            STA A    EDOR
01520 C4B1 DF 38            STX      MDOR1
```

```
01530  C4B3 86 F3          LDA A    #ECAL        FETCH KNOWN AVERAGE POWER
01540  C4B5 CE 4EA5         LDX     #MCAL1       OF CALIBRATION SOURCE.
01550  C4B8 97 34           STA A   EDND
01560  C4BA DF 35           STX     MDND1
01570  C4BC BD CE20         JSR     FDIV2        FIND CORRECTION FACTOR.
01574  C4BF 96 3A           LDA A   EQNT
01576  C4C1 DE 3B           LDX     MQNT1
01580  C4C3 D6 89           LDA B   ADVF         DATA FROM A/D?
01590  C4C5 2B 12           BMI     L05
01600  C4C7 97 78           STA A   EACAL        STORE CORRECTION FACTOR.
01610  C4C9 DF 79           STX     MACAL1
01620  C4CB 97 6E           STA A   EFPUL        STORE CORRECTION FACTOR
01630  C4CD DF 6F           STX     MFPUL1       IN "ENERGY OF FIRST PULSE."
01640  C4CF C6 80    L15    LDA B   #$80         INDICATE THAT A/D DATA
01650  C4D1 D7 89           STA B   ADVF         HAS BEEN PROCESSED.
01660  C4D3 CE 0106         LDX     #ASTART+6    POINT INDEX REGISTER TO
01670  C4D6 7E C424         JMP     L00          V/F DATA AND PROCESS.
01680  C4D9 97 78    L05    STA A   EVCAL        STORE CORRECTION FACTOR.
01690  C4DB DF 7C           STX     MVCAL1
01700  C4DD 97 66           STA A   ETOT         STORE IN "TOTAL ENERGY."
01710  C4DF DF 67           STX     MTOT1
01720  C4E1 97 23           STA A   EMPCND       PREPARE TO MULTIPLY MEASURED
01730  C4E3 DF 24           STX     MPCND1       AVERAGE POWER BY CORRECTION
01740  C4E5 96 37           LDA A   EDOR         FACTOR.
01750  C4E7 DE 38           LDX     MDOR1
01760  C4E9 97 26           STA A   EMPIER
01770  C4EB DF 27           STX     MPIER1       MULTIPLY.
01780  C4ED BD CD90         JSR     FMULT2
01790  C4F0 96 29           LDA A   EPROD        FETCH CORRECTED AVERAGE
01800  C4F2 DE 2A           LDX     MPROD1       POWER.
01810  C4F4 7E CB60         JMP     TXEED        TRANSFER CONTROL TO PROCEDURE
01820               *                            TXEED (SEE ABOVE).
01850               *
01860                       END
```

SYMBOL TABLE

```
FSUB2   CCOB    EMIN    001C    MMIN1   001D    ESUB    001F    MSUB1   0020
EDIF    0019    MDIF1   001A    FMULT2  CD90    EMPCND  0023    MPCND1  0024
EMPIER  0026    MPIER1  0027    EPROD   0029    MPROD1  002A    FDIV2   CE20
EDND    0034    MDND1   0035    EDOR    0037    MDOR1   0038    EQNT    003A
MQNT1   003B    EACAL   0078    MACAL1  0079    EVCAL   007B    MVCAL1  007C
TSCALE  C7C0    ESCALE  CAC0    EADB    008C    MADB1   008D    EVFB    008F
MVFB1   0090    ETMP    0092    MTMP1   0093    ETOT    0066    MTOT1   0067
ETX     006A    MTX1    006B    EFPUL   006E    MFPUL1  006F    EWFP    0072
MWFP1   0073    CABK    0095    ADVF    0089    ASTART  0100    TXEED   CB60
ECAL    00F3    MCAL1   4EA5    L10     C41E    L00     C424    L02     C447
L01     C44D    L12     C46A    L11     C46E    L14     C48B    L13     C492
L03     C4A0    L04     C4A4    L15     C4CF    L05     C4D9
```

```
00000                       NAM     TSCALE
00010               *
00020               *  TIME SCALING SUBROUTINE
00030               *
00040               *  THIS SUBROUTINE CONVERTS TIME COUNTS FROM
00050               *  A 1 MHZ OSCILLATOR TO SECONDS BY DIVIDING
00060               *  BY 10**6. CONTROL RETURNS TO THE CALLING
00070               *  ROUTINE FROM SUBROUTINE FDIV2. INPUT DATA
00080               *  IS ASSUMED TO OCCUPY THE DIVIDEND LOCATIONS
00090               *  OF FDIV2 AND THE OUTPUT DATA APPEARS IN THE
00100               *  QUOTIENT LOCATIONS OF FDIV2.
00110               *
00120               *  SUBROUTINES CALLED:  FDIV2
00450               *
```

```
00460          CE20      FDIV2   EQU     $CE20
00470          0034      EDND    EQU     $34         DIVIDEND EXPONENT
00480          0035      MDND1   EQU     EDND+1      DIVIDEND MANTISSA
00490          0037      EDOR    EQU     EDND+3      DIVISOR EXPONENT
00500          0038      MDOR1   EQU     EDOR+1      DIVISOR MANTISSA
00510          003A      EQNT    EQU     EDOR+3      QUOTIENT EXPONENT
00520          003B      MQNT1   EQU     EQNT+1      QUOTIENT MANTISSA
00530                    *
00540  C7C0                      ORG     $C7C0
00550                    *
00560  C7C0 86 14                LDA A   #$14        FETCH CONSTANT FOR
00570  C7C2 CE 7A12              LDX     #$7A12      10**6.
00580  C7C5 97 37                STA A   EDOR        PASS TO FDIV2.
00590  C7C7 DF 38                STX     MDOR1
00600  C7C9 7E CE20              JMP     FDIV2       TRANSFER CONTROL TO
00610                    *          FDIV2 WHERE THE TIME
00620                    *          COUNTS ARE DIVIDED BY
00630                    *          10**6.  CONTROL RETURNS
00640                    *          TO THE CALLING ROUTINE
00650                    *          FROM FDIV2.
00660                    *
00670                            END
```

SYMBOL TABLE

```
FDIV2  CE20   EDND   0034   MDND1  0035   EDOR   0037   MDOR1  0038
EQNT   003A   MQNT1  003B
00000                            NAM     ESCALE
00010                    *
00020                    *  ENERGY SCALING SUBROUTINE
00030                    *
00040                    *    THIS SUBROUTINE CONVERTS COUNTS FROM AN
00050                    *    A/D OR V/F CONVERTER TO ENERGY IN JOULES,
00060                    *    USING THE SETTING OF THE SCALE AND FILTER
00070                    *    ( X 10) SWITCHES.  THE COMPUTED ENERGY
00080                    *    IS MULTIPLIED BY THE CORRECTION FACTOR
00090                    *    COMPUTED BY THE CALIBRATION PROCEDURE.
00100                    *    CONTROL RETURNS TO THE CALLING ROUTINE
00110                    *    FROM SUBROUTINE FMULT2.  INPUT DATA IS
00120                    *    ASSUMED TO OCCUPY THE DIVIDEND LOCATIONS
00130                    *    OF FDIV2 AND THE OUTPUT DATA APPEARS IN
00140                    *    THE PRODUCT LOCATIONS OF FMULT2.
00150                    *
00160                    *    SUBROUTINES CALLED: FMULT2, FDIV2
00170                    *
00380          CD90      FMULT2  EQU     $CD90
00390          0023      EMPCND  EQU     $23         MULTIPLICAND EXPONENT
00400          0024      MPCND1  EQU     EMPCND+1    MULTIPLICAND MANTISSA
00410          0026      EMPIER  EQU     EMPCND+3    MULTIPLIER EXPONENT
00420          0027      MPIER1  EQU     EMPIER+1    MULTIPLIER MANTISSA
00430          0029      EPROD   EQU     EMPIER+3    PRODUCT EXPONENT
00440          002A      MPROD1  EQU     EPROD+1     PRODUCT MANTISSA
00450                    *
00460          CE20      FDIV2   EQU     $CE20
00470          0034      EDND    EQU     $34         DIVIDEND EXPONENT
00480          0035      MDND1   EQU     EDND+1      DIVIDEND MANTISSA
00490          0037      EDOR    EQU     EDND+3      DIVISOR EXPONENT
00500          0038      MDOR1   EQU     EDOR+1      DIVISOR MANTISSA
00510          003A      EQNT    EQU     EDOR+3      QUOTIENT EXPONENT
00520          003B      MQNT1   EQU     EQNT+1      QUOTIENT MANTISSA
00590                    *
00600          0078      EACAL   EQU     $78         CORRECTION FACTOR
00610          0079      MACAL1  EQU     EACAL+1     FOR A/D
00620          007B      EVCAL   EQU     EACAL+3     CORRECTION FACTOR
```

```
00630        007C    MVCAL1  EQU     EVCAL+1     FOR V/F
00640                *
00900        0088    SCALE   EQU     $88         SCALE AND FILTER SETTING
00530                *
00920        0089    ADVF    EQU     $89         DATA SOURCE INDICATOR
00950                *
00960        C7D0    TABLE   EQU     $C7D0       THE FOLLOWING TABLE
00970                *                           CONTAINS BINARY FLOATING-
00980                *                           POINT CONSTANTS FOR 1, 10,
00990                *                           100, AND 1000, RESPECTIVELY.
01000 C7D0                   ORG     TABLE
01010 C7D0 01                FCB     01,$40,00,04,$50,00,07,$64
      C7D1 40
      C7D2 00
      C7D3 04
      C7D4 50
      C7D5 00
      C7D6 07
      C7D7 64
01020 C7D8 00                FCB     00,$0A,$7D,00
      C7D9 0A
      C7DA 7D
      C7DB 00
01030                *
01040 CAC0                   ORG     $CAC0
01050                *
01060 CAC0 86 22             LDA A   #$22        PREPARE TO DIVIDE INPUT
01070 CAC2 CE 4A81           LDX     #$4A81      COUNTS BY 10**10.
01080 CAC5 D6 89             LDA B   ADVF        DATA FROM A/D?
01090 CAC7 2B 02             BMI     L10
01100 CAC9 8B 04             ADD A   #04         YES. DIVIDE INPUT COUNTS
01110                *                           BY 16 * 10**10.
01120 CACB 97 37     L10     STA A   EDOR        PASS CONVERSION FACTOR
01130 CACD DF 38             STX     MDOR1       TO FDIV2.
01140 CACF BD CE20           JSR     FDIV2       CONVERT COUNTS TO ENERGY.
01150 CAD2 96 3A             LDA A   EQNT
01160 CAD4 DE 3B             LDX     MQNT1
01170 CAD6 97 23             STA A   EMPCND      PASS TO FMULT2.
01180 CAD8 DF 24             STX     MPCND1
01190 CADA CE C7D0           LDX     #TABLE      DETERMINE THE SCALE AND
01200 CADD 96 88             LDA A   SCALE       FILTER SWITCH SETTINGS.
01210 CADF 27 06     L12     BEQ     L11
01220 CAE1 08                INX
01230 CAE2 08                INX
01240 CAE3 08                INX
01250 CAE4 4A                DEC A
01260 CAE5 20 F8             BRA     L12
01270 CAE7 A6 00     L11     LDA A   0,X         FETCH SCALE MULTIPLIER.
01280 CAE9 EE 01             LDX     1,X
01290 CAEB 97 26             STA A   EMPIER      PASS TO FMULT2.
01300 CAED DF 27             STX     MPIER1
01310 CAEF BD CD90           JSR     FMULT2      FIND ENERGY IN J.
01320 CAF2 96 29             LDA A   EPROD
01330 CAF4 DE 2A             LDX     MPROD1
01340 CAF6 97 23             STA A   EMPCND      PASS TO FMULT2.
01350 CAF8 DF 24             STX     MPCND1
01360 CAFA D6 89             LDA B   ADVF        DATA FROM A/D OR V/F?
01370 CAFC 2B 06             BMI     L13
01380 CAFE 96 78             LDA A   EACAL       FETCH CORRECTION FACTOR
01390 CB00 DE 79             LDX     MACAL1      FOR A/D.
01400 CB02 20 04             BRA     L14
01410 CB04 96 7B     L13     LDA A   EVCAL       FETCH CORRECTION FACTOR
01420 CB06 DE 7C             LDX     MVCAL1      FOR V/F.
01430 CB08 97 26     L14     STA A   EMPIER      PASS TO FMULT2.
01440 CB0A DF 27             STX     MPIER1
```

```
01450 CBOC 7E CD90            JMP      FMULT2     TRANSFER CONTROL TO FMULT2,
01460               *                             WHERE THE ENERGY IS MULTIPLIED
01470               *                             BY THE CORRECTION FACTOR
01480               *                             DETERMINED BY THE CAL
01490               *                             PROCEDURE. CONTROL RETURNS TO
01500               *                             THE CALLING ROUTINE FROM FMULT2
01510               *
01520                          END
```

SYMBOL TABLE

```
FMULT2 CD90  EMPCND 0023  MPCND1 0024  EMPIER 0026  MPIER1 0027
EPROD  0029  MPROD1 002A  FDIV2  CE20  EDND   0034  MDND1  0035
EDOR   0037  MDOR1  0038  EQNT   003A  MQNI1  003B  EACAL  0078
MACAL1 0079  EVCAL  007B  MVCAL1 007C  SCALE  0088  ADVF   0089
TABLE  C7D0  L10    CACB  L12    CADF  L11    CAE7  L13    CB04
L14    CB08
00000                          NAM      MEAS
00010               *
00020               *          LASER MEASUREMENT SUBROUTINE
00030               *
00040               *   THIS SUBROUTINE PROCESSES AN ARRAY OF
00050               *   FLOATING-POINT DATA IN WHICH ALL ODD
00060               *   NUMBER ENTRIES ARE TIME IN MICROSECONDS
00070               *   AND ALL EVEN NUMBER ENTRIES ARE PRO-
00080               *   PORTIONAL TO OPTICAL ENERGY. THE
00090               *   ROUTINE DETERMINES AND STORES THE ENERGY
00100               *   OF THE FIRST ENTRY, THE TIME ASSOCIATED
00110               *   WITH THE FIRST ENTRY, THE TOTAL OPTICAL
00120               *   ENERGY OVER TEN SECONDS, AND THE TIME AT
00130               *   WHICH THE OPTICAL SIGNAL EXCEEDS THE
00140               *   THE ACCESSIBLE EMISSION LIMIT FOR A
00150               *   CLASS I LASER. EACH ENERGY POINT IS
00160               *   CORRECTED FOR BACKGROUND AND THE GAIN
00170               *   OF THE ANALOG FRONT END. IF THE DATA
00180               *   DOES NOT EXCEED CLASS I IN TEN SECONDS,
00190               *   CONTROL FLOWS TO PROCEDURE TXEED WHERE
00200               *   THE TIME AT WHICH A LASER OF EQUAL
00210               *   AVERAGE POWER WOULD EXCEED CLASS I IS
00220               *   DETERMINED.
00230               *
00240               *   SUBROUTINES CALLED: FSUB2, FMULT2, FDIV2,
00250               *         SORT, TSCALE, ESCALE, COMPAR3
00260               *
00300       CC0B    FSUB2 EQU    $CC0B
00310       001C    EMIN  EQU    $1C        MINUEND EXPONENT
00320       001D    MMIN1 EQU    EMIN+1     MINUEND MANTISSA
00330       001F    ESUB  EQU    EMIN+3     SUBTRAHEND EXPONENT
00340       0020    MSUB1 EQU    ESUB+1     SUBTRAHEND MANTISSA
00350       0019    EDIF  EQU    $19        DIFFERENCE EXPONENT
00360       001A    MDIF1 EQU    EDIF+1     DIFFERENCE MANTISSA
00370               *
00380       CD90    FMULT2 EQU   $CD90
00390       0023    EMPCND EQU   $23        MULTIPLICAND EXPONENT
00400       0024    MPCND1 EQU   EMPCND+1   MULTIPLICAND MANTISSA
00410       0026    EMPIER EQU   EMPCND+3   MULTIPLIER EXPONENT
00420       0027    MPIER1 EQU   EMPIER+1   MULTIPLIER MANTISSA
00430       0029    EPROD  EQU   EMPIER+3   PRODUCT EXPONENT
00440       002A    MPROD1 EQU   EPROD+1    PRODUCT MANTISSA
00450               *
00460       CE20    FDIV2  EQU   $CE20
00470       0034    EDND   EQU   $34        DIVIDEND EXPONENT
00480       0035    MDND1  EQU   EDND+1     DIVIDEND MANTISSA
00490       0037    EDOR   EQU   EDND+3     DIVISOR EXPONENT
```

```
00500        0038       MDOR1   EQU    EDOR+1      DIVISOR MANTISSA
00510        003A       EQNT    EQU    EDOR+3      QUOTIENT EXPONENT
00520        003B       MQNT1   EQU    EQNT+1      QUOTIENT MANTISSA
00530                   *
00540        CEC0       SQRT    EQU    $CEC0
00550        0042       EARG    EQU    $42         ARGUMENT EXPONENT
00560        0043       MARG1   EQU    EARG+1      ARGUMENT MANTISSA
00570        0045       ESQRT   EQU    EARG+3      SQUARE ROOT EXPONENT
00580        0046       MSQRT1  EQU    ESQRT+1     SQUARE ROOT MANTISSA
00590                   *
00600        C7C0       TSCALE  EQU    $C7C0
00610                   *
00620        CAC0       ESCALE  EQU    $CAC0
00630                   *
00640        CB10       COMPAR  EQU    $CB10
00650        0098       ECPE    EQU    $98         COMPAREE EXPONENT
00660        0099       MCPE1   EQU    ECPE+1      COMPAREE MANTISSA
00670        009B       ECPOR   EQU    ECPE+3      COMPAROR EXPONENT
00680        009C       MCPOR1  EQU    ECPOR+1     COMPAROR MANTISSA
00690                   *
00700        008C       EADB    EQU    $8C         A/D BACKGROUND EXPONENT
00710        008D       MADB1   EQU    EADB+1      A/D BACKGROUND MANTISSA
00720        008F       EVFB    EQU    EADB+3      V/F BACKGROUND EXPONENT
00730        0090       MVFB1   EQU    EVFB+1      V/F BACKGROUND MANTISSA
00740                   *
00750        0092       ETMP    EQU    $92         T TEMPORARY STORAGE
00760        0093       MTMP1   EQU    ETMP+1      T TEMPORARY STORAGE
00770                   *
00780        0086       AEND    EQU    $86         END OF ARRAY POINTER STORAGE
00790                   *
00800        0095       XTMP    EQU    $95         INDEX REGISTER TEMPORARY
00820                   *                          STORAGE
00830        0066       ETOT    EQU    $66         TOTAL ENERGY IN 10 SECONDS
00840        0067       MTOT1   EQU    ETOT+1
00850        006A       ETX     EQU    ETOT+4      TIME TO EXCEED CLASS I
00860        006B       MTX1    EQU    ETX+1
00870        006E       EFPUL   EQU    ETX+4       ENERGY IN FIRST PULSE
00880        006F       MFPUL1  EQU    EFPUL+1
00890        0072       EWFP    EQU    EFPUL+4     WIDTH OF FIRST PULSE
00895        0073       MWFP1   EQU    EWFP+1
00900                   *
00910        006D       COUNT   EQU    $6D         NUMBER OF A/D DATA POINTS
00920        0089       ADVF    EQU    $89         DATA SOURCE INDICATOR
00930        0097       FIRST   EQU    $97         FIRST PULSE INDICATOR
00940        009E       LXEED   EQU    $9E         CLASS I EXCEEDED INDICATOR
00945        00A9       EACH    EQU    $A9         EACH PULSE MODE INDICATOR
00950                   *
00960        0100       ASTART  EQU    $0100       LOCATION OF FIRST DATA POINT
00970                   *
00980        CB60       TXEED   EQU    $CB60       IF CLASS I IS NOT EXCEEDED
00990                   *                          IN 10 SECONDS, CONTROL FLOWS
01000                   *                          TO PROCEDURE TXEED.
 1010 C948                      ORG    $C948
 1020 C948 7F 0089              CLR    ADVF        FIRST DATA ASSUMED TO BE
 1030                   *                          FROM A/D.
 1040 C94B 7F 0097              CLR    FIRST       FIRST PULSE.
 1050 C94E 7F 009E              CLR    LXEED       CLEAR CLASS 1 FLAG.
 1060 C951 CE 0100              LDX    #ASTART     POINT X TO FIRST ENTRY IN
 1070 C954 DF 95       LOO      STX    XTMP        ARRAY.
 1080 C956 A6 00                LDA A  0,X         FETCH TIME COUNTS.
 1090 C958 EE 01                LDX    1,X
 1100 C95A 97 34                STA A  EDND
 1110 C95C DF 35                STX    MDND1
 1120 C95E BD C7C0              JSR    TSCALE      CONVERT TO SECONDS.
 1130 C961 96 3A                LDA A  EQNT
 1140 C963 DE 3B                LDX    MQNT1
```

```
01150 C965 97 92              STA A  ETMP      SAVE TIME T.
01160 C967 DF 93              STX    MTMP1
01170 C969 D6 9E              LDA B  LXEED
01180 C96B 2B 04              BMI    L01       HAS CLASS I BEEN EXCEEDED?
01190 C96D 97 6A              STA A  ETX       UPDATE "TIME TO EXCEED
01200 C96F DF 6B              STX    MTX1      CLASS I."
01210 C971 97 98     L01      STA A  ECPE      PASS TIME TO COMPARISON
01220 C973 DF 99              STX    MCPE1     ROUTINE.
01230 C975 D6 97              LDA B  FIRST     FIRST PULSE?
01240 C977 2B 04              BMI    L02
01250 C979 97 72              STA A  EWFP      YES. STORE WIDTH OF
01260 C97B DF 73              STX    MWFP1     FIRST PULSE.
01270 C97D 97 23     L02      STA A  EMPCND    PASS TIME TO FMULT2.
01280 C97F DF 24              STX    MPCND1
01290 C981 7D 006D            TST    COUNT     ENERGY FROM A/D OR V/F?
01300 C984 26 0A              BNE    L03
01310 C986 86 80              LDA A  #$80      THIS AND SUBSEQUENT DATA
01320 C988 97 89              STA A  ADVF      ARE FROM V/F.
01330 C98A 96 8F              LDA A  EVFB      FETCH V/F BACKGROUND
01340 C98C DE 90              LDX    MVFB1     AVERAGE POWER.
01350 C98E 20 07              BRA    L04
01360 C990 7A 006D L03        DEC    COUNT     DECREMENT COUNT OF A/D
01370 C993 96 8C              LDA A  EADB      DATA POINTS.
01380 C995 DE 8D              LDX    MADB1     FETCH A/D BACKGROUND
01390                *                             AVERAGE POWER.
01400 C997 97 26     L04      STA A  EMPIER    PASS BACKGROUND POWER TO
01410 C999 DF 27              STX    MPIER1    FMULT2.
01420 C99B BD CD90            JSR    FMULT2    COMPUTE BACKGROUND ENERGY
01430 C99E 96 29              LDA A  EPROD     IN TIME T.
01440 C9A0 DE 2A              LDX    MPROD1
01450 C9A2 97 1F              STA A  ESUB      PASS TO FSUB2.
01460 C9A4 DF 20              STX    MSUB1
01470 C9A6 DE 95              LDX    XTMP
01480 C9A8 A6 03              LDA A  3,X       FETCH ENERGY COUNTS.
01490 C9AA EE 04              LDX    4,X
01500 C9AC 97 34              STA A  EDND      PASS TO ESCALE.
01510 C9AE DF 35              STX    MDND1
01520 C9B0 BD CAC0            JSR    ESCALE    CONVERT TO ENERGY IN J.
01530 C9B3 96 29              LDA A  EPROD
01540 C9B5 DE 2A              LDX    MPROD1
01550 C9B7 97 1C              STA A  EMIN      PASS TO FSUB2.
01560 C9B9 DF 1D              STX    MMIN1
01570 C9BB BD CC0B            JSR    FSUB2     SUBTRACT BACKGROUND.
01580 C9BE 96 19              LDA A  EDIF
01590 C9C0 DE 1A              LDX    MDIF1
01600 C9C2 D6 97              LDA B  FIRST     FIRST PULSE?
01610 C9C4 2B 08              BMI    L05
01620 C9C6 97 6E              STA A  EFPUL     YES. STORE ENERGY OF
01630 C9C8 DF 6F              STX    MFPUL1    FIRST PULSE.
01640 C9CA C6 80              LDA B  #$80      INDICATE THAT FIRST PULSE
01650 C9CC D7 97              STA B  FIRST     HAS BEEN PROCESSED.
01660 C9CE 97 66     L05      STA A  ETOT      UPDATE TOTAL ENERGY.
01670 C9D0 DF 67              STX    MTOT1
01680 C9D2 D6 9E              LDA B  LXEED     HAS CLASS I BEEN EXCEEDED?
01690 C9D4 2A 01              BPL    L06
01700 C9D6 39                 RTS              YES. RETURN TO CALLING
01710                *                         ROUTINE. TOTAL ENERGY IS
01720                *                         THAT FOR 10 SECONDS.
01730 C9D7 86 F1     L06      LDA A  #$F1      PREPARE TO COMPARE T TO
01740 C9D9 CE 53E3            LDX    #$53E3    20 MICROSECONDS.
01750 C9DC 97 9B              STA A  ECPOR
01760 C9DE DF 9C              STX    MCPOR1
01770 C9E0 BD CB10            JSR    COMPAR3   COMPARE.
01780 C9E3 2B 59              BMI    L07
01790 C9E5 96 66              LDA A  ETOT      T< OR = 20 MICROSECONDS.
01800 C9E7 DE 67              LDX    MTOT1
```

```
01810 C9E9 97 98           STA A  ECPE      PREPARE TO COMPARE ENERGY
01820 C9EB DF 99           STX    MCPE1     TO LIMIT FOR 20 MICRO-
01830 C9ED 86 EA           LDA A  #$EA      SECONDS (0.2 MICROJOULES).
01840 C9EF CE 6B60         LDX    #$6B60
01850 C9F2 97 9B           STA A  ECPOR
01860 C9F4 DF 9C           STX    MCPOR1
01870 C9F6 BD CB10         JSR    COMPAR3   COMPARE.
01880 C9F9 2A 03           BPL    L09
01885 C9FB 7E CAA5         JMP    L08
01890 C9FE DE 95    L09    LDX    XTMP      POINT INDEX REGISTER TO
01900 CA00 08              INX              THE NEXT DATA POINT IN
01910 CA01 08              INX              THE INPUT ARRAY.
01920 CA02 08              INX
01930 CA03 08              INX
01940 CA04 08              INX
01950 CA05 08              INX
01960 CA06 9C 86           CPX    AEND      HAS ALL DATA BEEN PROCESSED?
01970 CA08 27 03           BEQ    L0A
01972 CA0A 7E C954         JMP    L00
01974 CA0D 96 A9    L0A    LDA A  EACH      EACH PULSE MODE?
01976 CA0F 2A 13           BPL    L0B
01978 CA11 86 0E           LDA A  #$0E      YES. SET TIME TO EXCEED
01979 CA13 CE 4E20         LDX    #$4E20    CLASS I TO 10**4 SECONDS
01980 CA16 97 6A           STA A  ETX       AND TOTAL ENERGY TO
01982 CA18 DF 6B           STX    MTX1      ZERO.
01984 CA1A 86 80           LDA A  #$80
01986 CA1C CE 0000         LDX    #0000
01988 CA1F 97 66           STA A  ETOT
01989 CA21 DF 67           STX    MTOT1
01990 CA23 39              RTS              RETURN TO CALLING ROUTINE.
01992 CA24 96 66    L0B    LDA A  ETOT      CLASS I HAS NOT BEEN
01995 CA26 DE 67           LDX    MTOT1     EXCEEDED BY TEN SECONDS.
02000 CA28 97 34           STA A  EDND      FETCH TOTAL ENERGY AND PASS
02010 CA2A DF 35           STX    MDND1     TO FDIV2.
02020 CA2C 96 92           LDA A  ETMP      FETCH T AND PASS TO FDIV2.
02030 CA2E DE 93           LDX    MTMP1
02040 CA30 97 37           STA A  EDOR
02050 CA32 DF 38           STX    MDOR1
02060 CA34 BD CE20         JSR    FDIV2     FIND AVERAGE POWER OVER
02070 CA37 96 3A           LDA A  EQNT      TEN SECONDS.
02080 CA39 DE 3B           LDX    MQNT1
02090 CA3B 7E CB60         JMP    TXEED     TRANSFER CONTROL TO TXEED
02100              *                        TO COMPUTE TIME AT WHICH THIS
02110              *                        AVERAGE POWER WOULD EXCEED
02120              *                        CLASS I.
02130 CA3E 96 92    L07    LDA A  ETMP      T > 20 MICROSECONDS.
02140 CA40 DE 93           LDX    MTMP1     FETCH T.
02141 CA42 97 9B           STA A  ECPOR
02142 CA44 DF 9C           STX    MCPOR1
02143 CA46 86 04           LDA A  #04       PREPARE TO COMPARE T TO
02144 CA48 CE 5000         LDX    #$5000    10 SECONDS.
02145 CA4B 97 98           STA A  ECPE
02146 CA4D DF 99           STX    MCPE1
02147 CA4F BD CB10         JSR    COMPAR3   COMPARE.
02148 CA52 2A B9           BPL    L0A
02149 CA54 96 92           LDA A  ETMP      T < 10 SECONDS.
02150 CA56 DE 93           LDX    MTMP1
02152 CA58 97 42           STA A  EARG
02160 CA5A DF 43           STX    MARG1
02170 CA5C BD CEC0         JSR    SQRT      FIND THE SQUARE ROOT OF T.
02180 CA5F 96 45           LDA A  ESQRT
02190 CA61 DE 46           LDX    MSQRT1
02200 CA63 97 42           STA A  EARG      PASS TO SQRT.
02210 CA65 DF 43           STX    MARG1
02220 CA67 97 23           STA A  EMPCND    PASS TO FMULT2.
02230 CA69 DF 24           STX    MPCND1
```

```
02240 CA6B BD CEC0        JSR      SQRT      FIND THE FORTH ROOT OF T.
02250 CA6E 96 45          LDA A    ESQRT
02260 CA70 DE 46          LDX      MSQRT1
02270 CA72 97 26          STA A    EMPIER    PASS TO FMULT2.
02280 CA74 DF 27          STX      MPIER1
02290 CA76 BD CD90        JSR      FMULT2    FIND T**(3/4)
02300 CA79 96 29          LDA A    EPROD
02310 CA7B DE 2A          LDX      MPROD1
02320 CA7D 97 23          STA A    EMPCND    PASS TO FMULT2
02330 CA7F DF 24          STX      MPCND1
02340 CA81 86 F6          LDA A    #$F6      PREPARE TO MULTIPLY
02350 CA83 CE 5BC0        LDX      #$5BC0    T**(3/4) BY
02360 CA86 97 26          STA A    EMPIER    7.0 * 10**(-4).
02370 CA88 DF 27          STX      MPIER1
02380 CA8A BD CD90        JSR      FMULT2    MULTIPLY.
02390 CA8D 96 29          LDA A    EPROD     FETCH CLASS I LIMIT
02400 CA8F DE 2A          LDX      MPROD1    FOR TIME T.
02410 CA91 97 9B          STA A    ECPOR     PASS TO COMPARISON
02420 CA93 DF 9C          STX      MCPOR1    ROUTINE.
02430 CA95 96 66          LDA A    ETOT      FETCH ENERGY.
02440 CA97 DE 67          LDX      MTOT1
02450 CA99 97 98          STA A    ECPE      PASS TO COMPARISON ROUTINE.
02460 CA9B DF 99          STX      MCPE1
02470 CA9D BD CB10        JSR      COMPAR3   COMPARE ENERGY TO
02480 CAA0 2B 03          BMI      L08       CLASS I LIMIT.
02482 CAA2 7E C9FE        JMP      L09
02484 CAA5 96 A9    L08   LDA A    EACH      EACH PULSE MODE?
02486 CAA7 2A 01          BPL      LOC       YES.
02488 CAA9 39             RTS                RETURN TO CALLING ROUTINE.
02490 CAAA DE 86    LOC   LDX      AEND      CLASS I LIMIT EXCEEDED.
02500 CAAC 09             DEX                POINT INDEX REGISTER TO THE
02510 CAAD 09             DEX                LAST DATA POINT.
02520 CAAE 09             DEX
02530 CAAF 09             DEX
02540 CAB0 09             DEX
02550 CAB1 09             DEX
02560 CAB2 C6 80          LDA B    #$80      INDICATE THAT CLASS I
02570 CAB4 D7 9E          STA B    LXEED     HAS BEEN EXCEEDED.
02575 CAB6 7F 006D        CLR      COUNT     CLEAR A/D DATA POINT COUNTER.
02580 CAB9 7E C954        JMP      L00       FIND TOTAL ENERGY IN 10 SEC.
02590                *
02600                     END
```

SYMBOL TABLE

```
FSUB2  CC0B   EMIN   001C   MMIN1  001D   ESUB   001F   MSUB1  0020
EDIF   0019   MDIF1  001A   FMULT2 CD90   EMPCND 0023   MPCND1 0024
EMPIER 0026   MPIER1 0027   EPROD  0029   MPROD1 002A   FDIV2  CE20
EDND   0034   MDND1  0035   EDOR   0037   MDOR1  0038   EQNT   003A
MQNT1  003B   SQRT   CEC0   EARG   0042   MARG1  0043   ESQRT  0045
MSQRT1 0046   TSCALE C7C0   ESCALE CAC0   COMPAR CB10   ECPE   0098
MCPE1  0099   ECPOR  009B   MCPOR1 009C   EADB   008C   MADB1  008D
EVFB   008F   MVFB1  0090   ETMP   0092   MTMP1  0093   AEND   0086
XTMP   0095   ETOT   0066   MTOT1  0067   ETX    006A   MTX1   006B
EFPUL  006E   MFPUL1 006F   EWFP   0072   MWFP1  0073   COUNT  006D
ADVF   0089   FIRST  0097   LXEED  009E   EACH   00A9   ASTART 0100
TXEED  CB60   L00    C954   L01    C971   L02    C97D   L03    C990
L04    C997   L05    C9CE   L06    C9D7   L09    C9FE   L0A    CA0D
L0B    CA24   L07    CA3E   L08    CAA5   LOC    CAAA

00000                  NAM      TXEED
00010         *
00020         *   TIME TO EXCEED CLASS I SUBROUTINE
00030         *
```

```
00040                *     THIS PROCEDURE DETERMINES THE TIME AT WHICH AN
00050                *     OPTICAL SIGNAL WOULD EXCEED THE ACCESSIBLE
00060                *     EMISSION LIMIT FOR A CLASS I LASER IF THE
00070                *     AVERAGE POWER MEASURED IN TEN SECONDS WOULD
00080                *     CONTINUE INDEFINATELY.  THE AVERAGE POWER
00090                *     MEASURED IN TEN SECONDS IS INPUT VIA THE A
00100                *     ACCUMULATOR AND THE INDEX REGISTER.
00110                *
00120                *     SUBROUTINES CALLED:  FMULT2, FDIV2, COMPAR3
00130                *
00380       CD90     FMULT2  EQU    $CD90
00390       0023     EMPCND  EQU    $23          MULTIPLICAND EXPONENT
00400       0024     MPCND1  EQU    EMPCND+1     MULTIPLICAND MANTISSA
00410       0026     EMPIER  EQU    EMPCND+3     MULTIPLIER EXPONENT
00420       0027     MPIER1  EQU    EMPIER+1     MULTIPLIER MANTISSA
00430       0029     EPROD   EQU    EMPIER+3     PRODUCT EXPONENT
00440       002A     MPROD1  EQU    EPROD+1      PRODUCT MANTISSA
00450                *
00460       CE20     FDIV2   EQU    $CE20
00470       0034     EDND    EQU    $34          DIVIDEND EXPONENT
00480       0035     MDND1   EQU    EDND+1       DIVIDEND MANTISSA
00490       0037     EDOR    EQU    EDND+3       DIVISOR EXPONENT
00500       0038     MDOR1   EQU    EDOR+1       DIVISOR MANTISSA
00510       003A     EQNT    EQU    EDOR+3       QUOTIENT EXPONENT
00520       003B     MQNT1   EQU    EQNT+1       QUOTIENT MANTISSA
00530                *
00640       CB10     COMPAR  EQU    $CB10
00650       0098     ECPE    EQU    $98          COMPAREE EXPONENT
00660       0099     MCPE1   EQU    ECPE+1       COMPAREE MANTISSA
00670       009B     ECPOR   EQU    ECPE+3       COMPAROR EXPONENT
00680       009C     MCPOR1  EQU    ECPOR+1      COMPAROR MANTISSA
00690                *
00850       006A     ETX     EQU    $6A          TIME TO EXCEED CLASS I
00860       006B     MTX1    EQU    ETX+1
00870                *
00875       00A3     TEMP    EQU    $A3
00877                *
00880 CB60           ORG     $CB60
00885                *
00887 CB60 2F 2A             BLE    L1E          PAVE > 0? (INDEX REGISTER
00889                *                            TEST)
00890 CB62 97 37             STA A  EDOR         YES.  STORE AVERAGE POWER.
00900 CB64 DF 38             STX    MDOR1
00910 CB66 86 F8             LDA A  #$F8         PREPARE TO DIVIDE
00920 CB68 CE 7FCC           LDX    #$7FCC       THE LIMIT FOR
00930 CB6B 97 34             STA A  EDND         10 < T < 10**4 BY THE
00940 CB6D DF 35             STX    MDND1        AVERAGE POWER.  (CLASS I
00950                *                            LIMIT = 3.9 * 10**(-3) J.)
00960 CB6F BD CE20           JSR    FDIV2        DIVIDE TO FIND TIME TO
00970 CB72 96 3A             LDA A  EQNT         EXCEED CLASS I.
00980 CB74 DE 3B             LDX    MQNT1
00990 CB76 97 6A             STA A  ETX          STORE IN "TIME TO EXCEED."
01000 CB78 DF 6B             STX    MTX1
01010 CB7A 97 98             STA A  ECPE         PASS TO COMPARISON ROUTINE.
01020 CB7C DF 99             STX    MCPE1
01030 CB7E 86 0E             LDA A  #$0E
01040 CB80 CE 4E20           LDX    #$4E20       COMPARE TIME TO EXCEED
01042 CB83 97 9B             STA A  ECPOR        TO 10**4 SECONDS.
01044 CB85 DF 9C             STX    MCPOR1
01050 CB87 BD CB10           JSR    COMPAR3      COMPARE.
01060 CB8A 2A 0A             BPL    L1A          TIME TO EXCEED > 10**4?
01070 CB8C 86 0E     L1E     LDA A  #$0E         YES.  SET TIME TO EXCEED
01080 CB8E CE 4E20           LDX    #$4E20       TO 10**4 SECONDS.
01090 CB91 97 6A             STA A  ETX          STORE IN "TIME TO EXCEED."
01100 CB93 DF 6B             STX    MTX1
01110 CB95 39               RTS                  RETURN TO CALLING ROUTINE.
```

```
01120 CB96 96 3A    L1A   LDA A  EQNT       TIME TO EXCEED < 10**4
01130 CB98 DE 3B          LDX    MQNT1      SECONDS.
01140 CB9A 97 9B          STA A  ECPOR
01150 CB9C DF 9C          STX    MCPOR1
01160 CB9E 86 04          LDA A  #04        PREPARE TO COMPARE "TIME
01170 CBA0 CE 5000         LDX   #$5000     TO EXCEED" TO TEN SECONDS.
01180 CBA3 97 98          STA A  ECPE
01190 CBA5 DF 99          STX    MCPE1
01200 CBA7 BD CB10        JSR    COMPAR3    COMPARE.
01210 CBAA 2B 01          BMI    L1B
01220 CBAC 39             RTS               TIME > OR = 10 SECONDS.
01230             *                         RETURN TO CALLING ROUTINE.
01240 CBAD 86 F6    L1B   LDA A  #$F6       DIVIDE 7.0 * 10**(-4)
01250 CBAF CE 5BC0        LDX    #$5BC0     BY THE AVERAGE POWER.
01260 CBB2 97 34          STA A  EDND
01270 CBB4 DF 35          STX    MDND1
01280 CBB6 BD CE20        JSR    FDIV2      DIVIDE.
01290 CBB9 96 3A          LDA A  EQNT
01300 CBBB DE 3B          LDX    MQNT1
01310 CBBD C6 02          LDA B  #02        INITIALIZE LOOP COUNTER.
01320 CBBF D7 A3          STA B  TEMP
01330             *                         THIS IS A LOOP THAT IS
01340             *                         EXECUTED TWICE.  THE FIRST
01350 CBC1 97 23    L1C   STA A  EMPCND     PASS FINDS
01360 CBC3 DF 24          STX    MPCND1     (((7.0 * 10**(-4))/PAVE)**2
01370 CBC5 97 26          STA A  EMPIER     AND THE SECOND PASS FINDS
01380 CBC7 DF 27          STX    MPIER1     (((7.0 * 10**(-4))/PAVE)**4,
01390 CBC9 BD CD90        JSR    FMULT2     THE TIME TO EXCEED CLASS I
01400 CBCC 96 29          LDA A  EPROD      FOR T BETWEEN 20 MICROSECONDS
01410 CBCE DE 2A          LDX    MPROD1     AND 10 SECONDS.
01420 CBD0 7A 00A3        DEC    TEMP
01430 CBD3 26 EC          BNE    L1C        LOOP COMPLETED?
01440 CBD5 97 6A          STA A  ETX        YES.  STORE "TIME TO EXCEED."
01450 CBD7 DF 6B          STX    MTX1
01460 CBD9 97 9B          STA A  ECPOR      COMPARE THE NEW TIME TO
01470 CBDB DF 9C          STX    MCPOR1     EXCEED TO 1/4 SECOND.
01480 CBDD 86 FF          LDA A  #$FF
01490 CBDF CE 4000        LDX    #$4000
01492 CBE2 97 98          STA A  ECPE
01494 CBE4 DF 99          STX    MCPE1
01500 CBE6 BD CB10        JSR    COMPAR3    COMPARE.
01510 CBE9 2A 09          BPL    L1D
01520 CBEB 86 80          LDA A  #$80       TIME TO EXCEED < 1/4 SEC.
01530 CBED CE 0000        LDX    #0000      SET TO ZERO.
01540 CBF0 97 6A          STA A  ETX
01550 CBF2 DF 6B          STX    MTX1
01560 CBF4 39      L1D    RTS               RETURN TO CALLING ROUTINE.
01570             *
01580                     END
```

SYMBOL TABLE

```
FMULT2 CD90   EMPCND 0023   MPCND1 0024   EMPIER 0026   MPIER1 0027
EPROD  0029   MPROD1 002A   FDIV2  CE20   EDND   0034   MDND1  0035
EDOR   0037   MDOR1  0038   EQNT   003A   MQNT1  003B   COMPAR CB10
ECPE   0098   MCPE1  0099   ECPOR  009B   MCPOR1 009C   ETX    006A
MTX1   006B   TEMP   00A3   L1E    CB8C   L1A    CB96   L1B    CBAD
L1C    CBC1   L1D    CBF4
00000                  NAM    IFLOAT
00010           *
00020           *   FLOATING-POINT CONVERSION PROCEDURE
00030           *
00040           *   THIS ROUTINE CONVERTS AN ARRAY OF INPUT 24-BIT
00050           *   INTEGERS TO FLOATING-POINT BY CALLING FLOAT3.
```

```
00060                  *     THE INTEGERS ARE REPLACED IN THE ARRAY BY THE
00070                  *     FLOATING-POINT EQUIVALENT.
00080                  *
00090                  *   SUBROUTINES CALLED:  FLOAT3
00100        CF48         FLOAT3 EQU     $CF48
00110        0060         INT1   EQU     $60        INTEGER
00120        0061         INT2   EQU     INT1+1
00130        0063         EFLT   EQU     INT1+3     FLOATING-POINT NUMBER
00140        0064         MFLT1  EQU     EFLT+1
00150        0065         MFLT2  EQU     MFLT1+1
00160                  *
00170        008A         TEMP   EQU     $8A        INDEX REGISTER TEMPORARY
00180                  *                            STORAGE
00190        0086         AEND   EQU     $86        LOCATION OF END OF ARRAY
00200                  *                            POINTER
00210        0100         ASTART EQU     $0100      LOCATION OF FIRST DATA
00220                  *                            POINT IN INPUT ARRAY
00230                  *
00240 C700                      ORG     $C700
00250                  *
00260 C700 CE 0100              LDX     #ASTART    POINT INDEX REGISTER TO
00270 C703 DF 8A        L41     STX     TEMP       BEGINNING OF INPUT ARRAY
00280                  *                           AND SAVE.
00290 C705 A6 00                LDA A   0,X        FETCH ENTRY.
00300 C707 EE 01                LDX     1,X
00310 C709 97 60                STA A   INT1       PASS TO FLOAT3.
00320 C70B DF 61                STX     INT2
00330 C70D BD CF48              JSR     FLOAT3     CONVERT TO FLOATING POINT.
00340 C710 DE 8A                LDX     TEMP       RESTORE INDEX POINTER.
00350 C712 96 63                LDA A   EFLT
00360 C714 A7 00                STA A   0,X        STORE FLOATING-POINT
00370 C716 96 64                LDA A   MFLT1      NUMBER BACK IN ARRAY.
00380 C718 A7 01                STA A   1,X
00390 C71A 96 65                LDA A   MFLT2
00400 C71C A7 02                STA A   2,X
00410 C71E 08                   INX                POINT INDEX REGISTER TO NEXT
00420 C71F 08                   INX                ARRAY ENTRY.
00430 C720 08                   INX
00440 C721 9C 86                CPX     AEND       HAS ALL DATA BEEN PROCESSED?
00450 C723 26 DE                BNE     L41        IF SO,
00460 C725 39                   RTS                RETURN TO CALLING ROUTINE.
00470                  *
00480                           END
```

SYMBOL TABLE

```
FLOAT3 CF48    INT1   0060    INT2   0061    EFLT   0063    MFLT1  0064
MFLT2  0065    TEMP   008A    AEND   0086    ASTART 0100    L41    C703

00000                          NAM     FLOAT3
00010                  *
00020                  *       24-BIT INTEGER-TO-FLOATING-POINT
00030                  *             CONVERSION SUBROUTINE
00040                  *
00050                  *    THIS ROUTINE CONVERTS A 24-BIT POSITIVE
00060                  *    INTEGER TO A FLOATING-POINT NUMBER.
00070                  *
00080        CD68         ROUND2 EQU     $CD68      CONTROL FLOWS TO PROCEDURE
00090                  *                            ROUND2.
00100                  *
00110        0060         INT1   EQU     $60        INPUT
00120        0061         INT2   EQU     INT1+1     INTEGER
00130        0062         INT3   EQU     INT2+1
00140        0063         EFLT   EQU     $63        OUTPUT
```

```
00150        0064      MFLT1   EQU    EFLT+1     FLOATING-POINT
00160        0065      MFLT2   EQU    MFLT1+1    NUMBER
00170                  *
00172        000E      TEMP1   EQU    $0E        FRACTION LOCATION
00174        000F      TEMP2   EQU    TEMP1+1    OF ROUND2
00176                  *
00180 CF48             ORG     $CF48
00190                  *
00200 CF48 CE 0000             LDX    #0000      CLEAR FRACTION LOCATION
00210 CF4B DF 0E               STX    TEMP1      OF ROUND2.
00220 CF4D DF 64               STX    MFLT1      CLEAR SIGN BIT.
00230 CF4F 96 60               LDA A  INT1
00240 CF51 26 1C               BNE    LABL45
00250 CF53 96 61               LDA A  INT2       MOST SIGNIFICANT 8 BITS OF
00260 CF55 27 08               BEQ    LABL4A     INTEGER ARE ZERO. SUBTRACT
00270 CF57 C6 0F               LDA B  #$0F       8 FROM THE EXPONENT AND
00280 CF59 D7 63               STA B  EFLT       "SHIFT" INTEGER 8 BITS.
00290 CF5B D6 62               LDA B  INT3
00300 CF5D 20 1A               BRA    LABL4B
00310 CF5F 96 62      LABL4A   LDA A  INT3       TEST LEAST SIGNIFICANT
00320 CF61 26 05               BNE    LABL4C     BYTE OF INTEGER.
00330 CF63 86 80               LDA A  #$80       INTEGER = 0. SET FLOATING-
00340 CF65 97 63               STA A  EFLT       POINT NUMBER TO ZERO.
00350 CF67 39                  RTS               RETURN TO CALLING ROUTINE.
00360 CF68 C6 07      LABL4C   LDA B  #07        MOST SIGNIFICANT 16 BITS OF
00370 CF6A D7 63               STA B  EFLT       INTEGER ARE ZERO. SUBTRACT
00380 CF6C 5F                  CLR B             16 FROM THE EXPONENT AND
00390 CF6D 20 0A               BRA    LABL4B     "SHIFT" INTEGER 16 BITS.
00400 CF6F C6 17      LABL45   LDA B  #$17       MOST SIGNIFICANT BYTE
00410 CF71 D7 63               STA B  EFLT       OF INTEGER IS NONZERO.
00420 CF73 D6 62               LDA B  INT3       INITIALIZE EXPONENT AND
00430 CF75 D7 0E               STA B  TEMP1      PASS LEAST SIGNIFICANT
00440 CF77 D6 61               LDA B  INT2       BYTE OF INTEGER TO THE
00450                  *                         FRACTION LOCATION OF ROUND2.
00460 CF79 4D         LABL4B   TST A
00470 CF7A 2B 0A               BMI    LABL47     IS MSB OF MANTISSA A 1?
00480 CF7C 7A 0063    LABL48   DEC    EFLT       DECREMENT EXPONENT.
00490 CF7F 78 000E             ASL    TEMP1      SHIFT MANTISSA LEFT.
00500 CF82 59                  ROL B
00510 CF83 49                  ROL A
00520 CF84 2A F6               BPL    LABL48
00530 CF86 7C 0063    LABL47   INC    EFLT       MSB OF MANTISSA IS A 1.
00540 CF89 44                  LSR A             INCREMENT EXPONENT AND
00550 CF8A 56                  ROR B             SHIFT MANTISSA RIGHT.
00560 CF8B 76 000E             ROR    TEMP1
00570 CF8E CE 0063             LDX    #EFLT      POINT THE INDEX REGISTER
00580 CF91 7E CD68             JMP    ROUND2     TO THE RESULTANT EXPONENT
00590                  *                         AND TRANSFER CONTROL TO
00600                  *                         PROCEDURE ROUND2.
00610                  *
00620                  END
```

SYMBOL TABLE

```
ROUND2 CD68   INT1   0060   INT2   0061   INT3   0062   EFLT   0063
MFLT1  0064   MFLT2  0065   TEMP1  000E   TEMP2  000F   LABL4A CF5F
LABL4C CF68   LABL45 CF6F   LABL4B CF79   LABL48 CF7C   LABL47 CF86

00000                  NAM    BCDC3
00010
00020                  *   FLOATING-POINT BINARY TO 3-DIGIT BCD
00030                  *   ENGINEERING NOTATION CONVERSION ROUTINE
00040                  *
00050                  *   THIS ROUTINE CONVERTS A FLOATING-POINT
```

```
00060              *   (F.P.) NUMBER TO BCD, SUITABLE FOR A
00070              *   3-DIGIT ENGINEERING DISPLAY. THE ROUTINE
00080              *   OUTPUTS A MANTISSA AND AN EXPONENT IN THE
00090              *   FOLLOWING FORMAT:   X.X.X.    10-YY
00100              *   WHERE XXX IS BETWEEN 100 AND 1000 AND YY
00110              *   IS A MULTIPLE OF 3. CODING OF THE MOST
00120              *   SIGNIFICANT BYTE AND THE RESULTING
00130              *   MANTISSA DISPLAY IS AS FOLLOWS:
00140              *
00150              *   MSBY:    00      01      04     08     40
00160              *DISPLAY:    XXX     1XXX    X.XX   XX.X   -XXX
00170              *
00180              *   THE INPUT F.P. NUMBER IS OVERWRITTEN BY
00190              *   THE PRODUCT OF THE INPUT AND THE PROPER
00200              *   POWER OF TEN TO PLACE THE INPUT BETWEEN
00210              *   THE SIGN OF THE INPUT IS MADE POSITIVE
00220              *   DURING PROCESSING. ZERO IS REPRESENTED
00230              *   AS:  0.00
00240              *
00250              *   SUBROUTINES CALLED:  FMULT2, FDIV2, ROUND2
00260              *
00270      CD90    FMULT2  EQU    $CD90
00280      0023    EMPCND  EQU    $23         INPUT EXPONENT
00290      0024    MPCND1  EQU    EMPCND+1    INPUT MANTISSA
00300      0026    EMPIER  EQU    MPCND1+2    INPUT EXPONENT
00310      0027    MPIER1  EQU    EMPIER+1    INPUT MANTISSA
00320      0029    EPROD   EQU    MPIER1+2    OUTPUT EXPONENT
00330      002A    MPROD1  EQU    EPROD+1     OUTPUT MANTISSA
00340              *
00350      CE20    FDIV2   EQU    $CE20
00360      0034    EDND    EQU    $34         INPUT EXPONENT
00370      0035    MDND1   EQU    EDND+1      INPUT MANTISSA
00380      0037    EDOR    EQU    MDND1+2     INPUT EXPONENT
00390      0038    MDOR1   EQU    EDOR+1      INPUT MANTISSA
00400      003A    EQNT    EQU    MDOR1+2     OUTPUT EXPONENT
00410      003B    MQNT1   EQU    EQNT+1      OUTPUT MANTISSA
00420              *
00430      CD68    ROUND2  EQU    $CD68
00440      000E    FRAC    EQU    $000E       FRACTION STORAGE
00450              *
00460      0050    EFP     EQU    $50         INPUT F.P. EXPONENT
00470      0051    MFP1    EQU    EFP+1       INPUT F.P.
00480      0052    MFP2    EQU    MFP1+1      MANTISSA
00490      0053    MB1     EQU    MFP2+1      OUTPUT
00500      0054    MB2     EQU    MB1+1       BCD
00510      0055    MB3     EQU    MB2+1       MANTISSA
00520      0056    PB1     EQU    MB3+1       OUTPUT
00530      0057    PB2     EQU    PB1+1       BCD
00540      0058    PB3     EQU    PB2+1       POWER
00550              *
00560      0059    TEMP1   EQU    PB3+1       TEMPORARY STORAGE
00570      005A    TEMP2   EQU    TEMP1+1     TEMPORARY STORAGE
00580      005B    TEMP3   EQU    TEMP2+1     TEMPORARY STORAGE
00590              *
00600 C802          ORG    $C802
00610              *
00620 C802 CE 010F         LDX    #$010F      SET UP POWER FOR 10 TO
00630 C805 DF 56           STX    PB1         THE (EXPONENT).
00640 C807 86 0A           LDA A  #$0A        PREPARE TO MULTIPLY
00650 C809 CE 7D00         LDX    #$7D00      OR DIVIDE THE INPUT BY
00660 C80C 97 26           STA A  EMPIER      BY 1000.
00670 C80E DF 27           STX    MPIER1
00680 C810 97 37           STA A  EDOR
00690 C812 DF 38           STX    MDOR1
00694 C814 4F              CLR A              CLEAR MSBYTE.
00696 C815 97 53           STA A  MB1
```

```
00700 C817 96 51           LDA A  MFP1      IS INPUT F.P. NUMBER
00710 C819 2A 08            BPL   LABL4A    NEGATIVE?
00720 C81B C6 40            LDA B #$40      YES.  STORE MINUS SIGN IN
00730 C81D D7 53            STA B MB1       DISPLAY.
00740 C81F 84 7F            AND A #$7F      MASK OUT SIGN FROM NUMBER.
00750 C821 97 51            STA A MFP1
00760 C823 DE 51    LABL4A  LDX   MFP1      TEST FOR ZERO.
00770 C825 26 0F            BNE   LABL4B
00780 C827 86 04            LDA A #04       INPUT = 0.
00790 C829 9A 53            ORA A MB1       STORE 0.00   10 00   IN
00800 C82B 97 53            STA A MB1       OUTPUT LOCATIONS.
00810 C82D CE 000F          LDX   #$000F
00820 C830 DF 54            STX   MB2
00830 C832 4F               CLR A
00840 C833 97 58            STA A PB3
00850 C835 39               RTS             RETURN TO CALLING ROUTINE.
00860 C836 4F       LABL4B  CLR A
00870 C837 D6 50            LDA B EFP
00880 C839 C1 01            CMP B #01       TEST INPUT FOR > OR = 1.
00890 C83B 2D 28            BLT   LABL4C
00900 C83D C1 0A    LABL4F  CMP B #$0A      INPUT > OR = 1.  TEST FOR
00910 C83F 2E 08            BGT   LABL4D    INPUT < 1000.  TEST
00920 C841 26 44            BNE   LABL4E    EXPONENTS.
00930 C843 D6 54            LDA B MB2       EXPONENTS EQUAL.
00940 C845 C1 7D            CMP B #$7D      TEST MANTISSA.
00950 C847 2D 3E            BLT   LABL4E
00960 C849 97 59    LABL4D  STA A TEMP1     INPUT > 1000.
00970 C84B D6 50            LDA B EFP       FETCH INPUT.
00980 C84D DE 51            LDX   MFP1
00990 C84F D7 34            STA B EDND      PASS TO FDIV2.
01000 C851 DF 35            STX   MDND1
01010 C853 BD CE20          JSR   FDIV2     DIVIDE BY 1000.
01020 C856 D6 3A            LDA B EQNT      FETCH AND STORE RESULT.
01030 C858 DE 3B            LDX   MQNT1
01040 C85A D7 50            STA B EFP
01050 C85C DF 51            STX   MFP1
01060 C85E 96 59            LDA A TEMP1     INCREMENT POWER OF 10
01070 C860 8B 03            ADD A #03       BY 3 AND CONVERT TO
01080 C862 19               DAA             BCD.
01090 C863 20 D8            BRA   LABL4F
01100 C865 C6 0E    LABL4C  LDA B #$0E      INPUT IS < 1.  MAKE
01110 C867 D7 57            STA B PB2       POWER OF 10 NEGATIVE.
01120 C869 D6 50            LDA B EFP       FETCH INPUT.
01130 C86B DE 51            LDX   MFP1
01140 C86D 97 59    LABL50  STA A TEMP1
01150 C86F D7 23            STA B EMPCND    PASS TO FMULT2.
01160 C871 DF 24            STX   MPCND1
01170 C873 BD CD90          JSR   FMULT2    MULTIPLY BY 1000.
01180 C876 D6 29            LDA B EPROD     FETCH AND STORE RESULT.
01190 C878 DE 2A            LDX   MPROD1
01200 C87A D7 50            STA B EFP
01210 C87C DF 51            STX   MFP1
01220 C87E 96 59            LDA A TEMP1     INCREMENT NEGATIVE
01230 C880 8B 03            ADD A #03       POWER OF 10 BY 3 AND
01240 C882 19               DAA             CONVERT TO BCD.
01250 C883 C1 01            CMP B #01       IS INPUT NOW > OR = 1?
01260 C885 2D E6            BLT   LABL50
01270 C887 97 58    LABL4E  STA A PB3       INPUT NOW BETWEEN 1 AND
01280             *                            1000.  STORE POWER OF 10.
01290 C889 96 50            LDA A EFP
01300 C88B 81 07            CMP A #07       COMPARE INPUT TO 100.
01310 C88D 2E 41            BGT   LABL51    COMPARE EXPONENTS.
01320 C88F 26 08            BNE   LABL52
01330 C891 96 51            LDA A MFP1      EXPONENTS EQUAL.
01340 C893 81 64            CMP A #$64      COMPARE MANTISSAS.
01350 C895 2C 39            BGE   LABL51
```

```
01360 C897 96 50              LDA A   EFP
01370 C899 81 04    LABL52    CMP A   #04       INPUT < 100. COMPARE
01380 C89B 2E 08              BGT     LABL53    TO 10.
01390 C89D 26 0F              BNE     LABL54    COMPARE EXPONENTS.
01400 C89F 96 51              LDA A   MFP1      EXPONENTS EQUAL.
01410 C8A1 81 50              CMP A   #$50      COMPARE MANTISSAS.
01420 C8A3 2D 09              BLT     LABL54
01430 C8A5 86 04    LABL53    LDA A   #04       SET D.P. CODE AND PREPARE
01440 C8A7 CE 5000            LDX     #$5000    TO MULTIPLY NUMBER BY 10.
01450 C8AA C6 08              LDA B   #08
01460 C8AC 20 07              BRA     LABL55
01470 C8AE 86 07    LABL54    LDA A   #07       SET D.P. CODE AND PREPARE
01480 C8B0 CE 6400            LDX     #$6400    TO MULTIPLY NUMBER BY 100.
01490 C8B3 C6 04              LDA B   #04
01500 C8B5 DA 53    LABL55    ORA B   MB1       STORE D.P. CODE.
01510 C8B7 D7 53              STA B   MB1
01520 C8B9 97 26              STA A   EMPIER    STORE MULTIPLIER.
01530 C8BB DF 27              STX     MPIER1
01540 C8BD 96 50              LDA A   EFP       FETCH NUMBER.
01550 C8BF DE 51              LDX     MFP1
01560 C8C1 97 23              STA A   EMPCND    PASS TO FMULT2.
01570 C8C3 DF 24              STX     MPCND1
01580 C8C5 BD CD90            JSR     FMULT2    MULTIPLY.
01590 C8C8 96 29              LDA A   EPROD
01600 C8CA DE 2A              LDX     MPROD1
01610 C8CC 97 50              STA A   EFP       STORE RESULT. NUMBER
01620 C8CE DF 51              STX     MFP1      IS NOW BETWEEN 100 AND
01630                *                          1000.
01640 C8D0 CE 0000  LABL51    LDX     #0000     CLEAR FRACTION OF ROUND2
01650 C8D3 DF 0E              STX     FRAC      AND TEMPORARY STORAGE
01660 C8D5 DF 5A              STX     TEMP2     LOCATIONS.
01670 C8D7 86 0F              LDA A   #$0F      DETERMINE NUMBER OF SHIFTS
01680 C8D9 90 50              SUB A   EFP       REQUIRED TO CONVERT MANTISSA
01690 C8DB 81 08              CMP A   #08       TO AN INTEGER. MORE THAN
01700 C8DD 2C 08              BGE     LABL56    8 SHIFTS REQUIRED?
01710 C8DF 97 59              STA A   TEMP1     NO.
01720 C8E1 96 51              LDA A   MFP1      LOAD A AND B WITH INTEGER.
01730 C8E3 D6 52              LDA B   MFP2
01740 C8E5 20 0B              BRA     LABL57
01750 C8E7 80 08    LABL56    SUB A   #08       SUBTRACT 8 FROM NUMBER
01760 C8E9 97 59              STA A   TEMP1     OF SHIFTS REQUIRED AND
01770 C8EB 4F                 CLR A             SHIFT INTEGER ONE BYTE.
01780 C8EC D6 52              LDA B   MFP2
01790 C8EE D7 0E              STA B   FRAC
01800 C8F0 D6 51              LDA B   MFP1
01810 C8F2 7D 0059  LABL57    TST     TEMP1
01820 C8F5 27 0A    LABL58    BEQ     LABL59    SHIFT MANTISSA TO CONVERT
01830 C8F7 44                 LSR A             TO AN INTEGER BETWEEN
01840 C8F8 56                 ROR B             100 AND 1000.
01850 C8F9 76 000E            ROR     FRAC
01860 C8FC 7A 0059            DEC     TEMP1
01870 C8FF 20 F4              BRA     LABL58
01880 C901 CE 0059  LABL59    LDX     #$0059
01890 C904 BD CD68            JSR     ROUND2    ROUND2 OFF INTETER.
01900 C907 81 03              CMP A   #03       COMPARE TO 1000.
01910 C909 26 0D              BNE     LABL5A    COMPARE EXPONENTS.
01920 C90B C1 E8              CMP B   #$E8      COMPARE MANTISSAS.
01930 C90D 26 09              BNE     LABL5A
01940 C90F 7C 0053            INC     MB1       NUMBER = 1000.
01950 C912 CE 000F            LDX     #$000F    SET HALF-DIGIT AND
01960 C915 DF 54              STX     MB2       STORE THREE ZEROES AND
01970                *                          A BLANK.
01980 C917 39                 RTS               RETURN TO CALLING ROUTINE.
01990 C918 7F 0054  LABL5A    CLR     MB2
02000 C91B C0 64    LABL5B    SUB B   #$64      SUBTRACT 100.
```

```
02010 C91D 82 00              SBC A   #00
02020 C91F 2B 05              BMI     LABL5C      UNDERFLOW?
02030 C921 7C 0054             INC     MB2         NO. INCREMENT DIGIT.
02035 C924 20 F5              BRA     LABL5B
02040 C926 CB 64      LABL5C  ADD B   #$64        UNDERFLOW. RESTORE.
02050 C928 96 54              LDA A   MB2
02060 C92A 48                 ASL A               SHIFT BCD DIGIT LEFT
02070 C92B 48                 ASL A               ONE DIGIT.
02080 C92C 48                 ASL A
02090 C92D 48                 ASL A
02100 C92E C0 0A      LABL5D  SUB B   #$0A        SUBTRACT 10.
02110 C930 2B 03              BMI     LABL5E      UNDERFLOW?
02120 C932 4C                 INC A               NO. INCREMENT DIGIT.
02130 C933 20 F9              BRA     LABL5D
02140 C935 CB 0A      LABL5E  ADD B   #$0A        UNDERFLOW. RESTORE.
02150 C937 58                 ASL B               SHIFT LEAST SIGNIFICANT
02160 C938 58                 ASL B               BCD DIGIT LEFT ONE DIGIT.
02170 C939 58                 ASL B
02180 C93A 58                 ASL B
02190 C93B CA 0F              ORA B   #$0F        BLANK LAST DIGIT PLACE
02200 C93D 97 54              STA A   MB2         IN DISPLAY AND STORE
02210 C93F D7 55              STA B   MB3         RESULT.
02220 C941 39                 RTS                 RETURN TO CALLING ROUTINE.
02230                *
02240                         END
```

SYMBOL TABLE

```
FMULT2 CD90    EMPCND 0023    MPCND1 0024    EMPIER 0026    MPIER1 0027
EPROD  0029    MPROD1 002A    FDIV2  CE20    EDND   0034    MDND1  0035
EDOR   0037    MDOR1  0038    EQNT   003A    MQNT1  003B    ROUND2 CD68
FRAC   000E    EFP    0050    MFP1   0051    MFP2   0052    MB1    0053
MB2    0054    MB3    0055    PB1    0056    PB2    0057    PB3    0058
TEMP1  0059    TEMP2  005A    TEMP3  005B    LABL4A C823    LABL4B C836
LABL4F C83D    LABL4D C849    LABL4C C865    LABL50 C86D    LABL4E C887
LABL52 C899    LABL53 C8A5    LABL54 C8AE    LABL55 C8B5    LABL51 C8D0
LABL56 C8E7    LABL57 C8F2    LABL58 C8F5    LABL59 C901    LABL5A C918
LABL5B C91B    LABL5C C926    LABL5D C92E    LABL5E C935
```

```
00000                          NAM    FSUB2
00010                *
00020                *         FLOATING-POINT SUBTRACTION SUBROUTINE
00030                *
00040                *   THIS ROUTINE SUBTRACTS TWO SIGNED FLOATING-
00050                *   POINT NUMBERS BY CHANGING THE SIGN OF THE
00060                *   SUBTRAHEND AND ADDING.  CONTROL IS TRANSFERRED
00070                *   TO SUBROUTINE FADD2, WHICH FOLLOWS FSUB2 IN
00080                *   MEMORY.  THE DIFFERENCE IS RETURNED IN THE SUM
00090                *   LOCATION OF SUBROUTINE FADD2.
00100                *
00110      001C      EMIN    EQU    $1C      INPUT MINUEND EXPONENT
00120      001D      MMIN1   EQU    $1D      INPUT
00130      001E      MMIN2   EQU    $1E      MINUEND MANTISSA
00140      001F      ESUB    EQU    $1F      INPUT SUBTRAHEND EXPONENT
00150      0020      MSUB1   EQU    $20      INPUT
00160      0021      MSUB2   EQU    $21      SUBTRAHEND MANTISSA
00170                *
00180      0010      EAUG    EQU    $10      INPUT TO
00190      0011      MAUG1   EQU    $11      SUBROUTINE FADD2
00200      0013      EADD    EQU    $13      INPUT TO
00210      0014      MADD1   EQU    $14      SUBROUTINE FADD2
00220                *
00230 CC0B                   ORG    $CC0B
00240                *
```

```
00250 CC0B 96 1C              LDA A  EMIN      PASS MINUEND
00260 CC0D DE 1D              LDX    MMIN1     TO SUBROUTINE
00270 CC0F 97 10              STA A  EAUG      FADD2.
00280 CC11 DF 11              STX    MAUG1
00290 CC13 96 1F              LDA A  ESUB      PASS SUBTRAHEND
00300 CC15 DE 20              LDX    MSUB1     TO SUBROUTINE
00310 CC17 97 13              STA A  EADD      FADD2.
00320 CC19 DF 14              STX    MADD1
00330 CC1B 96 14              LDA A  MADD1
00340 CC1D 49                 ROL A            DETERMINE SIGN OF
00350 CC1E 24 03              BCC    LABL00    SUBTRAHEND.
00360 CC20 0C                 CLC              CHANGE
00370 CC21 20 01              BRA    LABL01    SIGN OF
00380 CC23 0D       LABL00    SEC              SUBTRAHEND.
00390 CC24 46       LABL01    ROR A
00400 CC25 97 14              STA A  MADD1     PASS NEW SIGN TO
00410                *                         SUBROUTINE FADD2.
00420                *
00430                         END
```

SYMBOL TABLE

```
EMIN    001C   MMIN1   001D   MMIN2   001E   ESUB    001F   MSUB1   0020
MSUB2   0021   EAUG    0010   MAUG1   0011   EADD    0013   MADD1   0014
LABL00  CC23   LABL01  CC24
```

```
00010                         NAM    FADD2
00020                *
00030                *        FLOATING-POINT ADDITION SUBROUTINE
00040                *
00050                *        THIS SUBROUTINE ADDS TWO SIGNED FLOATING-POINT
00060                *        NUMBERS.  CONTROL FLOWS TO SUBROUTINE ROUND2,
00070                *        UNLESS THE SOLUTION IS TRIVIAL.
00080                *
00090                *
00100      0010      EAUG     EQU    $10       INPUT AUGEND EXPONENT
00110      0011      MAUG1    EQU    $11       INPUT
00120      0012      MAUG2    EQU    $12       AUGEND MANTISSA
00130      0013      EADD     EQU    $13       INPUT ADDEND EXPONENT
00140      0014      MADD1    EQU    $14       INPUT
00150      0015      MADD2    EQU    $15       ADDEND MANTISSA
00160      0019      ESUM     EQU    $19       OUTPUT SUM EXPONENT
00170      001A      MSUM1    EQU    $1A       OUTPUT
00180      001B      MSUM2    EQU    $1B       SUM MANTISSA
00190                *
00200      000A      FLAGS    EQU    $0A       ADDITION STATUS FLAGS
00210      000B      ESM      EQU    $0B       EXPONENT OF
00220                *                         SMALLER MAGNITUDE NUMBER
00230      000C      MSM1     EQU    $0C       MANTISSA OF
00240      000D      MSM2     EQU    $0D       SMALLER
00250      000E      MSM3     EQU    $0E       MAGNITUDE
00260      000F      MSM4     EQU    $0F       NUMBER
00270      0016      ELG      EQU    $16       EXPONENT OF LARGER
00280                *                         MAGNITUDE NUMBER
00290      0017      MLG1     EQU    $17       MANTISSA OF LARGER
00300      0018      MLG2     EQU    $18       MAGNITUDE NUMBER
00310                *
00320 CC27                    ORG    $CC27
00330                *
00340 CC27 96 11              LDA A  MAUG1     ADDEND=0?
00350 CC29 84 7F              AND A  #$7F
00360 CC2B 9A 12              ORA A  MAUG2
00370 CC2D 26 09              BNE    LABL03
00380 CC2F 96 13              LDA A  EADD      YES.  SUM=ADDEND.
00390 CC31 DE 14              LDX    MADD1
```

```
00400 CC33 97 19    LABL04  STA A   ESUM
00410 CC35 DF 1A            STX     MSUM1
00420 CC37 39               RTS                     RETURN TO CALLING ROUTINE
00430 CC38 96 14    LABL03  LDA A   MADD1           ADDEND=0?
00440 CC3A 84 7F            AND A   #$7F
00450 CC3C 9A 15            ORA A   MADD2
00460 CC3E 26 06            BNE     LABL05
00470 CC40 96 10    LABL06  LDA A   EAUG            YES.  SUM=AUGEND.
00480 CC42 DE 11            LDX     MAUG1
00490 CC44 20 ED            BRA     LABL04
00500 CC46 CE 0000  LABL05  LDX     #0000           AUGEND AND ADDEND NONZERO.
00510 CC49 DF 0A            STX     FLAGS           CLEAR FLAGS AND
00520 CC4B DF 0E            STX     MSM3            EXTEND MANTISSA.
00530 CC4D 96 10            LDA A   EAUG            COMPARE EXPONENTS OF
00540 CC4F 91 13            CMP A   EADD            AUGEND AND ADDEND
00550 CC51 26 2E            BNE     LABL0B
00560 CC53 86 40            LDA A   #$40            EXPONENTS EQUAL. SET
00570 CC55 97 0A            STA A   FLAGS           D6 OF FLAGS.
00580 CC57 96 11            LDA A   MAUG1           COMPARE MOST SIGNIFICANT
00590 CC59 84 7F            AND A   #$7F            HALF OF MANTISSAS
00600 CC5B D6 14            LDA B   MADD1           AFTER MASKING SIGNS.
00610 CC5D C4 7F            AND B   #$7F
00620 CC5F 11              CBA
00630 CC60 2E 0D            BGT     LABL07
00640 CC62 26 11            BNE     LABL0A
00650 CC64 96 12            LDA A   MAUG2           MOST SIGNIFICANT HALF
00652           *                                   OF MANTISSAS EQUAL.
00654 CC66 D6 15            LDA B   MADD2           COMPARE LEAST SIGNIFICANT
00656 CC68 8B 80            ADD A   #$80            HALVES.
00658 CC6A CB 80            ADD B   #$80
00660 CC6C 11              CBA
00680 CC6D 2F 04            BLE     LABL08
00690 CC6F 96 10    LABL07  LDA A   EAUG            AUGEND IS LARGER.
00700 CC71 20 22            BRA     LABL0D
00710 CC73 27 04    LABL08  BEQ     LABL09
00720 CC75 96 10    LABL0A  LDA A   EAUG            ADDEND IS LARGER.
00730 CC77 20 0A            BRA     LABL0C
00740 CC79 86 01    LABL09  LDA A   #01             AUGEND AND ADDEND ARE
00750 CC7B 97 0A            STA A   FLAGS           EQUAL. SET D0 OF FLAGS AND
00760 CC7D 96 10            LDA A   EAUG            DEFINE THE ADDEND TO BE
00770 CC7F 20 02            BRA     LABL0C          "LARGER".
00780 CC81 2E 12    LABL0B  BGT     LABL0D          EXPONENTS WERE NOT EQUAL.
00790 CC83 DE 11    LABL0C  LDX     MAUG1           ADDEND IS LARGER
00800 CC85 97 0B            STA A   ESM             STORE IN LG AND SM
00810 CC87 DF 0C            STX     MSM1            LOCATIONS ACCORDINGLY.
00820 CC89 96 13            LDA A   EADD
00830 CC8B DE 14            LDX     MADD1
00840 CC8D 97 16            STA A   ELG
00850 CC8F 97 19            STA A   ESUM
00860 CC91 DF 17            STX     MLG1
00870 CC93 20 10            BRA     LABL0E
00880 CC95 DE 11    LABL0D  LDX     MAUG1           AUGEND IS LARGER.
00890 CC97 97 16            STA A   ELG             STORE IN LG AND SM
00900 CC99 97 19            STA A   ESUM            LOCATIONS ACCORDINGLY.
00910 CC9B DF 17            STX     MLG1
00920 CC9D 96 13            LDA A   EADD
00930 CC9F DE 14            LDX     MADD1
00940 CCA1 97 0B            STA A   ESM
00950 CCA3 DF 0C            STX     MSM1
00960 CCA5 96 17    LABL0E  LDA A   MLG1            DETERMINE SIGNS
00970 CCA7 84 80            AND A   #$80            OF LARGER AND
00980 CCA9 D6 0C            LDA B   MSM1            SMALLER NUMBERS.
00990 CCAB C4 80            AND B   #$80
01000 CCAD 11              CBA
01010 CCAE 26 04            BNE     LABL0F          SIGNS EQUAL?
01020 CCB0 D6 0A            LDA B   FLAGS           YES. D7 OF FLAGS
```

```
01030 CCB2 20 06              BRA    LABL14   IS CLEAR.
01040 CCB4 D6 0A    LABL0F LDA B   FLAGS    SIGNS DIFFERENT.
01050 CCB6 CA 80           ORA B   #$80     SET D7 OF
01060 CCB8 D7 0A           STA B   FLAGS    FLAGS.
01070 CCBA 97 1A    LABL14 STA A   MSUM1    SET SIGN OF SUM TO
01080                *                      SIGN OF LARGER NUMBER.
01090 CCBC 56              ROR B
01100 CCBD 24 14           BCC     LABL17   NUMBERS EQUAL?
01110 CCBF 59              ROL B            YES. RESTORE B.
01120 CCC0 2B 07           BMI     LABL15   LIKE SIGNS?
01130 CCC2 96 16           LDA A   ELG      YES. MULTIPLY THE
01140 CCC4 4C              INC A            ADDEND BY TWO BY
01150 CCC5 DE 17           LDX     MLG1     INCREMENTING THE EXPONENT.
01160 CCC7 20 05           BRA     LABL16
01170 CCC9 86 80    LABL15 LDA A   #$80     UNLIKE SIGNS. SET
01180 CCCB CE 0000         LDX     #0000    SUM TO ZERO.
01190 CCCE 97 19    LABL16 STA A   ESUM
01200 CCD0 DF 1A           STX     MSUM1
01210 CCD2 39              RTS              RETURN TO CALLING ROUTINE.
01220 CCD3 96 0C    LABL17 LDA A   MSM1     NUMBERS NOT EQUAL.
01230 CCD5 84 7F           AND A   #$7F     MASK SIGN FROM
01240 CCD7 97 0C           STA A   MSM1     SMALLER NUMBER.
01250 CCD9 59              ROL B
01260 CCDA 59              ROL B            ARE EXPONENTS EQUAL?
01270 CCDB 2B 33           BMI     LABL1B
01280 CCDD 96 16           LDA A   ELG      NO. FIND EXPONENT
01290 CCDF 90 0B           SUB A   ESM      DIFFERENCE.
01300 CCE1 81 0F           CMP A   #$0F
01310 CCE3 2F 07           BLE     LABL18   DIFFERENCE>0F?
01320 CCE5 96 16           LDA A   ELG      YES. SUM=LARGER
01330 CCE7 DE 17           LDX     MLG1     NUMBER.
01340 CCE9 7E CC33         JMP     LABL04
01350 CCEC 26 11    LABL18 BNE     LABL19
01360 CCEE 96 0C           LDA A   MSM1     EXPONENT DIFFERENCE=0F.
01370 CCF0 D6 0D           LDA B   MSM2     FORM EXTENDED MANTISSA
01380 CCF2 58              ASL B            OF SMALLER NUMBER.
01390 CCF3 46              ROR A
01400 CCF4 97 0E           STA A   MSM3
01410 CCF6 D7 0F           STA B   MSM4
01420 CCF8 CE 0000         LDX     #0000
01430 CCFB DF 0C           STX     MSM1
01440 CCFD 20 11           BRA     LABL1B
01450 CCFF D6 0C    LABL19 LDA B   MSM1     EXPONENT DIFFERENCE<0F.
01460 CD01 54      LABL1A LSR B            SHIFT SMALLER MANTISSA
01470 CD02 76 000D         ROR     MSM2     RIGHT THE EXPONENT
01480 CD05 76 000E         ROR     MSM3     DIFFERENCE NUMBER OF
01490 CD08 76 000F         ROR     MSM4     TIMES.
01500 CD0B 4A              DEC A
01510 CD0C 26 F3           BNE     LABL1A
01520 CD0E D7 0C           STA B   MSM1
01530 CD10 7D 000A  LABL1B TST    FLAGS    EXPONENTS ARE NOW EQUAL.
01540 CD13 2A 39           BPL     LABL1F   ADD OR SUBTRACT?
01550 CD15 5F              CLR B            SUBTRACT.
01560 CD16 4F              CLR A
01570 CD17 D0 0F           SUB B   MSM4     SUBTRACT LEAST SIGNIFICANT
01580 CD19 92 0E           SBC A   MSM3     HALVES.
01590 CD1B D7 0F           STA B   MSM4
01600 CD1D 97 0E           STA A   MSM3
01610 CD1F D6 18           LDA B   MLG2
01620 CD21 96 17           LDA A   MLG1
01630 CD23 84 7F           AND A   #$7F     MASK SIGN OF LARGER NUMBER.
01640 CD25 D2 0D           SBC B   MSM2     SUBTRACT MOST SIGNIFICANT
01650 CD27 92 0C           SBC A   MSM1     HALVES.
01660 CD29 84 7F           AND A   #$7F     CLEAR "BORROW" BIT.
01670 CD2B 27 0F           BEQ     LABL1D   MOST SIGNIFICANT BYTE OF
01680               *                       DIFFERENCE=0?
```

```
01690 CD2D 7A 0019 LABL1C DEC    ESUM    NO.
01700 CD30 78 000F         ASL    MSM4    SHIFT DIFFERENCE LEFT
01710 CD33 79 000E         ROL    MSM3    UNTIL MSB IS A 1.
01720 CD36 59              ROL B
01730 CD37 49              ROL A
01740 CD38 2B 20  LABL1E   BMI    LABL21
01750 CD3A 20 F1           BRA    LABL1C
01760 CD3C DE 0E  LABL1D   LDX    MSM3    MOST SIGNIFICANT BYTE=0.
01770 CD3E DF 0D           STX    MSM2    SHIFT DIFFERENCE ONE
01780 CD40 97 0F           STA A  MSM4    BYTE AND SUBTRACT 8
01790 CD42 96 19           LDA A  ESUM    FROM THE EXPONENT.
01800 CD44 80 08           SUB A  #08
01810 CD46 97 19           STA A  ESUM
01820 CD48 17              TBA
01830 CD49 D6 0D           LDA B  MSM2
01840 CD4B 4D              TST A          IS THE NEW MSB A 1?
01850 CD4C 20 EA           BRA    LABL1E
01860 CD4E D6 18  LABL1F   LDA B  MLG2    ADD.
01870 CD50 96 17           LDA A  MLG1
01880 CD52 84 7F           AND A  #$7F    MASK SIGN OF LARGER NUMBER.
01890 CD54 DB 0D           ADD B  MSM2    ADD MOST SIGNIFICANT
01900 CD56 99 0C           ADC A  MSM1    HALVES.
01910 CD58 2A 0B           BPL    LABL20  OVERFLOW?
01920 CD5A 44    LABL21    LSR A          YES.  SHIFT SUM MANTISSA
01930 CD5B 56              ROR B          RIGHT AND
01940 CD5C 76 000E         ROR    MSM3    INCREMENT
01950 CD5F 76 000F         ROR    MSM4    EXPONENT.
01960 CD62 7C 0019         INC    ESUM
01970 CD65 CE 0019 LABL20  LDX    #$0019  POINT INDEX REGISTER TO THE
01980                *                    SUM EXPONENT.
01990                *
02000                      END
```

SYMBOL TABLE

| | | | | | | | | | |
|---|---|---|---|---|---|---|---|---|---|
| EAUG | 0010 | MAUG1 | 0011 | MAUG2 | 0012 | EADD | 0013 | MADD1 | 0014 |
| MADD2 | 0015 | ESUM | 0019 | MSUM1 | 001A | MSUM2 | 001B | FLAGS | 000A |
| ESM | 000B | MSM1 | 000C | MSM2 | 000D | MSM3 | 000E | MSM4 | 000F |
| ELG | 0016 | MLG1 | 0017 | MLG2 | 0018 | LABL04 | CC33 | LABL03 | CC38 |
| LABL06 | CC40 | LABL05 | CC46 | LABL07 | CC6F | LABL08 | CC73 | LABL0A | CC75 |
| LABL09 | CC79 | LABL0B | CC81 | LABL0C | CC83 | LABL0D | CC95 | LABL0E | CCA5 |
| LABL0F | CCB4 | LABL14 | CCBA | LABL15 | CCC9 | LABL16 | CCCE | LABL17 | CCD3 |
| LABL18 | CCEC | LABL19 | CCFF | LABL1A | CD01 | LABL1B | CD10 | LABL1C | CD2D |
| LABL1E | CD38 | LABL1D | CD3C | LABL1F | CD4E | LABL21 | CD5A | LABL20 | CD65 |

```
00010                      NAM    ROUND2
00020           *
00030           *          ROUNDOFF SUBROUTINE
00040           *
00050           *   THIS ROUTINE ROUNDS OFF AN EXTENDED 32-BIT
00060           *   MANTISSA TO 16 BITS IN WHICH THE A AND
00070           *   B ACCUMULATORS CONTAIN THE INTEGER PART,
00080           *   LOCATION 0E/0F CONTAINS THE FRACTIONAL PART,
00090           *   AND THE INDEX REGISTER POINTS TO THE EXPONENT
00100           *   FOR WHICH THE INTEGER WILL BECOME THE MANTISSA.
00102           *   MEMORY LOCATION ((01+IX)) IS ASSUMED TO CONTAIN
00104           *   ONLY THE SIGN OF THE FLOATING POINT NUMBER (ALL
00106           *   OTHER BITS ARE CLEARED) PRIOR TO TRANSFER OF
00108           *   CONTROL TO ROUND2.
00110           *   IF CONTROL IS TRANSFERRED TO ROUND2 FROM FADD2
00120           *   OR FMULT2, CONTROL IS RETURNED TO THE ROUTINE
00130           *   THAT CALLED FADD2 OR FMULT2 AS A SUBROUTINE.
00140           *
00150 CD68              ORG    $CD68
```

```
00160                      *
00170 CD68 7D 000E          TST    $000E        TEST FRACTION.
00180 CD6B 2A 1C            BPL    LABL10       FRACTION<1/2?
00190 CD6D 78 000E          ASL    $000E        NO.  TEST FOR=1/2.
00200 CD70 26 0C            BNE    LABL11
00210 CD72 7D 000F          TST    $000F        (0E)=0.  CONTINUE TEST
00220 CD75 26 07            BNE    LABL11       FOR 1/2.
00230 CD77 56               ROR B               FRACTION=1/2.
00240 CD78 25 03            BCS    LABL12
00250 CD7A 59               ROL B               RESTORE B.
00260 CD7B 20 0C            BRA    LABL10       TRUNCATE.
00270 CD7D 59        LABL12 ROL B               RESTORE B.
00280 CD7E CB 01     LABL11 ADD B  #01          FRACTION>OR=1/2.
00290 CD80 89 00            ADC A  #00          ROUND UP.
00300 CD82 2A 05            BPL    LABL10       OVERFLOW?
00310 CD84 6C 00            INC    0,X          YES.
00320 CD86 86 40            LDA A  #$40         CORRECT FOR OVERFLOW.
00330 CD88 5F               CLR B
00340 CD89 AA 01     LABL10 ORA A  1,X          STORE ROUNDED INTEGER
00350 CD8B A7 01            STA A  1,X          IN THE MANTISSA LOCATION
00360 CD8D E7 02            STA B  2,X          OF THE DATA WORD POINTED
00370                      *                    TO BY THE INDEX REGISTER.
00380 CD8F 39               RTS                 RETURN TO CALLING ROUTINE.
00390                      *
00400                       END
```

SYMBOL TABLE

```
LABL12 CD7D  LABL11 CD7E  LABL10 CD89

00000                      NAM    FMULT2
00010                *
00020                *     FLOATING-POINT MULTIPLICATION SUBROUTINE
00030                *
00040                *     THIS ROUTINE MULTIPLIES TWO SIGNED FLOATING-
00050                *     POINT NUMBERS.
00060                *
00070      CD68      ROUND2 EQU    $CD68        CONTROL FLOWS TO SUBROUTINE
00080                *                          ROUND2, UNLESS THE
00085                *                          SOLUTION IS TRIVIAL.
00090                *
00100      0023      EMPCND EQU    $23          INPUT MULTIPLICAND EXPONENT
00110      0024      MPCND1 EQU    $24          INPUT
00120      0025      MPCND2 EQU    $25          MULTIPLICAND MANTISSA
00130      0026      EMPIER EQU    $26          INPUT MULTIPLIER EXPONENT
00140      0027      MPIER1 EQU    $27          INPUT
00150      0028      MPIER2 EQU    $28          MULTIPLIER MANTISSA
00160      0029      EPROD  EQU    $29          OUTPUT PRODUCT EXPONENT
00170      002A      MPROD1 EQU    $2A          OUTPUT
00180      002B      MPROD2 EQU    $2B          PRODUCT MANTISSA
00190                *
00200      002C      TPROD1 EQU    $2C          TEMPORARY STORAGE -
00210      002D      TPROD2 EQU    $2D          PRODUCT MANTISSA
00220      0030      TMCND1 EQU    $30          TEMPORARY STORAGE -
00230      0031      TMCND2 EQU    $31          MULTIPLICAND MANTISSA
00240      0032      TMPER1 EQU    $32          TEMPORARY STORAGE -
00250      0033      TMPER2 EQU    $33          MULTIPLIER MANTISSA
00260      000E      MR1    EQU    $0E          FRACTION PASSAGE LOCATIONS
00270      000F      MR2    EQU    $0F          FOR SUBROUTINE ROUND2
00280                *
00290 CD90              ORG    $CD90
00295                *
00300 CD90 96 24            LDA A  MPCND1       TEST MULTIPLICAND FOR ZERO.
00310 CD92 84 7F            AND A  #$7F
00320 CD94 97 30            STA A  TMCND1
```

```
00330 CD96 9A 25              ORA A   MPCND2
00340 CD98 26 0A               BNE    LABL25
00350 CD9A 86 80    LABL26 LDA A  #$80        SET PRODUCT TO ZERO.
00360 CD9C CE 0000              LDX    #0000
00370 CD9F 97 29                STA A  EPROD
00380 CDA1 DF 2A                STX    MPROD1
00390 CDA3 39                   RTS                RETURN TO CALLING ROUTINE.
00400 CDA4 96 27    LABL25 LDA A  MPIER1          TEST MULTIPLIER FOR ZERO.
00410 CDA6 84 7F               AND A  #$7F
00420 CDA8 97 32               STA A  TMPER1
00430 CDAA 9A 28               ORA A  MPIER2
00440 CDAC 27 EC               BEQ    LABL26
00450 CDAE 96 23               LDA A  EMPCND         ADD EXPONENTS.
00460 CDB0 9B 26               ADD A  EMPIER
00470 CDB2 97 29               STA A  EPROD          PRODUCT EXPONENT = EXPONENT
00475               *                                 SUM.
00480 CDB4 96 24               LDA A  MPCND1         DETERMINE SIGNS OF
00490 CDB6 84 80               AND A  #$80            MULTIPLIER AND MULTIPLICAND.
00495 CDB8 D6 27               LDA B  MPIER1
00500 CDBA C4 80               AND B  #$80
00510 CDBC 1B                  ABA                    DETERMINE AND STORE SIGN
00520 CDBD 97 2A               STA A  MPROD1          OF PRODUCT.
00530 CDBF 96 25               LDA A  MPCND2          TRANSFER MANTISSAS
00540 CDC1 D6 28               LDA B  MPIER2          TO TEMPORARY
00550 CDC3 97 31               STA A  TMCND2          WORKSPACE
00560 CDC5 D7 33               STA B  TMPER2
00570 CDC7 4F                  CLR A
00580 CDC8 5F                  CLR B
00590 CDC9 CE 0000              LDX    #0000          CLEAR PRODUCT MANTISSA
00600 CDCC DF 2C                STX    TPROD1         WORKSPACE.
00610 CDCE CE 000F              LDX    #$000F         INITIALIZE SHIFT TALLY.
00620 CDD1 78 0033 LABL27 ASL   TMPER2          SHIFT MULTIPLIER
00630 CDD4 79 0032       ROL    TMPER1          MANTISSA LEFT.
00640 CDD7 2A 14         BPL    LABL28          TEST MSB.
00650 CDD9 DB 31         ADD B  TMCND2          MSB = 1.  ADD MULTIPLICAND
00660 CDDB 99 30         ADC A  TMCND1          TO PRODUCT
00670 CDDD 24 0E         BCC    LABL28
00680 CDDF 36            PSH A                  PROPOGATE CARRY.
00690 CDE0 96 2D         LDA A  TPROD2
00700 CDE2 89 00         ADC A  #00
00710 CDE4 97 2D         STA A  TPROD2
00720 CDE6 96 2C         LDA A  TPROD1
00730 CDE8 89 00         ADC A  #00
00740 CDEA 97 2C         STA A  TPROD1
00750 CDEC 32            PUL A
00760 CDED 58    LABL28  ASL B                  SHIFT PRODUCT LEFT.
00770 CDEE 49            ROL A
00780 CDEF 79 002D       ROL    TPROD2
00790 CDF2 79 002C       ROL    TPROD1
00800 CDF5 09            DEX                    DECREMENT SHIFT TALLY
00810 CDF6 26 D9         BNE    LABL27          HAVE ALL SHIFTS BEEN MADE?
00820 CDF8 58            ASL B                  YES.  DETERMINE IF
00830 CDF9 49            ROL A                  ADJUSTMENT OF EXPONENT
00840 CDFA 79 002D       ROL    TPROD2          IS NECESSARY.
00850 CDFD 79 002C       ROL    TPROD1
00860 CE00 2A 0A         BPL    LABL29
00870 CE02 74 002C       LSR    TPROD1          NO ADJUSTMENT NECESSARY.
00880 CE05 76 002D       ROR    TPROD2          RESTORE PRODUCT
00890 CE08 46            ROR A                  MANTISSA.
00900 CE09 56            ROR B
00910 CE0A 20 03         BRA    LABL2A
00920 CE0C 7A 0029 LABL29 DEC   EPROD           ADJUSTMENT NECESSARY.  ADJUST
00930              *                             PRODUCT EXPONENT.
00940 CE0F 97 0E  LABL2A STA A  MR1             SET UP PRODUCT MANTISSA
00950 CE11 D7 0F         STA B  MR2             FOR TRANSFER TO
00960 CE13 96 2C         LDA A  TPROD1          SUBROUTINE ROUND2.
```

```
00970 CE15 D6 2D              LDA B  TPROD2
00980 CE17 CE 0029             LDX   #EPROD   POINT INDEX REGISTER TO
00990                    *                    PRODUCT EXPONENT.
01000 CE1A 7E CD68             JMP   ROUND2   TRANSFER CONTROL TO ROUND2.
01010                    *
01020                          END
```

SYMBOL TABLE

```
ROUND2 CD68  EMPCND 0023  MPCND1 0024  MPCND2 0025  EMPIER 0026
MPIER1 0027  MPIER2 0028  EPROD  0029  MPROD1 002A  MPROD2 002B
TPROD1 002C  TPROD2 002D  TMCND1 0030  TMCND2 0031  TMPER1 0032
TMPER2 0033  MR1    000E  MR2    000F  LABL26 CD9A  LABL25 CDA4
LABL27 CDD1  LABL28 CDED  LABL29 CEOC  LABL2A CEOF

00000                          NAM   FDIV2
00010                    *
00020                    *         FLOATING-POINT DIVISION SUBROUTINE
00030                    *
00040                    *     THIS ROUTINE DIVIDES TWO SIGNED FLOATING-POINT
00050                    *     NUMBERS.  IF DIVISION BY ZERO IS ATTEMPTED,
00060                    *     DIVISION BY ONE IS PERFORMED AND AN ERROR FLAG
00070                    *     IS SET.
00080                    *
00090       0034         EDND  EQU   $34      INPUT DIVIDEND EXPONENT
00100       0035         MDND1 EQU   $35      INPUT
00110       0036         MDND2 EQU   $36      DIVIDEND MANTISSA
00120       0037         EDOR  EQU   $37      INPUT DIVISOR EXPONENT
00130       0038         MDOR1 EQU   $38      INPUT
00140       0039         MDOR2 EQU   $39      DIVISOR MANTISSA
00150       003A         EQNT  EQU   $3A      OUTPUT QUOTIENT EXPONENT
00160       003B         MQNT1 EQU   $3B      OUTPUT
00170       003C         MQNT2 EQU   $3C      QUOTIENT MANTISSA
00180
00190       003D         TQNT1 EQU   $3D      TEMPORARY STORAGE -
00200       003E         TQNT2 EQU   $3E      QUOTIENT MANTISSA
00210       0040         TDOR1 EQU   $40      TEMPORARY STORAGE -
00220       0041         TDOR2 EQU   $41      DIVISOR MANTISSA
00230       003F         TEMP  EQU   $3F      TEMPORARY STORAGE
00240       0000         FLAGS EQU   $00      ERROR FLAG LOCATION
00250                    *
00260 CE20                     ORG   $CE20
00270                    *
00280 CE20 96 38               LDA A MDOR1    TEST FOR DIVISOR
00290 CE22 84 7F               AND A #$7F    = 0.
00300 CE24 97 40               STA A TDOR1
00310 CE26 9A 39               ORA A MDOR2
00320 CE28 26 0A               BNE   LABL30
00330 CE2A 86 80               LDA A #$80     DIVISOR = 0.
00340 CE2C 9A 00               ORA A FLAGS    SET ERROR FLAG.
00350 CE2E 96 34               LDA A EDND     SET QUOTIENT =
00360 CE30 DE 35               LDX   MDND1    DIVIDEND.
00370 CE32 20 0D               BRA   LABL31
00380 CE34 96 35  LABL30 LDA A MDND1    DIVISOR NONZERO.
00390 CE36 84 7F               AND A #$7F    TEST FOR DIVIDEND
00400 CE38 9A 36               ORA A MDND2   = 0.
00410 CE3A 26 0A               BNE   LABL32
00420 CE3C 86 80               LDA A #$80     DIVIDEND = 0.
00430 CE3E CE 0000              LDX   #0000   SET QUOTIENT TO ZERO.
00440 CE41 97 3A  LABL31 STA A EQNT     SOLUTION TRIVIAL.
00450 CE43 DF 3B               STX   MQNT1
00460 CE45 39                  RTS            RETURN TO CALLING ROUTINE.
00470 CE46 96 34  LABL32 LDA A EDND     QUOTIENT EXPONENT =
00480 CE48 90 37               SUB A EDOR     EXPONENT DIFFERENCE.
```

```
00490 CE4A 97 3A            STA A   EQNT
00500 CE4C 96 35            LDA A   MDND1
00510 CE4E D6 38            LDA B   MDOR1
00520 CE50 84 80            AND A   #$80     DETERMINE SIGNS OF
00530 CE52 C4 80            AND B   #$80     DIVIDEND AND DIVISOR.
00540 CE54 1B               ABA              DETERMINE AND STORE
00550 CE55 97 3B            STA A   MQNT1    SIGN OF PRODUCT.
00560 CE57 96 35            LDA A   MDND1
00570 CE59 84 7F            AND A   #$7F
00580 CE5B CE 0000          LDX     #0000    CLEAR TEMPORARY
00590 CE5E DF 3D            STX     TQNT1    STORAGE.
00600 CE60 CE 000F          LDX     #$000F   INITIALIZE SHIFT TALLY.
00610 CE63 D6 39            LDA B   MDOR2
00620 CE65 D7 41            STA B   TDOR2
00630 CE67 D6 36            LDA B   MDND2
00640 CE69 D0 41   LABL33   SUB B   TDOR2    SUBTRACT DIVISOR
00650 CE6B 92 40            SBC A   TDOR1    FROM DIVIDEND.
00660 CE6D 2A 07            BPL     LABL34   UNDERFLOW?
00670 CE6F DB 41            ADD B   TDOR2    YES. RESTORE
00680 CE71 99 40            ADC A   TDOR1    DIVIDEND.
00690 CE73 0C               CLC              ROTATE A ZERO
00700 CE74 20 01            BRA     LABL35   INTO QUOTIENT.
00710 CE76 0D     LABL34    SEC              NO UNDERFLOW. ROTATE
00720 CE77 79 003E LABL35   ROL     TQNT2    A 1 INTO QUOTIENT.
00730 CE7A 79 003D          ROL     TQNT1
00740 CE7D 58               ASL B            SHIFT DIVIDEND
00750 CE7E 49               ROL A            MANTISSA LEFT.
00760 CE7F 09               DEX              DECREMENT SHIFT TALLY.
00770 CE80 26 E7            BNE     LABL33
00780 CE82 D0 41            SUB B   TDOR2    DIVISION COMPLETE.
00790 CE84 92 40            SBC A   TDOR1    SUBTRACT DIVISOR
00800 CE86 2B 1D            BMI     LABL36   FROM 2R.
00810 CE88 D7 3F            STA B   TEMP     2R-DIVISOR=0?
00820 CE8A 9A 3F            ORA A   TEMP
00830 CE8C 26 08            BNE     LABL37
00840 CE8E 76 003E          ROR     TQNT2    YES. TEST QUOTIENT
00850 CE91 24 0F            BCC     LABL38   FOR EVEN OR ODD.
00860 CE93 79 003E          ROL     TQNT2    QUOTIENT ODD. ROUND UP.
00870 CE96 96 3D   LABL37   LDA A   TQNT1    2R-DIVISOR>0.
00880 CE98 D6 3E            LDA B   TQNT2
00900 CE9A 89 00            ADC A   #00
00890 CE9C CB 01            ADD B   #01      ADD 1 TO QUOTIENT.
00900 CE9E 89 00            ADC A   #00
00910 CEA0 20 07            BRA     LABL39
00920 CEA2 79 003E LABL38   ROL     TQNT2    QUOTIENT EVEN. TRUNCATE.
00930 CEA5 96 3D   LABL36   LDA A   TQNT1
00940 CEA7 D6 3E            LDA B   TQNT2
00950 CEA9 58     LABL39    ASL B            ROUNDOFF COMPLETE.
00960 CEAA 49               ROL A            NORMALIZE QUOTIENT.
00970 CEAB 2A 05            BPL     LABL3A   QUOTIENT WAS ALREADY
00980 CEAD 46               ROR A            NORMALIZED. RESTORE AND
00990 CEAE 56               ROR B            INCREMENT QUOTIENT
01000 CEAF 7C 003A          INC     EQNT     EXPONENT.
01010 CEB2 D7 3C   LABL3A   STA B   MQNT2    STORE QUOTIENT.
01020 CEB4 9A 3B            ORA A   MQNT1
01030 CEB6 97 3B            STA A   MQNT1
01040 CEB8 39               RTS              RETURN TO CALLING ROUTINE.
01050                   *
01060                       END
```

SYMBOL TABLE

| | | | | | | | | | |
|---|---|---|---|---|---|---|---|---|---|
| EDND  | 0034 | MDND1 | 0035 | MDND2 | 0036 | EDOR  | 0037 | MDOR1 | 0038 |
| MDOR2 | 0039 | EQNT  | 003A | MQNT1 | 003B | MQNT2 | 003C | TQNT1 | 003D |

| | | | | | | | | | |
|---|---|---|---|---|---|---|---|---|---|
| TQNT2 | 003E | TDOR1 | 0040 | TDOR2 | 0041 | TEMP | 003F | FLAGS | 0000 |
| LABL30 | CE34 | LABL31 | CE41 | LABL32 | CE46 | LABL33 | CE69 | LABL34 | CE76 |
| LABL35 | CE77 | LABL37 | CE96 | LABL38 | CEA2 | LABL36 | CEA5 | LABL39 | CEA9 |
| LABL3A | CEB2 | | | | | | | | |

```
00000                       NAM    SQRT
00010               *
00020               *     FLOATING-POINT SQUARE ROOT SUBROUTINE
00030               *
00040               *  THIS ROUTINE FINDS THE SQUARE ROOT OF A POSITIVE
00050               *  FLOATING-POINT NUMBER.  IF THE ARGUMENT IS
00060               *  NEGATIVE, AN ERROR FLAG IS SET, THE SIGN OF THE
00070               *  ARGUMENT IS CHANGED, AND THE SQUARE ROOT OF THE
00080               *  POSITIVE ARGUMENT IS DETERMINED.  THE ROUTINE
00090               *  EMPLOYS A SUCCESSIVE APPROXIMATION TECHNIQUE
00100               *  THAT TERMINATES WHEN TWO SUCCESSIVE APPROX-
00110               *  IMATIONS ARE WITHIN ONE LEAST SIGNIFICANT BIT.
00120               *
00130               * SUBROUTINES CALLED:  FADD2, FMULT2, FDIV2
00140               *
00150       0000    FLAGS  EQU    $00         ERROR FLAG LOCATION
00160               *
00170       CC27    FADD2  EQU    $CC27
00180       0010    EAUG   EQU    $10
00190       0011    MAUG1  EQU    $11
00200       0013    EADD   EQU    $13
00210       0014    MADD1  EQU    $14
00220       0019    ESUM   EQU    $19
00230       001A    MSUM1  EQU    $1A
00240               *
00250       CD90    FMULT2 EQU    $CD90
00260       0023    EMPCND EQU    $23
00270       0024    MPCND1 EQU    $24
00280       0026    EMPIER EQU    $26
00290       0027    MPIER1 EQU    $27
00300       0029    EPROD  EQU    $29
00310       002A    MPROD1 EQU    $2A
00320               *
00330       CE20    FDIV2  EQU    $CE20
00340       0034    EDND   EQU    $34
00350       0035    MDND1  EQU    $35
00360       0037    EDOR   EQU    $37
00370       0038    MDOR1  EQU    $38
00380       003A    EQNT   EQU    $3A
00390       003B    MQNT1  EQU    $3B
00400               *
00410       0042    EARG   EQU    $42         INPUT ARGUMENT EXPONENT
00420       0043    MARG1  EQU    $43         INPUT
00430       0044    MARG2  EQU    $44         ARGUMENT MANTISSA
00440       0045    ESQRT  EQU    $45         OUTPUT SQUARE ROOT EXPONENT
00450       0046    MSQRT1 EQU    $46         OUTPUT
00460       0047    MSQRT2 EQU    $47         SQUARE ROOT MANTISSA
00470               *
00480 CEC0          ORG    $CEC0
00490               *
00500 CEC0 96 43           LDA A  MARG1       TEST SIGN OF ARGUMENT.
00510 CEC2 84 80           AND A  #$80
00520 CEC4 27 0C           BEQ    LABL43
00530 CEC6 96 00           LDA A  FLAGS       ARGUMENT NEGATIVE.
00540 CEC8 8A 40           ORA A  #$40        SET ERROR FLAG.
00550 CECA 97 00           STA A  FLAGS
00560 CECC 96 43           LDA A  MARG1       CHANGE SIGN OF ARGUMENT.
00570 CECE 84 7F           AND A  #$7F
00580 CED0 97 43           STA A  MARG1
00590 CED2 96 43    LABL43 LDA A  MARG1       TEST ARGUMENT FOR ZERO.
00592 CED4 9A 44           ORA A  MARG2
```

```
00595 CED6 26 0A              BNE     LABL40
00600 CED8 86 80      LABL47  LDA A   #$80        ARGUMENT = 0. SET
00605 CEDA CE 0000            LDX     #0000       SQUARE ROOT TO ZERO.
00610 CEDD 97 45              STA A   ESQRT
00615 CEDF DF 46              STX     MSQRT1
00620 CEE1 39                 RTS                 RETURN TO CALLING ROUTINE.
00625 CEE2 96 42      LABL40  LDA A   EARG        CHECK FOR VERY SMALL
00630 CEE4 81 80              CMP A   #$80        EXPONENT.
00640 CEE6 27 F0              BEQ     LABL47
00650 CEE8 81 81              CMP A   #$81
00660 CEEA 27 EC              BEQ     LABL47
00680 CEEC DE 43      LABL41  LDX     MARG1       FIND FIRST APPROXIMATION.
00684 CEEE 97 34              STA A   EDND
00686 CEF0 DF 35              STX     MDND1
00690 CEF2 80 02              SUB A   #02         DIVIDE ARGUMENT BY FOUR.
00700 CEF4 97 10              STA A   EAUG
00710 CEF6 DF 11              STX     MAUG1
00720 CEF8 86 01              LDA A   #01
00725 CEFA CE 4000            LDX     #$4000
00730 CEFD 97 13              STA A   EADD        ADD ONE.
00740 CEFF DF 14              STX     MADD1
00750 CF01 BD CC27            JSR     FADD2
00760 CF04 96 19              LDA A   ESUM
00770 CF06 DE 1A              LDX     MSUM1
00780 CF08 97 37      LABL42  STA A   EDOR        STORE PREVIOUS ESTIMATE.
00790 CF0A 97 10              STA A   EAUG
00800 CF0C DF 38              STX     MDOR1
00810 CF0E DF 11              STX     MAUG1       DIVIDE ARGUMENT BY
00820 CF10 BD CE20            JSR     FDIV2       PREVIOUS ESTIMATE.
00830 CF13 96 3A              LDA A   EQNT
00840 CF15 DE 3B              LDX     MQNT1
00850 CF17 97 13              STA A   EADD
00860 CF19 DF 14              STX     MADD1       ADD THE PREVIOUS
00870 CF1B BD CC27            JSR     FADD2       ESTIMATE.
00880 CF1E 96 19              LDA A   ESUM
00890 CF20 DE 1A              LDX     MSUM1
00900 CF22 80 01              SUB A   #01         DIVIDE BY TWO FOR
00910               *                             NEW ESTIMATE.
00920 CF24 91 37              CMP A   EDOR        NEW ESTIMATE =
00930 CF26 26 E0              BNE     LABL42      PREVIOUS ESTIMATE?
00940 CF28 9C 38              CPX     MDOR1
00950 CF2A 27 12              BEQ     LABL44      TEST TO SEE IF NEW
00960 CF2C 09                 DEX                 ESTIMATE IS WITHIN
00970 CF2D 9C 38              CPX     MDOR1       ONE BIT OF THE
00980 CF2F 26 03              BNE     LABL45      PREVIOUS ESTIMATE.
00990 CF31 08                 INX                 RESTORE.
01000 CF32 20 0A              BRA     LABL44
01010 CF34 08      LABL45     INX                 INCREMENT NEW ESTIMATE.
01020 CF35 08                 INX
01030 CF36 9C 38              CPX     MDOR1
01040 CF38 27 03              BEQ     LABL46
01050 CF3A 09                 DEX                 RESTORE.
01060 CF3B 20 CB              BRA     LABL42
01070 CF3D 09      LABL46     DEX                 RESTORE.
01080 CF3E 97 45      LABL44  STA A   ESQRT       YES. STORE RESULT.
01090 CF40 DF 46              STX     MSQRT1
01100 CF42 39                 RTS                 RETURN TO CALLING ROUTINE.
01110               *
01120                         END
```

SYMBOL TABLE

FLAGS  0000  FADD2  CC27  EAUG   0010  MAUG1  0011  EADD   0013
MADD1  0014  ESUM   0019  MSUM1  001A  FMULT2 CD90  EMPCND 0023

| | | | | | | |
|---|---|---|---|---|---|---|
| MPCND1 0024 | EMPIER 0026 | MPIER1 0027 | EPROD 0029 | MPROD1 002A |
| FDIV2 CE20 | EDND 0034 | MDND1 0035 | EDOR 0037 | MDOR1 0038 |
| EQNT 003A | MQNT1 003B | EARG 0042 | MARG1 0043 | MARG2 0044 |
| ESQRT 0045 | MSQRT1 0046 | MSQRT2 0047 | LABL43 CED2 | LABL47 CED8 |
| LABL40 CEE2 | LABL41 CEEC | LABL42 CF08 | LABL45 CF34 | LABL46 CF3D |
| LABL44 CF3E | | | | |

```
00000                          NAM    COMPAR3
00010             *
00020             *   COMPARISON SUBROUTINE
00030             *
00040             *   THIS SUBROUTINE COMPARES TWO FLOATING-POINT
00050             *   NUMBERS (Y AND Z).  IF Y < OR = Z, 00 IS
00060             *   RETURNED IN THE B ACCUMULATOR.  IF Y > Z,
00070             *   $80 IS RETURNED IN THE B ACCUMULATOR.  THE
00080             *   ROUTINE ASSUMES THAT ZERO IS ALWAYS REPRE-
00090             *   SENTED WITH A POSITIVE SIGN BIT.
00100             *
00650      0098   ECPE    EQU    $98          COMPAREE EXPONENT
00660      0099   MCPE1   EQU    ECPE+1       COMPAREE MANTISSA
00665      009A   MCPE2   EQU    ECPE+2
00670      009B   ECPOR   EQU    ECPE+3       COMPAROR EXPONENT
00680      009C   MCPOR1  EQU    ECPOR+1      COMPAROR MANTISSA
00685      009D   MCPOR2  EQU    ECPOR+2
00690             *
00750      00A0   ETMP    EQU    $A0          TEMPORARY STORAGE
00760      00A1   MTMP1   EQU    ETMP+1       TEMPORARY STORAGE
00770             *
00780 CB10        ORG    $CB10
00790             *
00800 CB10 96 99          LDA A  MCPE1        Y NEGATIVE?
00810 CB12 2A 1E          BPL    L15
00820 CB14 D6 9C          LDA B  MCPOR1       YES. Z NEGATIVE?
00830 CB16 2A 3E          BPL    L19
00840 CB18 96 98          LDA A  ECPE         BOTH Y AND Z ARE NEGATIVE.
00850 CB1A DE 99          LDX    MCPE1
00860 CB1C 97 A0          STA A  ETMP         SWAP Y AND Z.
00870 CB1E DF A1          STX    MTMP1
00880 CB20 96 9B          LDA A  ECPOR
00890 CB22 DE 9C          LDX    MCPOR1
00900 CB24 97 98          STA A  ECPE
00910 CB26 DF 99          STX    MCPE1
00920 CB28 96 A0          LDA A  ETMP
00930 CB2A DE A1          LDX    MTMP1
00940 CB2C 97 9B          STA A  ECPOR
00950 CB2E DF 9C          STX    MCPOR1
00960 CB30 20 04          BRA    L17
00970 CB32 D6 9C  L15     LDA B  MCPOR1       Y IS POSITIVE.  IS Z
00980 CB34 2B 22          BMI    L18          NEGATIVE?
00990 CB36 96 98  L17     LDA A  ECPE         SIGNS EQUAL AND ARGUMENTS
01000 CB38 91 9B          CMP A  ECPOR        IN PROPER LOCATIONS.
01010 CB3A 2E 1C          BGT    L18          COMPARE EXPONENTS.
01020 CB3C 26 18          BNE    L19
01030 CB3E 96 99          LDA A  MCPE1        EXPONENTS EQUAL. COMPARE
01040 CB40 D6 9C          LDA B  MCPOR1       MOST SIGNIFICANT BYTES OF
01050 CB42 84 7F          AND A  #$7F         MANTISSAS.  MASK OUT
01060 CB44 C4 7F          AND B  #$7F         SIGN BITS.
01070 CB46 11            CBA                  COMPARE.
01080 CB47 2E 0F          BGT    L18
01090 CB49 26 0B          BNE    L19
01100 CB4B 96 9A          LDA A  MCPE2        MOST SIGNIFICANT BYTES OF
01110 CB4D D6 9D          LDA B  MCPOR2       MANTISSAS EQUAL.  PREPARE
01120 CB4F 8B 80          ADD A  #$80         LEAST SIGNIFICANT BYTES FOR
01130 CB51 CB 80          ADD B  #$80         2'S COMPLEMENT COMPARISON.
01140 CB53 11            CBA                  COMPARE.
01150 CB54 2E 02          BGT    L18
```

```
01160 CB56 5F          L19     CLR  B              Y < OR = Z.
01170 CB57 39                  RTS                 RETURN TO CALLING ROUTINE.
01180 CB58 C6 80       L18     LDA  B   #$80       Y > Z.
01190 CB5A 39                  RTS                 RETURN TO CALLING ROUTINE.
01200                  *
01210                          END
```

SYMBOL TABLE

```
ECPE    0098   MCPE1   0099   MCPE2   009A   ECPOR   009B   MCPOR1  009C
MCPOR2  009D   ETMP    00A0   MTMP1   00A1   L15     CB32   L17     CB36
L19     CB56   L18     CB58
```

```
00000                          NAM    DELAY3
00010                  *
00020                  *               DELAY SUBROUTINE
00030                  *
00040                  *       THIS ROUTINE OCCUPIERS THE PROCESSOR IN ORDER
00050                  *       TO PRODUCE A TIME DELAY IN THE EXECUTION OF
00060                  *       A ROUTINE. THE TOTAL DELAY IS 65,538 * 8 =
00070                  *       524,280 MACHINE CYCLES OR APPROXIMATELY 0.5
00080                  *       SECONDS AT A 1 MHZ CLOCK RATE.
00090                  *
00100 C670                     ORG    $C670
00110                  *
00120 C670 CE FFFF             LDX    #$FFFF      INITIALIZE INDEX.
00130 C673 09          LABLA0  DEX                DECREMENT.
00140 C674 26 FD               BNE    LABLA0      LOOP UNTIL X = 0.
00150 C676 39                  RTS                RETURN TO CALLING ROUTINE.
00160                  *
00170                          END
```

SYMBOL TABLE

LABLA0 C673

```
00000                          NAM    DLY3
00010                  *
00020                  *               DELAY SUBROUTINE
00030                  *
00040                  *       THIS SUBROUTINE CALLS DELAY3 FOUR TIMES
00050                  *       TO PRODUCE APPROXIMATELY A 2.0-SECOND
00060                  *       TIME DELAY.
00070                  *
00080                  *       SUBROUTINES CALLED:  DELAY3
00090       C670       DELAY3 EQU    $C670
00100                  *
00110 C680                    ORG    $C680
00120                  *
00130 C680 C6 04              LDA  B  #04         INITIALIZE LOOP COUNTER.
00140 C682 8D EC       L30    BSR    DELAY3       DELAY 0.5 SECOND.
00150 C684 5A                 DEC  B              DECREMENT LOOP COUNTER.
00160 C685 26 FB              BNE    L30          LOOP UNTIL COUNTER = 0.
00170 C687 39                 RTS                 RETURN TO CALLING ROUTINE.
00180                  *
00190                         END
```

SYMBOL TABLE

DELAY3 C670   L30   C682

```
00000                            NAM     NMI3
00010           *
00020           *       NON-MASKABLE INTERRUPT HANDLING ROUTINE
00030           *
00040           *       THIS ROUITINE IS INITIATED BY THE STOP SWITCH
00050           *       USING THE NMI INPUT.  IT STOPS THE INPUT
00060           *       COUNTERS, REINITIALIZES THE STACK POINTER,
00070           *       AND CHECKS THE STATUS OF THE EACH PULSE MODE
00080           *       INDICATOR.  IF THE INSTRUMENT IS ACCUMULATING
00090           *       DATA IN THE EACH PULSE MODE, THE DATA COLLECTED
00100           *       TO THAT POINT, IF ANY, IS PROCESSED.  IF NO NEW
00110           *       DATA HAS BEEN COLLECTED, THE PREVIOUSLY
00120           *       COLLECTED DATA ARE DISPLAYED.  IF THE
00130           *       INSTRUMENT IS NOT ACCUMULATING DATA IN THE
00140           *       EACH PULSE MODE, THE PREVIOUSLY COLLECTED DATA
00150           *       ARE DISPLAYED.  CONTROL RETURNS TO EITHER
00152           *       RESET3 OR INPUT4.
00154           *
00160           *       SUBROUTINES CALLED:DELAY3
00170     C670          DELAY3 EQU      $C670
00180           *
00190     9003          OUT    EQU      $9003         LOCATION OF OUTPUT REGISTER
00200     0086          TEMP   EQU      $86           INDEX REGISTER TEMPORARY
00210           *                                     STORAGE IN EACH PULSE MODE
00220     00A4          TEMP2  EQU      $A4           INDEX REGISTER TEMPORARY
00230           *                                     STORAGE IN EACH PULSE MODE
00235     00AA          EP     EQU      $AA           EACH PULSE MODE INDICATOR
00240     C74B          BACK   EQU      $C74B         REENTRY TO RESET ROUTINE
00250     C100          ON     EQU      $C100         REENTRY TO END OF INPUT4
00260     0100          ASTART EQU      $0100         LOCATION OF FIRST A/D DATA PO
00270     06FA          VSTART EQU      $06FA         LOCATION OF FIRST V/F DATA PO
00280           *
00290 C150                     ORG      $C150
00300           *
00310 C150 86 40                LDA A   #$40          STOP COUNTERS.
00320 C152 B7 9003              STA A   OUT
00330 C155 7F 9003              CLR     OUT
00340 C158 8E 07FE              LDS     #$07FE        REINITIALIZE THE STACK.
00350 C15B BD C670              JSR     DELAY3        DELAY.
00354 C15E BD C670              JSR     DELAY3
00356 C161 BD C670              JSR     DELAY3
00360 C164 86 20                LDA A   #$20          CLEAR NMI FLIPFLOP.
00370 C166 B7 9003              STA A   OUT
00380 C169 7F 9003              CLR     OUT
00390 C16C 96 AA                LDA A   EP            EACH PULSE MODE?
00410 C16E 27 1A                BEQ     L50
00415 C170 7F 00AA              CLR     EP            YES.  CLEAR EACH PULSE
00420 C173 DE 86                LDX     TEMP          INDICATOR.  HAS ANY DATA
00430           *                                     BEEN ACCUMULATED?
00440 C175 8C 0100              CPX     #ASTART
00450 C178 26 07                BNE     L51
00460 C17A DE A4                LDX     TEMP2
00470 C17C 8C 06FA              CPX     #VSTART
00480 C17F 27 09                BEQ     L50
00490 C181 86 9E        L51     LDA A   #$9E          SIMULATE A SUBROUTINE CALL TO
00500 C183 36                   PSH A                 INPUT4 AND REENTER INPUT4.
00510 C184 86 C7                LDA A   #$C7
00520 C186 36                   PSH A
00530 C187 7E C100              JMP     ON
00540 C18A 7E C74B      L50     JMP     BACK          REENTER RESET ROUTINE.
00550           *
00560                           END
```

SYMBOL TABLE

| DELAY3 | C670 | OUT | 9003 | TEMP | 0086 | TEMP2 | 00A4 | EP | 00AA |
|---|---|---|---|---|---|---|---|---|---|
| BACK | C74B | ON | C100 | ASTART | 0100 | VSTART | 06FA | L51 | C181 |
| L50 | C18A | | | | | | | | |

```
00000                      NAM     VCS3
00010          *
00020          *            CHECKSUM AND VECTOR LISTING
00030          *
00040          *   THIS LISTING STORES THE PROPER CHECKSUMS
00050          *   AND VECTORS FOR PROPER OPERATION OF THE
00060          *   J S LASER METER PROGRAMS. THE
00070          *   CHECKSUMS ARE GENERATED ACCORDING TO THE
00080          *   FOLLOWING CONDITIONS: (1) FF IS STORED IN
00090          *   EVERY UNUSED LOCATION AND (2) THE K OF
00100          *   ROM OCCUPYING LOCATIONS C000 - C3FF CONTAINS
00110          *   INPUT4 AND NMI3; THE K OF ROM OCCUPUING
00120          *   LOCATIONS C400 - C7FF CONTAINS BKGND, CAL3,
00130          *   INTER3, INPUT3, TRAM, TROM, DELAY3, DLY3,
00140          *   TEST, DSPLY3, IFLOAT, RESET3, TSCALE, AND
00150          *   GENTP; THE K OF ROM OCCUPYING LOCATIONS
00160          *   C800 - CBFF CONTAINS BCDC3, MEAS, ESCALE,
00170          *   COMPAR3, AND TXEED; AND THE K OF ROM
00180          *   OCCUPYING LOCATIONS CC00 - CFFF CONTAINS
00190          *   FSUB2, FADD2, ROUND2, FMULT2, FDIV2, SQRT,
00200          *   AND FLOAT3. THE CHECKSUMS ARE USED IN
00202          *   SUBROUTINE TROM TO VERIFY PROPER ROM
00204          *   OPERATION.
00210          *   THE RESTART, INTERRUPT-REQUEST, AND
00220          *   NON-MASKABLE INTERRUPT VECTORS ARE
00230          *   ENTERED INTO MEMORY BY VCS3.
00240          *
00250 C000                  ORG     $C000
00260 C000 F6               FCB     $F6        CHECKSUM FOR LOWER K OF ROM.
00270          *
00280 C400                  ORG     $C400
00290 C400 FA               FCB     $FA        CHECKSUM FOR SECOND K OF ROM.
00300          *
00310 C800                  ORG     $C800
00320 C800 06               FCB     $06        CHECKSUM FOR THIRD K OF ROM.
00330          *
00340 CC00                  ORG     $CC00
00350 CC00 4B               FCB     $4B        CHECKSUM FOR UPPER K OF ROM.
00360          *
00370 CFF8                  ORG     $CFF8
00380 CFF8 C500             FDB     $C500      IRQ VECTOR.
00390          *
00400 CFFC                  ORG     $CFFC
00410 CFFC C150             FDB     $C150      NMI VECTOR.
00420          *
00430 CFFE C730             FDB     $C730      RESTART VECTOR.
00440          *
00450                       END

*P
S113C000F6FFFFFFFFFFFFFFFFFFFFFFFFFFFFFFFF45
S113C0107F9000CEEEEEFF9001DF76865E97767F0E
S113C020006D7F00A6868097AACE0100DF86CE062B
S113C030FADFA4B650058403F65005C40427014C66
S113C04097888670B790038690B790038610B79050
S113C05003B650042AFB7F9003CEDEEEFF900196D8
S113C0606D97A8C6100E3E0F8640B790037F9003CD
S113C07096A8916D2B05DEA45F2004C680DE86D7CF
S113C080A89680A7009681A7019682A7029683A707
S113C090039684A7049685A7057C00A6B65005845C
S113C0A003F65005C40427014C9188270B96778426
S113C0B0F08A059777B79002B6500484082709964A
S113C0C077840F9777B7900296A82B0E0909090970
S113C0D00909DFA49C862728200C080808080808FA
S113C0E0DF869CA4271A8650B790038690B79003E6
S113C0F08610B79003B650042AFB7F90037EC05F7E
```

```
S113C1007F00AADEA48C06FA271908080808080884
S113C110A60008DFA4DE86A70008DF86DEA48C075D
S113C1200026ED86CEB7900139FFFFFFFFFFFFFF2A
S113C130FFFFFFFFFFFFFFFFFFFFFFFFFFFFFFFF0B
S113C140FFFFFFFFFFFFFFFFFFFFFFFFFFFFFFFFFB
S113C1508640B790037F90038E07FEBDC670BDC6B0
S113C16070BDC6708620B790037F900396AA271AE5
S113C1707F00AADE868C01002607DEA48C06FA273F
S113C18009869E3686C7367EC1007EC74BFFFFFFF9
S113C190FFFFFFFFFFFFFFFFFFFFFFFFFFFFFFFFAB
S113C1A0FFFFFFFFFFFFFFFFFFFFFFFFFFFFFFFF9B
S113C1B0FFFFFFFFFFFFFFFFFFFFFFFFFFFFFFFF8B
S113C1C0FFFFFFFFFFFFFFFFFFFFFFFFFFFFFFFF7B
S113C1D0FFFFFFFFFFFFFFFFFFFFFFFFFFFFFFFF6B
S113C1E0FFFFFFFFFFFFFFFFFFFFFFFFFFFFFFFF5B
S113C1F0FFFFFFFFFFFFFFFFFFFFFFFFFFFFFFFF4B
S113C200FFFFFFFFFFFFFFFFFFFFFFFFFFFFFFFF3A
S113C210FFFFFFFFFFFFFFFFFFFFFFFFFFFFFFFF2A
S113C220FFFFFFFFFFFFFFFFFFFFFFFFFFFFFFFF1A
S113C230FFFFFFFFFFFFFFFFFFFFFFFFFFFFFFFF0A
S113C240FFFFFFFFFFFFFFFFFFFFFFFFFFFFFFFFFA
S113C250FFFFFFFFFFFFFFFFFFFFFFFFFFFFFFFFEA
S113C260FFFFFFFFFFFFFFFFFFFFFFFFFFFFFFFFDA
S113C270FFFFFFFFFFFFFFFFFFFFFFFFFFFFFFFFCA
S113C280FFFFFFFFFFFFFFFFFFFFFFFFFFFFFFFFBA
S113C290FFFFFFFFFFFFFFFFFFFFFFFFFFFFFFFFAA
S113C2A0FFFFFFFFFFFFFFFFFFFFFFFFFFFFFFFF9A
S113C2B0FFFFFFFFFFFFFFFFFFFFFFFFFFFFFFFF8A
S113C2C0FFFFFFFFFFFFFFFFFFFFFFFFFFFFFFFF7A
S113C2D0FFFFFFFFFFFFFFFFFFFFFFFFFFFFFFFF6A
S113C2E0FFFFFFFFFFFFFFFFFFFFFFFFFFFFFFFF5A
S113C2F0FFFFFFFFFFFFFFFFFFFFFFFFFFFFFFFF4A
S113C300FFFFFFFFFFFFFFFFFFFFFFFFFFFFFFFF39
S113C310FFFFFFFFFFFFFFFFFFFFFFFFFFFFFFFF29
S113C320FFFFFFFFFFFFFFFFFFFFFFFFFFFFFFFF19
S113C330FFFFFFFFFFFFFFFFFFFFFFFFFFFFFFFF09
S113C340FFFFFFFFFFFFFFFFFFFFFFFFFFFFFFFFF9
S113C350FFFFFFFFFFFFFFFFFFFFFFFFFFFFFFFFE9
S113C360FFFFFFFFFFFFFFFFFFFFFFFFFFFFFFFFD9
S113C370FFFFFFFFFFFFFFFFFFFFFFFFFFFFFFFFC9
S113C380FFFFFFFFFFFFFFFFFFFFFFFFFFFFFFFFB9
S113C390FFFFFFFFFFFFFFFFFFFFFFFFFFFFFFFFA9
S113C3A0FFFFFFFFFFFFFFFFFFFFFFFFFFFFFFFF99
S113C3B0FFFFFFFFFFFFFFFFFFFFFFFFFFFFFFFF89
S113C3C0FFFFFFFFFFFFFFFFFFFFFFFFFFFFFFFF79
S113C3D0FFFFFFFFFFFFFFFFFFFFFFFFFFFFFFFF69
S113C3E0FFFFFFFFFFFFFFFFFFFFFFFFFFFFFFFF59
S113C3F0FFFFFFFFFFFFFFFFFFFFFFFFFFFFFFFF49
*S9
*
S113C400FAFFFFFFFFFFFFFFFF7F00952011C680D7D3
S113C410958601CE40009778DF79977BDF7C7F009B
S113C42089CE0100A600EE019734DF35BDC7C09662
S113C4303ADE3B9792DF93D6892B0C9772DF73B663
S113C4400103FE01042006B60109FE010A9734DF48
S113C45035BDCAC09629DE2A9734DF35D6952B0E12
S113C460D6892B06976EDF6F20049766DF67969256
S113C470DE939737DF38BDCE20963ADE3BD6952B38
S113C48011D6892B06978CDF8D2044978FDF907E01
S113C490CB60971CDF1DD6892B06968CDE8D20047D
S113C4A0968FDE90971FDF20BDCC0B9619DE1A976E
S113C4B037DF3886F3CE4EA59734DF35BDCE2096D0
S113C4C03ADE3BD6892B129778DF79976EDF6FC6F9
S113C4D080D789CE01067EC424977BDF7C9766DFF4
S113C4E0679723DF249637DE389726DF27BDCD9064
S113C4F09629DE2A7ECB60FFFFFFFFFFFFFFFFFFD1
```

```
S113C500B65007FE50029780DF81B6500584082696
S113C510037C006DB65006FE5000F790039783DF4E
S113C520847F90033086D0A7003BFFFFFFFFFFFF0F
S113C5307F9000CEEEEEFF9001DF76865E97767FE9
S113C54000897F006DCE0100DF86B650058403F6B6
S113C5505005C40427014C978886708790038690D1
S113C560B790038610B79003B650042AFB7F90035C
S113C570CEDEEEFF9001C6100E3E0FB6500484408E
S113C580270CC680D7898640B790037F9003DE8648
S113C5909680A7009681A7019682A7029683A70397
S113C5A09684A7049685A705B650058403F650051E
S113C5B0C40427014C91882708967784F08A05974C
S113C5C077B650048408270996778407F9777B79035
S113C5D00208080808080DF868C07DE261286C5CC
S113C5E0B79001865597768640B790037F900339BC
S113C5F096892A8286CEB7900139FFFFFFFFFFFF9D
S113C600FFFFFFFFFFFFFFFFFFFFFFFFFFFFFFFF36
S113C61086FFC640CE0001A700A1002704DA00D798
S113C62000088C07F026F081002601398DC7E02000
S113C630E3FFFFFF86089705CEC000A6009704A677
S113C640010808C6027F0006AB0008CB0124F97C70
S113C650000637D606C1043326EE91042706960554
S113C6609A0097007400058CD00026CF39FFFFFF95
S113C670CEFFFF0926FD39FFFFFFFFFFFFFFFFFF8E
S113C680C6048DEC5A26FB39FFFFFFFFFFFFFFFFB7
S113C69086FFCE8888B79000FF9001BDC6807F904A
S113C6A000CEFFFFFF9001BDC680BDC610BDC634DD
S113C6B0CE5EEEDF76960085702705C65AD77639AA
S113C6C0850F27FBC65B20F5FFFFFFFFFFFFFFFF82
S113C6D07F0059CEFFFFDF5ACE0053DF5CDE5CA63D
S113C6E000EE01B79000FF9001DE5C080808DF5CF3
S113C6F08C005C2705BDC68020E37EC670FFFFFF6B
S113C700CE0100DF8AA600EE019760DF61BDCF484D
S113C710DE8A9663A7009664A7019665A7020808B7
S113C720089C8626DE39FFFFFFFFFFFFFFFFFFFFA8
S113C7300F8640B790038E07FEB65005CE0000DF8B
S113C74000BDC690CE0140DF78DF7BB6500484077D
S113C7508104260F9675DE76B79000FF9001BDC662
S113C76080201A5F4848D75A975BDE5AA6669750CE
S113C770EE67DF51BDC802BDC6D07F00A9B6500523
S113C7802AC98470482BB597712610B650048520A9
S113C7902609C680D7A9BDC0102003BDC530BDC7BA
S113C7A000967181602605CEC40D200C81402605BB
S113C7B0CEC4082003CEC948AD00208FFFFFFFFF81
S113C7C08614CE7A129737DF387ECE20FFFFFFFF24
S113C7D001400004500000764000A7D00FFFFFFFD2
S113C7E081FF260586AAC620394D2A0444C620396D
S113C7F04FC60A39FFFFFFFFFFFFFFFFFFFFFFFE9
*S9
*P
S113C80006FFCE010FDF56860ACE7D009726DF276E
S113C8109737DF384F975396512A08C640D7538429
S113C8207F9751DE51260F86049A539753CE000FFB
S113C830DF544F9758394FD650C1012D28C10A2EC5
S113C840082644D654C17D2D3E9759D650DE51D783
S113C85034DF35BDCE20D63ADE3BD750DF51965972
S113C8608B031920D8C60ED757D650DE519759D707
S113C87023DF24BDCD90D629DE2AD750DF51965927
S113C8808B0319C1012DE69758965081072E412636
S113C89008965181642C39965081042E08260F96EF
S113C8A05181502D098604CE5000C6082007860702
S113C8B0CE6400C604DA53D7539726DF279650DE9A
S113C8C0519723DF24BDCD909629DE2A9750DF515E
S113C8D0CE0000DF0EDF5A860F905081082C089797
S113C8E0599651D6522200B800897594FD652D70EDD
S113C8F0D6517D0059270A445676000E7A005920F5
```

```
S113C900F4CE0059BDCD688103260DC1E826097C0B
S113C9100053CE000FDF54397F0054C06482002BD3
S113C920057C005420F5CB64965448484848C00A16
S113C9302B034C20F9CB0A58585858CA0F9754D790
S113C9405539FFFFAFFFEFFF7F00897F00977F00BE
S113C9509ECE0100DF99A600EE019734DF35BDC7FA
S113C960C0963ADE3B9792DF93D69E2B04976ADFFC
S113C9706B9798DF99D6972B049772DF739723DF11
S113C980247D006D260A86809789968FDE90200785
S113C9907A006D968CDE8D9726DF27BDCD90962983
S113C9A0DE2A971FDF20DE95A603EE049734DF35D9
S113C9B0BDCAC09629DE2A971CDF1DBDCC0B961973
S113C9C0DE1AD6972B08976EDF6FC680D7979766C7
S113C9D0DF67D69E2A013986F1CE53E3979BDF9C0D
S113C9E0BDCB102B599666DE679798DF9986EACE01
S113C9F06B60979BDF9CBDCB102A037ECAA5DE9596
S113CA000808080808089C8627037EC95496A92AA2
S113CA1013860ECE4E20976ADF6B8680CE00009779
S113CA2066DF67399666DE679734DF359692DE9364
S113CA309737DF38BDCE20963ADE3B7ECB609692A8
S113CA40DE93979BDF9C8604CE50009798DF99BDB8
S113CA50CB102AB99692DE939742DF43BDCEC0969F
S113CA6045DE469742DF439723DF24BDCEC096457B
S113CA70DE469726DF27BDCD909629DE2A9723DF51
S113CA802486F6CE5BC09726DF27BDCD909629DE9F
S113CA902A979BDF9C9666DE679798DF99BDCB103B
S113CAA02B037EC9FE96A92A0139DE8609090909E4
S113CAB00909C680D79E7F006D7EC954FFFFFFFF22
S113CAC08622CE4A81D6892B028B049737DF38BD64
S113CAD0CE20963ADE3B9723DF24CEC7D096882714
S113CAE0060808084A20F8A600EE019726DF27BDAD
S113CAF0CD909629DE2A9723DF24D6892B069678B3
S113CB00DE792004967BDE7C9726DF277ECD90FF9E
S113CB1096992A1ED69C2A3E9698DE9997A0DFA164
S113CB20969BDE9C9798DF9996A0DEA1979BDF9C4D
S113CB302004D69C2B229698919B2E1C26189699FD
S113CB40D69C847FC47F112E0F260B969AD69D8B7C
S113CB5080CB80112E025F39C68039FFFFFFFFFFB3
S113CB602F2A9737DF3886F8CE7FCC9734DF35BD50
S113CB70CE20963ADE3B976ADF6B9798DF99860E54
S113CB80CE4E20979BDF9CBDCB102A0A860ECE4E3C
S113CB9020976ADF6B39963ADE3B979BDF9C8604CD
S113CBA0CE50009798DF99BDCB102B013986F6CE75
S113CBB05BC09734DF35BDCE20963ADE3BC602D744
S113CBC0A39723DF249726DF27BDCD909629DE2A5D
S113CBD07A00A326EC976ADF6B979BDF9C86FFCED7
S113CBE040009798DF99BDCB102A098680CE0000BB
S113CBF0976ADF6B39FFFFFFFFFFFFFFFFFFFFFFB8
*S9
*P
S113CC004BFFFFFFFFFFFFFFFFFFFF961CDE1D979B
S113CC1010DF11961FDE209713DF149614492403A6
S113CC200C20010D4697149611847F9A12260996BA
S113CC3013DE149719DF1A399614847F9A15260681
S113CC409610DE1120EDCE0000DF0ADF0E96109163
S113CC5013262E8640970A9611847FD614C47F111A
S113CC602E0D26119612D6158B80CB80112F04968B
S113CC7010202227049610200A8601970A96102075
S113CC80022E12DE11970BDF0C9613DE1497169703
S113CC9019DF172010DE1197169719DF179613DE88
S113CCA014970BDF0C96178480D60CC480112604CD
S113CCB0D60A2006D60ACA80D70A971A56241459C7
S113CCC02B0796164CDE1720058680CE0000971998
S113CCD0DF1A39960C847F970C59592B339616908A
S113CCE00B810F2F079616DE177ECC332611960C78
S113CCF0D60D5846970ED70FCE0000DF0C2011D664
```

```
S113CD000C5476000D76000E76000F4A26F3D70CED
S113CD107D000A2A395F4FD00F920ED70F970ED697
S113CD20189617847FD20D920C847F270F7A0019EE
S113CD3078000F79000E59492B2020F1DE0EDF0D0B
S113CD40970F961980D8971917D60D4D20EAD61813
S113CD509617847FDB0B996C2A0B445676000E76C9
S113CD60000F7C0019CE0619 7D000E2A1C78000EDD
S113CD70260C7D000F260756250359200C59CB019C
S113CD8089002A056C0086405FAA01A701E70239E1
S113CD909624847F97309A25260A8680CE000097B1
S113CDA029DF2A399627847F97329A2827EC9623FD
S113CDB09B26972996248480D627C4801B972A967D
S113CDC025D6289731D7334F5FCE0000DF2CCE0015
S113CDD00F7800337900322A14DB319930240E366F
S113CDE0962D8900972D962C8900972C32584979D5
S113CDF0002D79002C0926D9584979002D79002C69
S113CE002A0A74002C76002D465620037A002997AE
S113CE100ED70F962CD62DCE00297ECD68FFFFFFAE
S113CE209638847F97409A39260A86809A009634E9
S113CE30DE35200D9635847F9A36260A8680CE000C
S113CE4000973ADF3B3996349037973A9635D6387F
S113CE508480C4801B973B9635847FCE0000DF3DE1
S113CE60CE000FD639D741D636D04192402A07DBBF
S113CE704199400C20010D79003E79003D58490943
S113CE8026E7D04192402B1DD73F9A3F26087600D3
S113CE903E240F79003E963DD63E8900CB018900A1
S113CEA0200779003E963DD63E58492A0546567CD1
S113CEB0003AD73C9A3B973B39FFFFFFFFFFFFF48
S113CEC096438480270C96008A4097009643847F7B
S113CED0974396439A44260A8680CE00009745DFFE
S113CEE046399642818027F0818127ECDE439734CE
S113CEF0DF3580029710DF118601CE40009713DFE3
S113CF0014BDCC279619DE1A973797100F38DF1136
S113CF10BDCE20963ADE3B9713DF14BDCC2796197D
S113CF20DE1A8001913726E09C382712099C3826A6
S113CF300308200A08089C3827030920CB099745D1
S113CF40DF4639FFFFFFFFFFCE0000DF0EDF6496F0
S113CF5060261C96612708C60FD763D662201A96EE
S113CF606226058680976339C607D7635F200AC6A1
S113CF7017D763D662D70ED6614D2B0A7A00637831
S113CF80000E59492AF67C0063445676000ECE0002
S113CF90637ECD68FFFFFFFFFFFFFFFFFFFFFFF83
S113CFA0FFFFFFFFFFFFFFFFFFFFFFFFFFFFFFF8D
S113CFB0FFFFFFFFFFFFFFFFFFFFFFFFFFFFFFF7D
S113CFC0FFFFFFFFFFFFFFFFFFFFFFFFFFFFFFF6D
S113CFD0FFFFFFFFFFFFFFFFFFFFFFFFFFFFFFF5D
S113CFE0FFFFFFFFFFFFFFFFFFFFFFFFFFFFFFF4D
S113CFF0FFFFFFFFFFFFFFFFC500FFFFC150C7306A
*S9
```

What is claimed is:

1. An instrument for determining the viewing hazard of a source of visible laser radiation comprising: photoelectric sensing means adapted to be exposed to said source and to generate an intensity signal having a magnitude proportional to the intensity of the visible laser radiation from said source falling on said sensing means; integration means responsive to said intensity signal for producing an energy signal proportional to the energy of said radiation falling on said sensing means; means to measure the time duration of said intensity signal; computer means to compute the energy from said source falling on said sensing means as a function of said energy signal and said measured time duration; and means to compare the computed energy from said source falling on said sensing means with a predetermined energy value, said computer means including means to compute and display the time duration at which the integrated energy output of said source falling on said sensing means first exceeds said predetermined energy value during a predetermined time period.

2. The instrument of claim 1, wherein said means to generate said intensity signal comprises means to selectively measure one of CW laser radiation, accumulated pulsed laser radiation, or each pulse of laser radiation.

3. The instrument of claim 1, and further including means to compute and display the total emitted laser output energy falling on said sensing means during said predetermined time period.

4. The instrument of claim 1, and further including means to program said computer means to store comparison data for respective predetermined limited viewing laser output energy values for a plurality of different exposure time periods.

5. The instrument of claim 1, and further including means to take measurements of optical samples comprising optical laser pulses 18 microseconds or greater in width for comparison with said predetermined energy value.

6. The instrument of claim 1, and further including means to provide three phases of measurement, comprising a data acquisition phase, a processing phase and a display phase to accumulate and evaluate data comprising exposure time duration and associated energy.

7. The instrument of claim 1, and further including means to determine calibration factors to correct for errors caused by attenuation of optical elements or gain variations between optical detectors.

8. The instrument of claim 1, and further including means to subtract background energy from said integrated energy signal.

9. The instrument of claim 1, and further including data acquisition means comprising a short-term measurement section and a long-term measurement section.

10. The instrument of claim 9, and wherein said short-term measurement section acquires energy data for approximately the first 257 microseconds of exposure and said long-term measurement section acquires energy data for approximately from zero to ten seconds of exposure.

11. The instrument of claim 1, and further including means to select a display of one of computed parameters corresponding to "Calibrate", "Background", "CW", "Pulsed" and "Each Pulse" measurement modes, respectively.

12. The instrument of claim 11, wherein said selecting means includes means to select, for the "Pulsed" and "Each Pulse" modes, the time width of the first pulse, the energy of the first pulse, and the time duration with first exceeds said energy value, and for the "Pulsed" mode, the time duration in which the sensed energy first exceeds said predetermined energy value.

13. The instrument of claim 11, and further including means whereby, for the "Calibrate" and "Background" modes, the data accumulation period includes input of two data sampler comprising a short-term measurement period of approximately 257 microseconds and a long-term measurement period of approximately ten seconds.

14. The instrument of claim 1 and further including means to test CW laser sensed energy for a relatively long period, multiply it by a calibration factor, correct it for background energy, and then compare it with said energy value.

15. The instrument of claim 14, and further including means to determine an exposure duration for which a laser having the same average power as said CW laser would exceed said energy value.

16. The instrument of claim 1, and further including means to accumulate energy and time values for an optical signal, including triggering means to commence accumulation responsive to an optical signal of at least 10% full scale intensity and a rise time less than 50 microseconds.

17. The instrument of claim 16, and further including means to detect the end of said optical signal when the fall time thereof is less than 50 microseconds.

18. The instrument of claim 17, and further including means latching the accumulated pulse time and energy data sample values until no further end-of-pulse is detected for a time period between approximately 450 microseconds and approximately 56 milliseconds, and means to input the most recent pulse time and energy data samples into said computer means at the end of said last-mentioned time period.

19. The instrument of claim 1, wherein said computer means includes a memory, and means to accumulate the energy and time data values for a single optical pulse signal and to store the accumulated energy and time data values in said computer memory.

20. The instrument of claim 1, wherein said predetermined time period is approximately 10 seconds.

21. The instrument of claim 1, and further including means providing a three-phase sequential display cycle, comprising a 3-digit mantissa, the power of ten associated therewith, and a blank indication.

22. The instrument of claim 1, and further including means to compute and store background correction in units of average power over a predetermined accumulation period of approximately 10 seconds.

23. The instrument of claim 1, wherein said instrument is portable and said computing means comprises a micro-computer.

24. The instrument of claim 1, wherein said photoelectric sensing means includes a circular aperture having a diameter of about 7 mm.

* * * * *